US010306308B2

United States Patent
Nair et al.

(10) Patent No.: US 10,306,308 B2
(45) Date of Patent: May 28, 2019

(54) SYSTEM AND METHOD FOR MEDIA DELIVERY USING COMMON MEZZANINE DISTRIBUTION FORMAT

(71) Applicant: TELEFONAKTIEBOLAGET LM ERICSSON (PUBL), Stockholm (SE)

(72) Inventors: Raj Nair, Lexington, MA (US); Prabhudev Navali, Westford, MA (US); Mikhail Mikhailov, Newton, MA (US); David Alexander, Half Moon Bay, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 39 days.

(21) Appl. No.: 15/378,734

(22) Filed: Dec. 14, 2016

(65) Prior Publication Data

US 2017/0171610 A1 Jun. 15, 2017

Related U.S. Application Data

(60) Provisional application No. 62/404,831, filed on Oct. 6, 2016, provisional application No. 62/267,795, filed on Dec. 15, 2015.

(51) Int. Cl.
*H04N 7/173* (2011.01)
*H04N 21/4408* (2011.01)
(Continued)

(52) U.S. Cl.
CPC ....... *H04N 21/4408* (2013.01); *H04L 65/608* (2013.01); *H04L 67/02* (2013.01);
(Continued)

(58) Field of Classification Search
CPC ......... H04N 21/4408; H04N 21/23439; H04N 21/2347; H04N 21/23476; H04N 21/2351;
(Continued)

(56) References Cited

U.S. PATENT DOCUMENTS 7,895,123 B1 2/2011 Du et al.
9,769,230 B2 9/2017 Hannuksela
(Continued)

OTHER PUBLICATIONS

Michael Dolan et al.: "Information technology—MPEG systems technologies—Part 12: Sample variants in the ISO base media file format", ISO/IEC JTC1/SC29/WG11 MPEG2014/ No. m36175, Jun. 2015, Warsaw, Poland, p. 1, paragraph 3.1.4—p. 6, paragraph 6.2, p. 6, paragraph 7.1—p. 9, paragraph 8.3.2.1, p. 10, paragraph 8.3.3.2—p. 14, paragraph 9.1, figures 1, 2.
(Continued)

*Primary Examiner* — John Schnurr

(57) ABSTRACT

A system and method for distributing content in a network architecture using a common intermediary mezzanine distribution format (CMZF). A media content asset may be processed for packaging in a CMZF container structure configured to carry each bitrate representation of the media content in a valid CMZF stream scheme, the media content encrypted in one or more encryption schemes. The CMZF formatted media content may be provided to an origin server for file-based distribution over a network which is of one of the following types; unmanaged network, managed network, or a combination thereof, and/or to a streaming network node for stream-based distribution over a over a network which is of one of the following types; unmanaged network, managed network, or a combination thereof. In one embodiment, the CMZF container structure may be based on an MPEG-TS format extended to facilitate carriage of ISOBMFF track and track metadata data objects in PES payload in additional elementary streams. In another embodiment the CMZF container structure may be based on an MPEG-TS format to facilitate carriage of sample variants in PES payload.

19 Claims, 30 Drawing Sheets

(51) Int. Cl.

| | | |
|---|---|---|
| *H04N 21/2362* | (2011.01) | |
| *H04N 21/435* | (2011.01) | |
| *H04N 21/462* | (2011.01) | |
| *H04N 21/4627* | (2011.01) | |
| *H04N 21/6334* | (2011.01) | |
| *H04N 21/84* | (2011.01) | |
| *H04L 29/06* | (2006.01) | |
| *H04L 29/08* | (2006.01) | |
| *H04N 21/438* | (2011.01) | |
| *H04N 21/2343* | (2011.01) | |
| *H04N 21/2347* | (2011.01) | |
| *H04N 21/235* | (2011.01) | |
| *H04N 21/2381* | (2011.01) | |
| *H04N 21/4405* | (2011.01) | |
| *H04N 21/845* | (2011.01) | |
| *H04N 21/854* | (2011.01) | |
| *H04N 21/254* | (2011.01) | |

(52) U.S. Cl.
CPC ..... *H04L 67/2842* (2013.01); *H04N 21/2347* (2013.01); *H04N 21/2351* (2013.01); *H04N 21/2362* (2013.01); *H04N 21/2381* (2013.01); *H04N 21/23439* (2013.01); *H04N 21/23476* (2013.01); *H04N 21/435* (2013.01); *H04N 21/4353* (2013.01); *H04N 21/4384* (2013.01); *H04N 21/4405* (2013.01); *H04N 21/44055* (2013.01); *H04N 21/4622* (2013.01); *H04N 21/4627* (2013.01); *H04N 21/6334* (2013.01); *H04N 21/84* (2013.01); *H04N 21/8456* (2013.01); *H04N 21/85406* (2013.01); *H04N 21/2541* (2013.01)

(58) Field of Classification Search
CPC ............. H04N 21/435; H04N 21/4353; H04N 21/4384; H04N 21/4405; H04N 21/44055; H04N 21/4622; H04N 21/4627; H04N 21/6334; H04N 21/84; H04N 21/8456; H04N 21/85406; H04N 21/2541; H04L 65/608; H04L 67/02; H04L 67/2842

See application file for complete search history.

(56) References Cited

U.S. PATENT DOCUMENTS

| | | |
|---|---|---|
| 9,807,452 B2 | 10/2017 | Freeman et al. |
| 9,820,015 B2 | 11/2017 | Vadakital et al. |
| 2008/0209231 A1 | 8/2008 | Kim et al. |
| 2010/0257569 A1 | 10/2010 | O'Hanlon |
| 2014/0020111 A1 | 1/2014 | Wang et al. |
| 2014/0040612 A1 | 2/2014 | Swaminathan et al. |
| 2015/0106472 A1 | 4/2015 | Viveganandhan et al. |
| 2015/0288996 A1* | 10/2015 | van der Schaar .. H04N 21/6587 725/116 |
| 2016/0021407 A1 | 1/2016 | Randolph et al. |
| 2016/0198202 A1* | 7/2016 | Van Brandenburg ........................ H04N 21/26258 725/31 |
| 2017/0187611 A1 | 6/2017 | Johns et al. |
| 2017/0201497 A1 | 7/2017 | Rhyu et al. |
| 2017/0206340 A1* | 7/2017 | Tornielli ................. G06F 21/10 |

OTHER PUBLICATIONS

Piron L. et al: "Improving Content Interoperability With the Dash Content Protection Exchange Format Standard", IBC 2015 Conference, Sep. 11-15, 2015, Amsterdam, Sep. 11, 2015, abstract, pp. 1-5, figure 1.

Kazuhiko Takabayashi et al: "Consideration on signaling of sample variants framework", 109. MPEG Meeting; Jul. 7, 2014-Nov. 7, 2014; Sapporo; (Motion Picture Expert Group or ISO/IEC JTC1/SC29/WG11), No. m34366, Jul. 6, 2014 (Jul. 6, 2014), the whole document.

Michael Dolan: "Sample variants framework for the ISOBMFF", 109. MPEG Meeting; Jul. 7, 2014-Nov. 7, 2014; Sapporo; (Motion Picture Expert Group or ISO/IEC JTC1/SC29/WG11), No. m34509, Jul. 5, 2014 (Jul. 5, 2014), p. 2-p. 8, figures 1,2.

* cited by examiner

```xml
<?xml version="1.0" encoding="UTF-8"?>
<MPD xmlns:xsi="http://www.w3.org/2001/XMLSchema-instance"
xmlns="urn:mpeg:dash:schema:mpd:2011" xsi:schemaLocation="urn:mpeg:dash:schema:mpd:2011 cmzf-2016.xsd"
profiles="urn:mpeg:dash:profile:cmzf:2016" type="dynamic" availabilityStartTime="2016-10-10T10:10:10Z"
suggestedPresentationDelay="PT00H00M00S">

<Period id="Period-1" start="PT0S">
  <AdaptationSet
      id="100"
      group="100"
      mimeType="video/mp2t"
      codecs="avc1.4D401F,mp4a"
      frameRate="24000/1001"
      segmentAlignment="true"
      subsegmentAlignment="true"
      bitstreamSwitching="true"
      startWithSAP="2"
      subsegmentStartsWithSAP="2">

<CMZF scheme="CMZF-TS-FFMD-CBCS-CENS-SV-SCH">

<BaseURL>UDP://multicast-ip-address</BaseURL>

<ContentProtection schemeIdUri="urn:mpeg:cmzf:mp4protection:2016" value="edrm"
                        cenc:default_KID="cd82e57a-b662-5000-8018-ac003516d065"/>

<ContentComponent description="Main ATS video elementary stream"
                        esType="CMZF-TS-ES" contentType="video" id="481" contentProtection="CBC-CF" />
      <ContentComponent description="Main ATS video ECM/Encryption Signaling Data elementary stream"
                        esType="CMZF-TS-ECM-ES" contentType="ecm" id="482" contentProtection="CBC-CF" />
```

FIG. 21A

```
<ContentComponent description="CMAF/ISOBMFF Track Metadata over TS elementary stream"
    esType="CMZF-TS-FFMD-ES" contentType="video" id="485" contentProtection="CBCS"/>
<ContentComponent description="CMAF/ISOBMFF Track Initialization Segment elementary stream"
    esType="CMZF-TS-FF-IS-ES" contentType="init" id="486" contentProtection="CBCS"/>

<ContentComponent description="CMAF/ISOBMFF Sample Variants Track Metadata over TS elementary stream"
    esType="CMZF-TS-FFMD-SV-ES" contentType="video" id="487" contentProtection="CENS"/>
<ContentComponent description="CMAF/ISOBMFF Sample Variant Track Initialization Segment elementary stream"
    esType="CMZF-TS-FF-IS-ES" id="488" contentType="init" contentProtection="CENS"/>

<ContentComponent description="ATS audio elementary stream"
    esType="CMZF-TS-ES" contentType="audio" id="501" lang="en" contentProtection="CBC-CF"/>
<ContentComponent description="ATS audio ECM/Encryption Signaling elementary stream"
    esType="CMZF-TS-ECM-ES" id="502" contentType="ecm" contentProtection="CBC-CF"/>

<ContentComponent description="ATS audio elementary stream"
    esType="CMZF-TS-ES" contentType="audio" id="503" lang="en" contentProtection="CTR-CF"/>
<ContentComponent description="ATS audio ECM/Encryption Signaling elementary stream"
    esType="CMZF-TS-ECM-ES" id="504" contentType="ecm" contentProtection="CTR-CF"/>

<ContentComponent description="CMAF/ISOBMFF Audio Track over TS elementary stream"
    esType="CMZF-TS-FF-ES" id="505" contentType="audio" contentProtection="CBCS"/>
```

FIG. 21B

```
<ContentComponent description="ATS audio ECM/Encryption Signaling elementary stream"
    esType="CMZF-TS-ECM-ES" id="504" contentType="ecm" contentProtection="CTR-CF"/>

<ContentComponent description="CMAF/ISOBMFF Audio Track over TS elementary stream"
    esType="CMZF-TS-FF-ES" id="505" contentType="audio" contentProtection="CBCS"/>

<ContentComponent description="CMAF/ISOBMFF Audio Track over TS Initialization Segment elementary stream"
    esType="CMZF-TS-FF-IS-ES" id="" contentType="init" contentProtection="CBCS"/>

<ContentComponent description="CMAF/ISOBMFF Audio Track over TS elementary stream"
    esType="CMZF-TS-FF-ES" id="505" contentType="audio" contentProtection="CENS"/>

<ContentComponent description="CMAF/ISOBMFF Audio Track over TS Initialization Segment elementary stream"
    esType="CMZF-TS-FF-IS-ES" id="506" contentType="init" contentProtection="CENS"/>

</CMZF>

<Representation id="3400kbps" bandwidth="3740000" width="1280" height="720"/>

</AdaptationSet>
</Period>

</MPD>
```

FIG. 21C

SYSTEM AND METHOD FOR MEDIA DELIVERY USING COMMON MEZZANINE DISTRIBUTION FORMAT

PRIORITY UNDER 35 U.S.C. § 119(e) & 37 C.F.R. § 1.78

This nonprovisional application claims priority based upon the following prior United States provisional patent application(s): (i) "SYSTEM AND METHOD FOR MEDIA DELIVERY USING COMMON MEZZANINE FORMAT," Application No. 62/267,795, filed Dec. 15, 2015, in the name(s) of Raj Nair, Prabhudev Navali, David Alexander and Mikhail Mikhailov; and (ii) "SYSTEM AND METHOD FOR MEDIA DELIVERY USING SAMPLE VARIANTS FOR NORMALIZED ENCRYPTION," Application No. 62/404,831, filed Oct. 6, 2016, in the name(s) of Raj Nair, Prabhudev Navali, David Alexander, Mikhail Mikhailov and Pablo Argon; each of which is hereby incorporated by reference in its entirety.

FIELD OF THE DISCLOSURE

The present disclosure generally relates to communication networks. More particularly, and not by way of any limitation, the present disclosure is directed to a network architecture, system and method for delivering media using a common intermediary distribution format over one or more managed networks, unmanaged networks, and/or any combination thereof.

BACKGROUND

Content providers have long struggled with how to provide content at a high availability and high performance to their customers in view of bandwidth limitations in content distribution networks. A content delivery/distribution network (CDN) can be a large distributed system of servers deployed in multiple data centers connected to the Internet or other public/private communications network. A CDN can be a managed or unmanaged network, and can also be a federation of managed or unmanaged networks. The goal of a CDN is to serve media content (e.g., video/audio/etc.) to user equipment nodes (UEs) with high availability and high performance. The bandwidth requirements for distributing content from content providers to central CDN servers and/or to distributed edge replication servers have grown tremendously with the proliferation of adaptive streaming content delivery solutions.

Adaptive streaming technology is being implemented to handle increasing consumer demands for streaming content (e.g., broadcast and on-demand movies/TV, etc.) across a content distribution network to UEs having widely differing performance and protocols, both in managed and unmanaged network environments. In the context of managed networks such as IPTV distribution over a service provider IP network, it should be appreciated that content delivery to the end user requires careful orchestration and management of various network infrastructure elements in order to address issues such as bandwidth, content protection, scalability and reachability, as well as adherence to requisite performance indicators, among others. Whereas advances in the media delivery technology continue apace, issues relating to high bandwidth and storage costs associated with the media delivery for multiple protocols, especially with multiple encryption schemes, as well as achieving cost-effective convergence of delivery network infrastructures, etc., remain challenging.

SUMMARY

The present patent disclosure is broadly directed to systems, methods, apparatuses, as well as network nodes and associated non-transitory computer-readable media for facilitating distribution of media content in a network architecture (e.g., involving managed and/or unmanaged networks) using a common intermediary mezzanine distribution format (CMZF), wherein the content is protected all the way from an encoding entity to the end user device (i.e., end-to-end content protection). In one example embodiment, a media content asset may be processed for packaging, at a headend facility, in a CMZF container structure, also referred to as CMZF stream carrying one or more CMZF stream scheme elementary streams, that is configured to carry each bitrate representation of the media content asset encrypted in one or more encryption schemes. The CMZF-formatted media content may be provided to an origin server for file-based distribution over an unmanaged/managed network and/or to a streaming network node for stream-based distribution over an unmanaged/managed network. In one embodiment, the CMZF container structure may be based on an MPEG Transport Stream (MPEG-TS) container format extended to include a modified Program-Specific Information (PSI) metadata structure configured to add extra elementary stream (ES) definitions corresponding to carriage of one or more following stream types: one or more ISO Base Media File Format (ISOBMFF) track and track metadata data objects as Packetized Elementary Stream (PES) payload containing data specific to the CMZF-formatted media content in a valid CMZF stream scheme with one or more encryption schemes, and one or more sample variants track data and track metadata objects as PES payload containing data specific to the CMZF-formatted media content in a valid CMZF stream scheme with one or more encryption schemes.

In another aspect, an embodiment of a system or apparatus configured as a network element is provided for facilitating CMZF containerization of media content. The claimed embodiment comprises, inter alia, one or more processors and a plurality of network interfaces configured to receive media content assets from one or more content sources. An encoder is provided for generating a plurality of bitrate representations for each media content asset, which may be segmented by a segmenter module. An encryptor is configured to encrypt bitrate representations of a media content asset using one or more encryption schemes. One or more persistent memory modules are provided with program instructions stored thereon, which, when executed by the one or more processors, perform the following: processing the media content asset for packaging in a CMZF container structure, thereby generating CMZF-formatted media content in a suitable valid CMZF stream scheme, the CMZF container structure configured to carry each bitrate representation of the media content asset encrypted in one or more encryption schemes; providing the CMZF-formatted media content asset to an origin server for file-based distribution over an unmanaged/managed network forming a first network infrastructure; and providing the CMZF-formatted media content to a streaming network node for stream-based distribution over an unmanaged/managed network forming a second infrastructure. In one example implementation, the CMZF container structure may be based on an MPEG Transport Stream (MPEG-TS) container format extended to include a modified PSI metadata structure configured to add extra elementary stream (ES) definitions corresponding to carriage of one or more stream types, with one or more encryption schemes as set forth above. Preferably, one or more extra ES definitions may be configured to define additional PES streams, each having a separate Packet Identifier (PID), for carriage of at least one of the ISOBMFF track and track metadata data objects in the PES payload and/or the sample variants track data and track metadata objects in the PES payload. In an example embodiment, the media content assets may comprise at least one of live TV content, IPTV content, time-shifted (TS) TV content, place-shifted (PS) TV content, gaming content, and Video on Demand (VOD) content, ABR content, Virtual Reality (VR) content, and user equipment (UE) device metadata content.

In a further aspect, an embodiment of a system or apparatus configured to operate as an edge media router (EMR) component in a hierarchical network architecture is disclosed. The claimed embodiment comprises, inter alia, one or more processors and a network interface operative to receive a media content asset packaged in a CMZF container structure, wherein the media content asset is provided as CMZF-formatted media content in a valid CMZF stream scheme, the CMZF container structure configured to carry CMZF-formatted media content, with each bitrate representation of the media asset encrypted in one or more encryption schemes at an upstream node such as, e.g., a national/regional headend node. One or more persistent memory modules are provided with program instructions stored thereon which, when executed by the one or more processors, perform repackaging of the media content asset to generate one or more output formats without reencrypting the media content asset, the one or more output formats being compatible with storage and/or distribution. In one embodiment, the output formats comprise a format compatible for processing and/or consumption by at least one of a premises gateway node, a set-top-box (STB), and a user equipment (UE) device.

In a further variation, the program instructions of an EMR component may further comprise instructions for repackaging or transformatting the media content asset into an output format for facilitating local storage of the media content asset while retaining the encryption scheme(s) performed at the headend node. Example delivery formats output by an EMR component may include, but not limited to: HTTP Live Streaming (HLS), HTTP Dynamic Streaming (HDS), Dynamic Adaptive Streaming over HTTP (DASH), HTTP Smooth Streaming (HSS), Common Media File Format (CMAF), ISOBMFF, as well as MPEG-TS, Real-time Transport Protocol (RTP)-encapsulated MPEG-TS, RTP/MPEG-TS over ISOBMFF, and RTP/MPEG-TS with Encoder Boundary Point (EBP) or virtual segmentation information, e.g., as referenced in [http://www.ibc.org/_media/PDF/alex_giladi_passing_the_tuning_test_providin g_cableequivalent_adsupported_linear_progra1.pdf], incorporated by reference herein.

In a still further aspect, embodiments of a system and method for facilitating Fast Channel Change (FCC) or Instant Channel Change (ICC) in a streaming media network are disclosed. An example embodiment comprises, inter alia, receiving a plurality of media content assets associated with a corresponding plurality of channels, each media content asset packaged using a CMZF container structure, wherein the media content asset is provided as CMZF-formatted media content in a valid CMZF stream scheme configured to carry each bitrate representation of the media content asset encrypted in one or more encryption schemes at an upstream node such as, e.g., a national/regional headend node. The received CMZF-packaged media content assets corresponding to the plurality of channels are transformatted or otherwise repackaged into corresponding CMZF segments. In one arrangement, transformatting of the media content assets into CMZF segments retains the encryption of media performed at the upstream node. Transformatted CMZF segments corresponding to the plurality of channels may be stored in a local cache. Responsive to determining that a channel change request is received from a UE device to change to a channel for receiving a particular media content asset, a unicast or multicast burst of Reliable User Datagram Protocol (R-UDP) packets or Real-time Transport Protocol (RTP)-encapsulated partial or full virtual segments (R-SEG) generated from the CMZF segments corresponding to the particular media content asset are transmitted for commencing the channel. In one variation, the channel change request may be received or generated as a UDP request for R-UDP packets. In another variation, the channel change request may be received or generated as an HTTP or UDP request for R-SEG segments.

In a still further aspect, embodiments of a system and method for distributing content with end-to-end encryption in a media network are disclosed, which may be provided independent of and/or in conjunction with CMZF containerization of the present invention. A main track of a media content asset may be encrypted using a first encryption scheme. A sample variant track of the media content asset may be encrypted using a second encryption scheme. Appropriate program instructions or module may be configured, e.g., at a headend or upstream node, to perform at least one of: storing the encrypted main track and encrypted sample variant track of the media content asset packaged in a storage format, e.g., any of the container formats set forth in detail hereinbelow, and transmitting the encrypted main track and the encrypted sample variant track in a distribution container format to an EMR device configured to repackage the media content asset into a delivery container format without reencrypting the media content asset. In one arrangement, the delivery container format may comprise a format compatible for processing by at least one of a premises gateway node, a set-top-box (STB), and a user equipment (UE) device.

In one variation, the distribution container format may comprise at least one of an ISO Base Media File Format (ISOBMFF) container format, an ISOBMFF carried in a Packetized Elementary Stream (PES) payload of an MPEG-TS elementary stream, an MPEG-TS elementary stream container format, and an MPEG-TS elementary stream with media content asset sample variants track data and track metadata in the PES payload. In yet another variation, the distribution container format may be adapted to carry the media content asset encrypted in one or more encryption schemes using a valid CMZF stream scheme, e.g., in a CMZF container format. In a further embodiment, one or more encryption schemes (e.g., a first and second encryption schemes) may comprise at least one of a Common Encryption (CENC and CENS-TS) protection scheme using Advanced Encryption Standard (AES) 128-bit keys in Counter mode (CTR), a CENC protection scheme using AES 128-bit keys in Cipher-block chaining mode (CBC), a CENC CTR mode using a sub-sample pattern of unencrypted bytes and encrypted bytes of the media content asset's audio/visual (A/V) data ('cens' scheme), a CENC CBC mode using another sub-sample pattern of unencrypted bytes and encrypted bytes of the media content asset's A/V data ('cbcs' scheme), a CENC CBC mode using another sub-sample pattern of unencrypted bytes and encrypted bytes of the media content asset's A/V data ('cbcs' scheme), a CENC-TS mode "cf" using a sub-sample pattern encryption scheme with AES 128-bit keys in CBC mode, and a CENC-TS mode "cf" using a sub-sample pattern encryption scheme with AES-128 bit keys In CTR mode.

In a still further aspect, embodiments of a system and method for processing main tracks and sample variant tracks of media content assets are disclosed. Encrypted media content having an encrypted main track and one or more sample variant tracks may be received, for example in at least one of an ISO Base Media File Format (ISOBMFF) container format, an ISOBMFF carried in a Packetized Elementary Stream (PES) payload of an MPEG-TS elementary stream, an MPEG-TS elementary stream container format, and an MPEG-TS elementary stream with media content asset sample variants track data and track metadata in the PES payload, having one or more encryption schemes. An example method involving playback of encrypted main track and sample variants may comprise, inter alia, receiving a main track of a media content asset using a first encryption scheme and receiving a sample variant track of the media content asset using a second encryption scheme. Example alternative or additional embodiments may use sample variants to convey Virtual Reality (VR) slices, Augmented Reality (AR) metadata, UE device specific metadata etc. An example method may further comprise, inter alia, determining that a decoder does not have access to the main track of a media content asset received at the decoder, e.g., responsive to a content request generated from a UE device. Responsive to the determination, an unencrypted Variant Constructor is obtained, which is signaled in a distribution container format as sample variant metadata that defines how to assemble an individual sample variant with respect to the media content asset. Each Variant Byte Range in a sequence of Variant Byte Ranges defined in the unencrypted Variant Constructor is processed to assemble a variant media data sample track. The assembled variant media data sample track is then decrypted using a media key defined in a metadata structure associated with the unencrypted Variant Constructor. In one arrangement, the main track of the media content asset and the variant media data sample track are encrypted at a headend node using, respectively, a first encryption scheme and a second encryption scheme having respective Key Identifiers (KIDs). In a still further arrangement, the decrypted variant media data sample track may be provided to a media player associated with the UE device for rendering the media content asset. In a still further arrangement, a sample variant track extractor can be used to construct the sample variant media track from the main track and sample variant track metadata and media data.

Benefits of the present invention include, but not limited to, providing a network architecture and associated systems and methods wherein substantical savings in bandwidth and storage costs for media distribution may be realized in a service provider network while supporting an ABR workflow, especially in view of single media preparation provided for both STBs and reach devices according to the embodiments herein. In addition, example embodiments disclosed herein advantageously leverage existing TS-based distribution networks and associated scalable workflow infrastructure, utlizing multicast and ad-insertion facilities in a particular implementation.

Moreover, an embodiment of the present invention in accordance with the teachings herein can also enable efficient distribution and storage of content encrypted in one or more encryption schemes, thereby maintaining the integrity of end-to-end content encryption. As will be seen in further detail below, multiple encyption schemes may be carried in such a way that only subsample partially encrypted data is transported in sample variant streams, thereby providing the advantage of multi-encryption carriage with little or negligible overhead. Additional benefits and advantages of the embodiments will be apparent in view of the following description and accompanying Figures.

In still further aspects, one or more embodiments of a non-transitory computer-readable medium or distributed media containing computer-executable program instructions or code portions stored thereon are disclosed for performing one or more embodiments of the methods of the present invention when executed by a processor entity of a network node, element, virtual appliance, UE device, and the like, *mutatis mutandis*. Further features of the various embodiments are as claimed in the dependent claims.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIGS. 14A-1, 14A-2 to 14D are flowcharts of various steps, blocks or acts that may be combined or arranged into one or more embodiments for facilitating distribution of content with end-to-end encryption in an example streaming network according to the teachings of the present patent application;

FIGS. 21A-21C depict an example CMZF manifest according to an embodiment of the present invention.

DETAILED DESCRIPTION OF THE DRAWINGS

Figure 1:
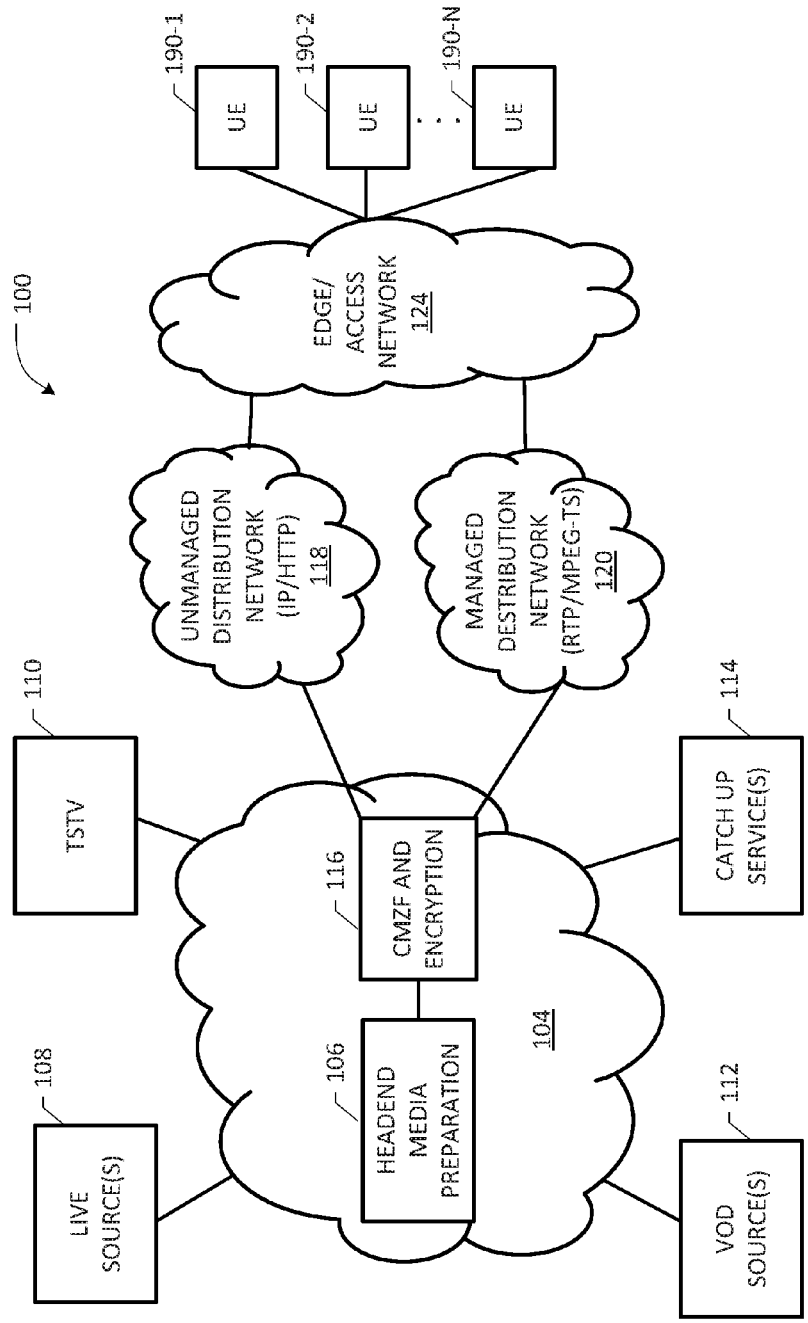
FIG. 1 depicts a generalized example network architecture for facilitating media distribution using a common mezzanine distribution format (CMZF)-based containerization scheme according to one or more embodiments of the present patent application.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element may be programmed for performing or otherwise structurally arranged to perform that function.

As used herein, a network element, node or subsystem may be comprised of one or more pieces of service network equipment, including hardware and software that communicatively interconnects other equipment on a network (e.g., other network elements, end stations, IP-STBs, STBs, etc.), and is adapted to host one or more applications or services, either in a virtualized or non-virtualized environment, with respect to a plurality of subscribers and associated user equipment that are operative to receive/consume content in a media streaming network where media content assets may be distributed and delivered using stream-based or file-based mechanisms. As such, some network elements may be disposed in a wireless radio network environment whereas other network elements may be disposed in a public packet-switched network infrastructure, including or otherwise involving suitable content delivery network (CDN) infrastructure. Further, suitable network elements including one or more embodiments set forth herein may involve terrestrial and/or satellite broadband delivery infrastructures, e.g., a Digital Subscriber Line (DSL) network architecture, a Data Over Cable Service Interface Specification (DOCSIS)-compliant Cable Modem Termination System (CMTS) architecture, switched digital video (SDV) network architecture, a Hybrid Fiber-Coaxial (HFC) network architecture, a suitable satellite access network architecture or a broadband wireless access network architecture over cellular and/or WiFi connectivity. Accordingly, some network elements may comprise "multiple services network elements" that provide support for multiple network-based functions (e.g., A/V media delivery policy management, session control, QoS policy enforcement, bandwidth scheduling management, content provider priority policy management, streaming policy management, and the like), in addition to providing support for multiple application services (e.g., data and multimedia applications). Example subscriber end stations or client devices may comprise various streaming-capable devices that may consume or deliver media content assets using streaming and/or file-based downloading technologies, which may involve some type of rate adaptation in certain embodiments. Illustrative client devices or user equipment (UE) devices may therefore include any device configured to execute, inter alia, one or more streaming client applications for receiving, recording, storing, and/or rendering content, live media and/or static/on-demand media, from one or more content providers, e.g., via a broadband access network, in accordance with one or more file-based ABR streaming technologies such as, e.g., Microsoft® Silverlight® Smooth Streaming, HTTP streaming (for instance, Dynamic Adaptive Streaming over HTTP or DASH, HTTP Live Streaming or HLS, HTTP Dynamic Streaming or HDS, etc.), Icecast, and so on, as well as MPEG Transport Stream-based streaming over Real-time Transfer Protocol (RTP) networks. Accordingly, such client devices may include legacy set-top boxes (STBs), Next Generation IP-based STBs, networked TVs, personal/digital video recorders (PVR/DVRs), networked media projectors, portable laptops, netbooks, palm tops, tablets, smartphones, multimedia/video phones, mobile/wireless user equipment, portable media players, portable gaming systems or consoles (such as the Wii®, Play Station 3®, etc.) and the like, which may access or consume content/services provided via an end-to-end encrypted media distribution network using a common intermediary distribution container format in accordance with to one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is a generalized example network architecture 100 for facilitating media delivery using a common mezzanine distribution format (CMZF)-based containerization process or scheme according to one or more embodiments of the present patent application. As will be seen in detail hereinbelow, embodiments involving the CMZF containerization scheme of the present invention advantageously provide an efficient mechanism for distribution of encrypted/protected media content assets using a single intermediary distribution container structure, referred to herein as CMZF container structure, for facilitating carriage of CMZF-formatted media content in one or more valid CMZF stream schemes, that is configured to be transformed with relatively low overhead into several delivery formats without the need for transcoding and/or re-encryption with respect to effectuating client delivery for consumption. As will be described in further detail below, an example embodiment of a CMZF container structure may be based on an MPEG Transport Stream (MPEG-TS) container format extended to include a modified Program-Specific Information (PSI) metadata structure configured to add extra elementary stream (ES) definitions corresponding to carriage of one or more following stream types: one or more ISO Base Media File Format (ISOBMFF) track and track metadata data objects as Packetized Elementary Stream (PES) payload containing data specific to the CMZF-formatted media content in a valid CMZF stream scheme with one or more encryption schemes, and one or more sample variants track data and track metadata objects as PES payload containing data specific to the CMZF-formatted media content in a valid CMZF stream scheme with one or more encryption schemes.

In general, two different types of distribution methodologies may be provided for utilizing an embodiment of the CMZF container scheme in the example network architecture 100. A file-based multicast ABR (MABR) methodology may involve IP/HTTP content distribution network infrastructure wherein CMZF-packaged media segment files are distributed using multicast transmission. One skilled in the art will recognize that error recovery may be performed at the segment-level with this distribution method, resulting in efficient scaling for "crowd-spiking", using multicast and unicast traffic, for example. A second distribution methodology involves stream-based multicast, where CMZF segments are delivered also using multicast but streamed at the level of RTP packets (e.g., RTP-over-MPEG-TS packets) where error recovery is at the packet level. It will be appreciated that this scheme is particularly suitable for multicast distribution using the extensive multicast MPEG-TS streaming network infrastructure currently deployed by service providers, thereby leveraging scalable and reliable workflows in a managed delivery environment. Since ABR TV media delivery requires a network architecture that can efficiently transport media to the edge network where it can be delivered to the clients in a format best suited to the client and the network, embodiments of the present invention can be advantageously implemented wherein expected TV Key Performance Indicators (KPIs) such as ad insertion, fast channel change (FCC) or instance channel change (ICC), network DVR/PVR, etc., may be maintained while supporting ABR delivery needs as well as utilizing existing service provider TV infrastructure, as will be set forth in additional detail further below, whereby expected KPIs are maintained for both TV/STB and ABR clients. In another embodiment, a CMZF stream of the present invention may be distributed as a unicast stream from a headend to UE devices through national, metro and access networks.

As will be seen below, content may be distributed and/or delivered using either multicast techniques or unicast techniques. In a unicast mechanism, a subscribing receiver may be provided with a direct and unique two-way path through the delivery network all the way back to a serving media server supplying the required data stream. The main streaming activity is managed on a one-to-one basis between the receiver and the source server in a communication session. The network between the source server and receiver may typically comprise a series of intermediate servers installed at network nodes, which may not be directly involved in the service but only support the transfer of a packet stream. Typically, the protocols used to support the transmissions are simple forms of Internet Protocol (IP) itself augmented by one or more higher layer protocols to provide flow control. These protocols extend across the span of the network connection between the source server and a given receiver.

A unicast system can support ABR streaming, which allows some form of rate adaptation. A given service may be encoded at a selection of different bitrates (known as representations, as noted hereinabove), with synchronised boundary points at defined locations (e.g., every 50 frames). For each representation, content between successive boundary points is converted into a discrete file. Clients fetch a segment of one of the representations in turn. If a higher or a lower bit rate is required, the next segment is fetched from one of the other representations. The segments are constructed such that there is no discontinuity in decoded pictures/audio if the client switches between representations at the boundary points. This system may require a unicast two-way path between source and receiver to request files and deliver the requested files.

Multicast distribution/delivery makes more efficient use of bandwidth by sharing content streams among several receivers. Intermediate network elements (e.g., routers or switches) are now more closely involved in the service delivery such that some control and management functions are delegated from the source server. This control is supported by more extensive protocols devised for this type of application such as, e.g., Protocol Independent Multicast (PIM), Internet Group Multicast Protocol (IGMP), RTP/MPEG-TS over UDP and IP multicast for stream-based multicast, NACK-Oriented Reliable Multicast or NORM, etc. When a receiver requests a given media item or asset, the network router system finds an existing stream of that content already in the network and directs a copy of it to that receiver from a serving cable headend, a video head office or an appropriately proximal network node in an edge distribution network. That is, multicast can be all the way from a headend packager (e.g., at a national data center) to home network node edge media router (EMR) and/or STB, which are further exemplified in additional drawing figures below. The requesting receiver may be provided with the capability to join this existing stream under controlled conditions that do not adversely affect existing receivers. Any receiver in this group may also be provided with the ability to leave the stream, or pause its consumption, without affecting the others. Additionally, there may be an implementation where a video pipe delivering services to a premises is operative to deliver content to one or more progressive download clients of the premises that are designed to receive the video in bursts in a file-based mechanism. In one embodiments, UE devices (like STB, IP-STB, for example) that are consuming unicast or multicast streams may perform adaptive bitrate streaming. A given service can have multiple bitrate streams, and unicast or multicast consuming UE device (for example STB) may select a different bitrate based on the bandwidth estimation or user policy, etc.

One skilled in the art will recognize that whereas "distribution" may be generally used to describe the provisioning of media within the core network and out to the edge servers, "delivery" of the media takes place between the edge server and the client, although such terms may be somewhat interchangeably used in the context of one or more embodiments of the present application. In general, the terms "media content", "digital asset", "content file", "media segments", or terms of similar import (or, simply "content") as used in reference to at least some embodiments of the present patent disclosure may include digital assets or program assets such as any type of audio/video (A/V) content that may comprise live capture media or static/stored on-demand media, e.g., over-the-air free network television (TV) shows or programs, pay TV broadcast programs via cable networks or satellite networks, free-to-air satellite TV shows, IPTV programs, Over-The-Top (OTT) and Video-On-Demand (VOD) or Movie-On-Demand (MOD) shows or programs, time-shifted TV (TSTV) content, Catch-up service content, Virtualy Reality (VR) content, Augmented Reality (AR) content, ABR content, etc. By way of illustration, one or more live content sources 108, one or more TSTV content sources 110, one or more static/on-demand content sources 112 (e.g., VOD services and cloud/network DVR content sources), as well as Catch-up TV services 114 are shown in the network architecture 100 for serving as generalized content sources with respect to streaming media to a broad array of UE devices 190-1 to 190-N, at least some of which may be disposed in a subscriber premises and served by suitable premises equipment such as gateways, STBs, modems, etc. (not specifically shown). Media content assets from the content sources may be processed, encoded/transcoded and/or prepared by suitable media preparation facilities 106 in conjunction with CMZF packaging 116 coupled to or otherwise associated with a national data center (NDC) for transmission over a core network 104 to an unmanaged distribution network 118 and/or a managed distribution network 120. As noted previously, various types of edge networks and access networks, cumulatively referred to by reference numeral 124, may be interfaced between UEs/premises nodes and upstream network elements in the respective distribution network infrastructures for facilitating media delivery over wired and/or wireless technologies.

An example media server system associated with the network 104, e.g., at a global headend, may be configured to accept media content from live sources and/or static file sources, e.g., online content providers such as Hulu®, Netflix®, YouTube®, or Amazon® Prime, as well as VOD catalog or content providers or studios such as, e.g., Disney, Warner, Sony, etc. Media content from live sources may comprise live programming captured relative to any type of event, e.g., sporting/entertainment/gaming events, concerts, live TV shows, live news broadcasting sources, such as, for instance, national broadcasters (e.g., NBC, ABC, etc.) as well as cable broadcaster channels like Time Warner channels of CNN, ESPN, CNBC, etc., and local broadcasters, etc. In general operation, an example media preparation system 106 may be configured, under the control of one or more processors executing appropriate program code stored in a persistent memory module, to effectuate media preparation as follows. Initially, source media content is transcoded or otherwise encoded with different bit rates (e.g., multi-rate transcoding) using applicable encoder(s). For example, content of a particular media content asset or program may be transcoded into five video files using variable bit rates (or, synonymously "bitrates" or "resolutions"), ranging from low to high bit rates (500 Kbps to 10 Mbps, by way of illustration). The particular content is therefore encoded as five different "versions", wherein each bitrate is called a profile or representation. A segmentation server or segmenter is operative to divide each version of the encoded media content into fixed duration segments or chunks, which are typically between two and ten seconds in duration, thereby generating a plurality of chunk streams and/or virtual segmented streams depending on implementation. One skilled in the art will recognize that shorter segments may reduce coding efficiency whereas larger segments may impact the adaptability to changes in network throughput and/or fast changing client behavior. Regardless of the chunk size, the segments may be Group-of-Pictures (GOP)-aligned in an embodiment such that all encoding profiles have the same segments. In accordance with the teachings of the present invention, CMZF packaging 116 containerizes the media segments and/or adaptive TS streams (ATS) with virtual segmentation information to mark the segment boundaries (i.e., ATS virtual segmented media stream) into a format suitable for both file-based distribution as well as stream-based distribution to the edge nodes, which may be facilitated by appropriate media tranformatting entities disposed at different hierarchical levels of the network architecture 100, as will set forth in additional below. Furthermore, an encryption facility may be provided in association with CMZF packaging 116 with respect to effectuating encryption services for media assets using one or more encryption schemes for purposes an embodiment of the present invention, e.g., based on the type of the CMZF scheme selected.

Figure 2:
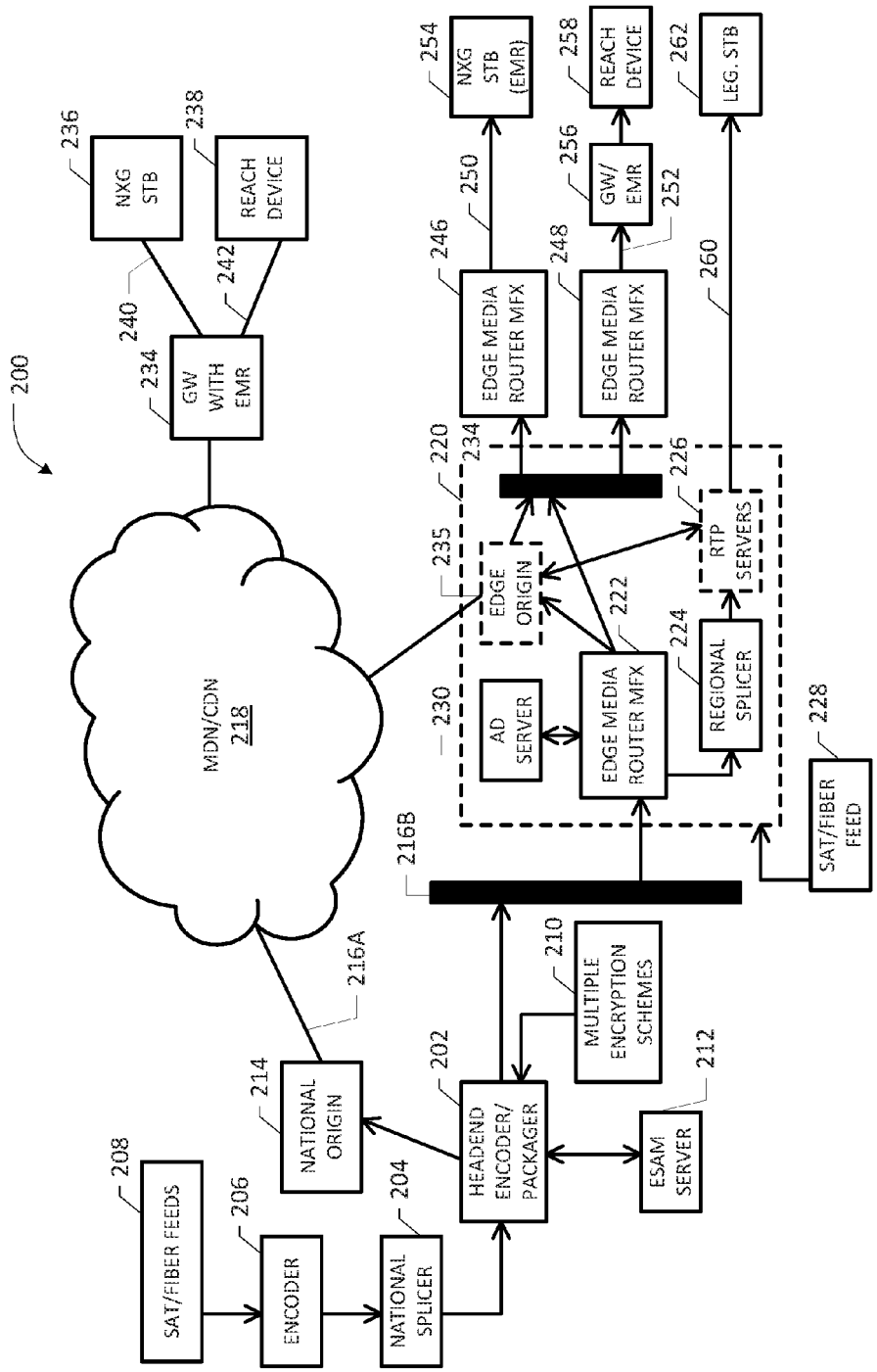
FIG. 2 depicts an aspect of the example network architecture of FIG. 1 illustrating further details relative to CMZF-based media distribution in accordance with one or more embodiments of the invention.

FIG. 2 depicts an end-to-end network arrangement 200 that illustrates an aspect of the example network architecture of FIG. 1, which exemplifies further details relative to CMZF-based media distribution in accordance with one or more embodiments of the invention. One skilled in the art will recognize that the network arrangement 200 may be hierarchically organized where a headend or super headend facility of a national data center (NDC) encodes and prepares the media, and distributes the prepared media downstream to either a regional distribution center (e.g., as part of a managed network infrastructure or a portion thereof) or a CDN origin using core or metro networks, and ultimately via one or more access networks and home/premises networks (e.g., as part of an unmanaged network infrastructure or a portion thereof) to STBs and/or reach devices (e.g., UEs configured to receive and render audio/visual media). By way of illustration, a plurality of satellite or fiber feeds 208 provide source media content corresponding to one or more channels to appropriate encoders 206, which encode/compress the media data into high quality bitrate streams, e.g., multicast streams, in a standard container format such as, e.g., MPEG2-TS or M2TS according to ISO/IEC 13818-1 (also synonymously referred to as MPEG-TS or MTS). One or more national splicers 204 may be provided in an example embodiment for inserting any secondary media content, e.g., advertisements, into the media streams before being processed by a headend encoder/transcoder/packager module 202, which may be distributed into multiple elements or components in some arrangements as part of a media server or system, and may be associated with additional nodes or elements such as ad servers (ADS), Event Signaling and Management (ESAM) servers 212, etc. Preferably, a transcoder component may be configured to generate a plurality of adaptive TS streams (ATS) as well as associated stream manifests with respect to each media content channel for multicasting, wherein ATS streams comprise specific bitrate representations of the media content asset of the channel, including encoding boundary points (EBP) or virtual segment information, secondary content signaling, e.g., SCTE 35 signaling, etc. In an additional embodiment, a multi-encryption module 210 may be configured to interface with the packager functionality of module 202, wherein each bitrate representation may be encrypted in one or more encryption schemes using suitable encryption standards, forensic marking and/or other DRM techniques. In one example embodiment, transcoder and packager functionality may be distributed among different network devices. As will be further described below, an example CMZF containerization process (e.g., operative to generate CMZF-formatted media content according to one or more valid CMZF stream schemes) of the present invention is advantageously configured to provide a distribution package structure that can accommodate media content assets encrypted with one or more encryption schemes and provide suitable downstream signaling for facilitating appropriate processing at the edge nodes, gateways, STBs, and/or reach devices. In one arrangement, the CMZF packager functionality is configured to generate media segments packaged in the CMZF container format, thereby generating CMZF-formatted media content (i.e., CZMF segments), as well as suitable metadata or manifest files for transmission via path 213 to a national origin sever 214, which may be deployed in a CDN/MDN 218 or coupled thereto via a core network portion 216A. As noted previously, CDN/MDN infrastructure 218 may be utilized for facilitating file-based distribution of CMZF-formatted media content using multicast ABR to downstream nodes, including all the way to a premises node or gateway 234 serving a subscriber premises (not specifically shown). Appropriate media transformatting (hereinafter referred to as MFX functionality), which may be provided as part of edge media routing (EMR), may be executed at the premises node 234 for repackaging the media content into suitable client delivery formats, for instance, HTTP adaptive streaming (HAS) file formats such as HLS, DASH, HDS, HSS, CMAF, etc., which will be described in additional detail further below. A suitable premises network or home network comprising wired/wireless paths 240, 242 may be provided to couple GW 234 with customer premises equipment (CPE) such as a Next-Generation (NXG) STB 236 as well as a plurality of reach devices 238. It will be recognized by skilled artisans that although NXG STB 236 is shown separately, such a device may be integrated with a networked TV, e.g., IP-connected TV display or media renderer, and may also serve other reach devices of the premises. Further, an end station such as NXG STB, reach/UE device, STB, etc., may also include an EMR component, whose structural and functionalities (e.g., for facilitating MFX as well as sample variants extractor functionality) are set forth elsewhere in the present patent application. Skilled artisans will also recognize upon reference hereto that the network infrastructure involving CDN/'MDN 218 may comprise networks involving unmanaged, managed, and/or federated network portions.

The headend CMZF packager functionality 202 may be further configured to package the source media content segments and/or virtual segments into suitable CMZF-formatted content for multicast streaming (referred to herein as MABR CMZF streams) over TS at the level of RTP packets (e.g., with or without RTP encapsulation) via a core network 216B to a service provider's regional distribution network or regional data center (RDC) 220, e.g., forming at least a portion of a managed network. Accordingly, suitable CMZF stream manifests may be provided to the service provider's TS-based network for appropriately signaling the downstream nodes and elements in order to facilitate CMZF stream processing and media transformatting at different hierarchical levels. By way of illustration, RDC 220 may be configured to accept regional level satellite and/or fiber feed media broadcasts 228 in addition to the CMZF-formatted media content from the headend node 202, wherein local feeds may be transcoded to generate suitable valid CMZF streams where applicable. One or more ad servers 230 may also be deployed to provide regional/local ad content streams. In general, a service provider's TS network may include one or more EMR components at a regional distribution level, edge/access network level as well as a premises level for appropriately processing the CMZF-formatted media content received from the upstream nodes based at least in part upon the stream control information received via CMZF stream manifests, in addition to performing media transformatting (MFX) functions relevant to the specific level where the EMR component is deployed. As shown in FIG. 2, RDC 220 is exemplified with EMR 222, which may be configured as part of an upstream network node of the provider's streaming network infrastructure. A regional splicer 224 is operative to insert regional level ad content into a transformatted output of EMR 222 that may be generated for facilitating conventional TS-based streaming via servers 226 to traditional or legacy STBs 262 using RTP-based delivery infrastructure 260. EMR 222 may be further configured to generate additional formats from the incoming CMZF-formatted media content and/or regional media feeds for caching at a regional level origin server 235 that can interface with CDN/MDN infrastructure 218 and/or inject the additional formats into a regional TS backbone 234 for downstream distribution. Further, edge origin server 235 may also interface with conventional RTP-based servers 226 for facilitating retrieval of media segments with respect to effectuating segment recovery/repair and channel change functionality for legacy STBs, NXG STBs, e.g., based on R-UDP as will be described in additional detail further below.

Downstream nodes 246, 248 are illustrative of edge/access network nodes having EMR and MFX functionality that can receive MABR CMZF streams and stream manifests over TS from the regional distribution backbone network 234. Depending on the type of UE devices and deployment of the access network infrastructure, an EMR component such as EMR 246 may perform appropriate media transformatting processes and provide the media content assets in suitable delivery formats directly to a Next Generation STB 254 via a delivery path 250, which may comprise a stream-based multicast path all the way to the STB, and unicast for repairs and ICC/FCC. For time-shifted services, VOD, NPVR services, etc., a file based delivery path may be employed in an implementation. In another arrangement, an EMR component such as EMR 248 may be configured to interface with a premises gateway node 256 via stream-based path 252, which gateway node 256 may be provided with suitable EMR functionality for ultimately serving a reach device 258.

One skilled in the art will appreciate that a high-level overview of a hierarchical network architecture, e.g., network architecture 200, may be set forth as follows. In the foregoing architecture, an NDC may contain the encoding facilities as well as transcoder and packager functionality in addition to the origin server of the CDN. The transcoder creates ATS streams and the corresponding manifest files while the packager distributes CMZF streams over TS (and CMZF manifests) to one or more RDCs, where the TS-based ad insertion facilities may perform ad-splicing. Further, nDVR storage services may also be effectuated at this level. The CMZF streams may be carried via RTP multicast to STBs and EMRs for transformation to delivery formats for consumption by NXG STBs (e.g., supported by a service provider IPTV) or reach devices over appropriate network delivery workflows as will be set forth below. It should be appreciated that the use of RTP multicast to STBs allows for retaining traditional KPIs for Pay TV experiences such as ICC/FCC, end-to-end stream latency, etc. The packager simultaneously creates CMZF segments/manifests that may be sent to the national origin for unmanaged distribution, using file-based unicast/multicast distribution in an example arrangement, to the edge devices (STBs/EMRs) for transformation to delivery formats for consumption by the OTT STBs or reach devices. Preferably, a core network connects the NDC to the RDC as well as the CDN origin servers for OTT distribution. In one arrangement, the NDC-RDC connection is a dedicated backbone over which CMZF streams are multicast to the receiving endpoints, which for purposes of some embodiments are the EMRs that can perform packaging and routing functions to ad-splicers, nDVR servers and regional origin servers. At the edge delivery network level, CMZF streams in the RDC can be multicast to the edge nodes using available RTP multicast facilities or via mechanisms such as M-ABR. The multicast is received at edge by downstream EMRs (typically edge packagers) for conversion of CMZF-formatted media content to appropriate delivery formats. In addition, the EMRs create segments from the CMZF stream to send to edge caches. At the access network level, suitable network infrastructure connects the edge nodes to the home gateway nodes. The edge caches may be directly accessed by the home devices either by unicast (for repairs or time-shifted viewing) or multicast. On the other hand, CDNs typically connect to the reach devices over the unmanaged Internet in the case of OTT delivery, where, as one skilled in the art will appreciate, an Internet Service Provider (ISP) or mobile network operator (MNO) may have a cache in its infrastructure.

As mentioned above, the home gateways may also be configured to operate as EMR components, particularly because of the low requirements of transformatting CMZF streams. Skilled artisans will recognize upon reference hereto that by providing a single common distribution packaging as set forth herein, it is possible to streamline delivery all the way to the last possible point before converting to an unmanaged delivery to reach devices in the home. In addition, EMR functionality can be embedded in an STB to consume the CMZF streams or segments and provide ABR segments in delivery formats using a local cache on the STB for consumption by both STB native player and reach devices in the home. It should be appreciated that in an unmanaged ABR TV media delivery, the key difference is the absence of any pre-defined bandwidth or latency KPI. Instead, delivery is on a "best-effort" basis; consequently, there may be no pre-set delivery constraints imposed by network engineering, in a filed-based MABR delivery, for example. As further illustrated above, Internet breakouts in an example network architecture can be from the NDC, the RDC, or both, where origin server(s) may be located in the service provider (SP) network or CDN for a pull- or push-type CDN distribution respectively. The CMZF segment files may be further distributed by the CDN using its own distribution architecture in some implementations. It will be appreciated that various improvements to performance such as file-level multicast and cut-through caching may be employed in additional embodiments to further reduce latency and optimize bandwidth usage, as well as effectuate ICC/FCC from a local repair server for file-based MABR use case scenarios as set forth elsewhere in the present patent application.

To facilitate the foregoing media distribution architecture, a CMZF container format is advantageously provided, which in an example embodiment comprises a packaging structure based on MPEG-TS container format extended according to the teachings herein, where carriage of both TS and additional streams having new stream definitions for purposes of the present invention may be effectuated. In one implementation, MPEG-TS extensions may be configured to carry ISOBMFF track data and track metadata data objects (referred to as "boxes" in the ISO/IEC 14496-12 standard) with new stream IDs, stream types, descriptors, etc. Additional extensions to the MPEG-TS standard (ISO 13818-1) according to further embodiments of the present invention involve extensions to EBP or virtual segmentation information as well as extensions to support sample variant elementary streams and sub-segment information. In further embodiments, extensions to the ISOBMFF standard relating to Sample Variants (ISO 23001-12) are provided to support carriage of media encrypted in one or more encryption schemes. In still further embodiments, extensions to ISO 23001-7 are provided to support pattern-based encryption in Common Encryption (CENC) scheme types in ISOBMFF boxes carried in CMZF-based containerization. In additional or alternative embodiments, extensions to support one or more encryption schemes in MPEG-TS according to ISO 23001-9 are also be provided that may be used together with or independent of ISOBMFF sample variant extensions in an example CMZF containerization scheme. Still further embodiments relate to extensions to R-UDP to support virtual segmented RTP/TS streams for purposes of segment recovery/repair as well as ICC/FCC in an example CMZF-based media network architecture. At least one or more of the foregoing standards/specifications are incorporated by reference herein for purposes of some embodiments of the present invention.

Broadly, in an example implementation of CMZF containerization, CMZF streams may be treated as a collection of MPEG-TS elementary streams that carry different types of data. Typically, MPEG-TS elementary streams are used to carry A/V samples such as, e.g., A/V Adaptive Transport Streams (ATS), H264/AVC Video elementary streams, Audio elementary streams, etc., which may be encapsulated into Packetized Elementary Streams (PES). As set forth in ISO 13818-1, incorporated by reference herein, Transport Streams may be logically constructed from PES packets, which may comprise one or more programs, each described according to a Program Map Table (PMT) that may be provided as part of a metadata structure, Program-Specific Information (PSI) table, contained in TS payload. PSI is typically carried in the form of a table structure and provides metadata about a program (i.e., a media content channel). Each PSI table structure may be segmented into sections and can span multiple TS packets. Adaption Fields (AF) may also be provided in TS packets carrying PSI data. In general, the PSI data is not scrambled so that a receiving decoder can easily identify the properties of a stream for processing.

The PSI data defined by ISO 13818-1 includes four tables: Program Association Table (PAT); Conditional Access Table (CAT); Network Information Table (NIT), as well as the PMT structure noted above. PAT lists all programs carried in a TS, each of the listed programs having a program number. Each listed program has a unique identifier (Program Identifier or PID) in a corresponding PMT that contains information about the program. There may be multiple PMT sections in a stream; each section is given a unique user-defined PID and maps a program number to the metadata describing that program and the streams within it. The streams themselves may be contained in PES packets with PIDs specified in the PMT. Each program element descriptor in a transport stream table may be defined by an 8-bit descriptor tag. Further, each elementary stream in a transport stream may be identified by an 8-bit elementary stream type assignment. In one example implementation of the present invention, additional elementary stream types may be defined by using privately defined assignments for carrying additional streams related to CMZF. Accordingly, an example embodiment of CMZF containerization extends ISO 13818-1 elementary stream definitions to carry additional stream types by modifying the PSI metadata structure, wherein the additional elementary streams are carried in their own PID. Thus, it will be realized that PAT/PMT tables of a PSI structure may be extended/modified to include example new elementary stream types and/or PMT descriptors for facilitating one or more of the following: carriage of protected A/V data—with multiple common encryption schemes; carriage of A/V content that can be transformatted to different ABR delivery formats; carriage of A/V content in the format that are suitable for storage; A/V media data carried in the ISOBMFF format (which in some implementations may also be referred to as Common Media Application Format or CMAF); VOD/Time-Shifted content stored in mezzanine format (i.e., CMZF), etc.

Figure 3:
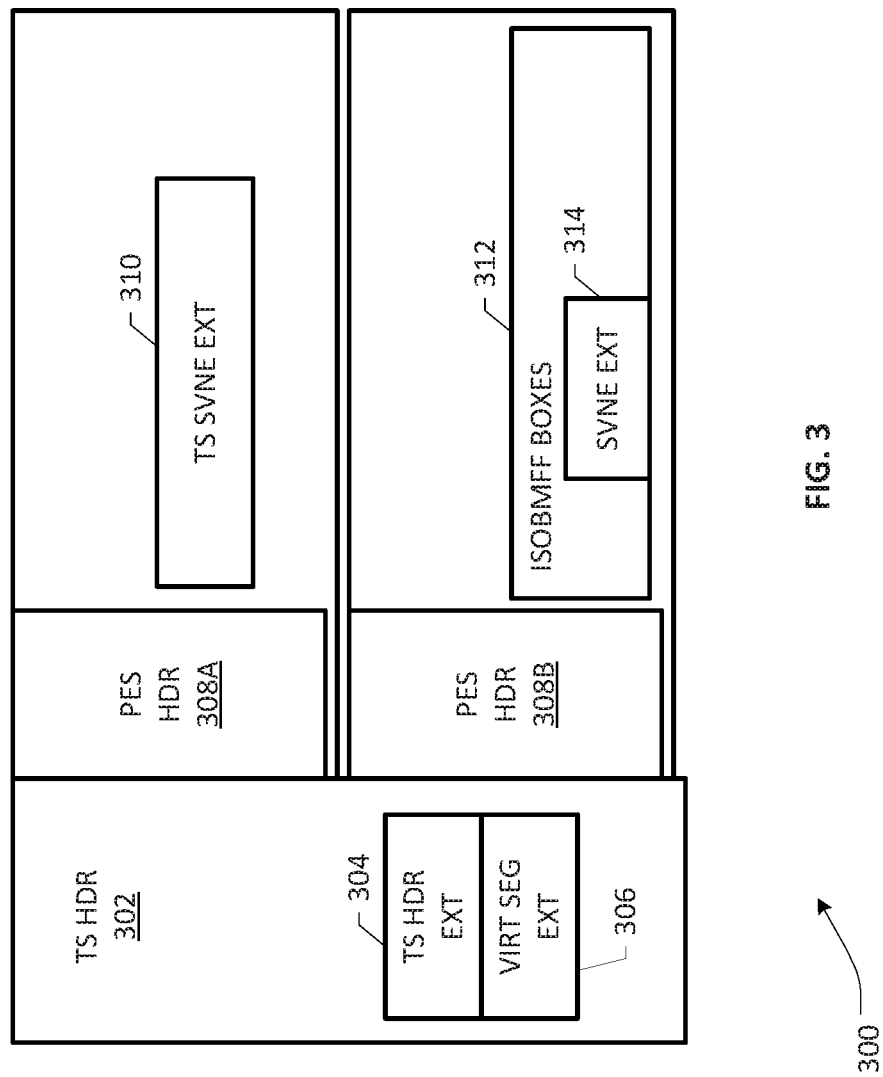
FIG. 3 depicts an example high-level CMZF container scheme based on MPEG-TS container format modified in accordance with one or more embodiments of the invention.

FIG. 3 depicts an example high-level CMZF container structure 300 according to the scheme set forth above based on MPEG-TS container format modified for purposes of one or more embodiments of the present invention. An MPEG-TS header 302 is modified to include a plurality of extensions 304 and/or virtual segmentation (VSEG) extensions 306 depending on a specific CMZF stream scheme implementation as will be set forth in additional detail hereinbelow. As will be appreciated, extensions to VSEG, e.g., like sub-segment information, may include or relate to metadata about key and other frames in a stream. In one embodiment of an example CMZF container structure, PES header portion 308A may include or otherwise associated with TS sample variant extensions 310 for facilitating normalized encryption according to certain implementations (i.e., support of TS-based sample variants and one or more encryption schemes). PES header portion 308B may be include or otherwise associated with extensions for facilitating carriage of ISOBMFF boxes 312 (e.g., track data and/or track metadata objects) in additional stream types may be augmented in an MPEG-TS container format. In a further variation, ISO 23001-12 may be extended to facilitate carriage of media data encrypted using one or more encryption schemes using ISOBMFF boxes, which may comprise ISOBMFF-specific extensions 314 that may also be included in an example CMZF container structure. As noted above, additional extensions pertain to EBP or virtual segmentation signaling in TS streams and support of TS-based sample variants may also be provided in an example CMZF container structure according to a specific CMZF stream scheme as will be set forth further below in additional detail.

As at least some example embodiments of the present invention particularly relate to ISOBMFF, a brief overview is set forth immediately below. ISOBMFF defines a general container or wrapper structure in a flexible, extensible format that facilitates interchange, management, editing and presentation of time-based multimedia files such as audio and video, which may form a basis for other container formats, wherein the presentation may be local, or via a network or other file-based delivery mechanism. In general, the media file format sets forth an object-oriented file structure and contains the timing, structure, and media information for timed sequences of media data, such as audio-visual presentations. A file can be decomposed into basic objects wherein the structure of the objects may be implied from their type. Files conforming to the ISOBMFF standard (ISO/IEC 14496-12, incorporated by reference herein) are formed as a series of objects, called "boxes" as previously noted. All data is contained in boxes and there may be no other data within the file. The "box" is object-oriented building block defined by a unique type identifier and length. A presentation (motion sequence) may be contained in several files. All timing and framing (position and size) information must be in the ISO base media file and the ancillary files may essentially use any format to the extent they are capable of description by the metadata defined in ISO base media file format. In order to identify the specifications to which a file based on ISOBMFF complies, brands are used as identifiers in the file format. They are set in a box named File Type Box ("ftyp"), which must be placed in the beginning of the file. A file that supports streaming includes information about the data units to stream (e.g., how to serve the elementary stream data in the file over streaming protocols). This information is placed in additional tracks of the file called "hint" tracks. Separate "hint" tracks for different protocols may be included within the same file. Additional boxes relating to streaming include "moov" box, "mdat" box, "moof" box, etc., which will be further described in reference to example CMZF stream types below.

In one embodiment, MPEG-TS with EBP or virtual segmentation information may be provided at TS packet header level in an Adaptation Field (AF), and include signaling segment information, boundary markers (e.g., Encoder Boundary Points or EBPs), Timeline for External Data or TEMI wall clock information, ad markers, etc. Carriage of boundary and labeling descriptors may be provided to indicate a boundary type for seamless content splicing or switching in the applications of ad insertion, cloud DVR/PVR recording and segmentation of ABR streaming. For example, an AF descriptor may be provided for EBPs and label descriptors as noted above. A PMT may be extended to indicate a Segmentation descriptor. A TEMI descriptor may be utilized for synchronizing MPEG media presentation with external timelines, e.g., wall clock time stamps on the boundary points. In one embodiment, extensions to MPEG-TS with EBP or virtual segmentation information may be provided at TS packet header level in an Adaptation Field (AF) and include sub-segment information, individual frame information (for I/B/P frames).

As noted above, MPEG-TS with ISOBMFF-based elementary streams include carriage of ISOBMFF boxes (PES with ISOBMFF boxes) as well as carriage of moov, moof and other boxes in MPEG-PES using a new stream ID, e.g., as CMAF over TS or ISOBMFF over TS. With respect to TS sample variants, a separate PID is provided for each SV elementary stream, wherein carriage of A/V sample variants' media data is accomplished in corresponding PES. Additionally, ISO 13818-1 and ISO 23001-9 are extended to signal a separate encryption scheme for each SV elementary stream. Likewise, ISOBMFF sample variants may be carried via corresponding PESs. New PMT stream types and descriptors, new PES stream IDs, etc. may therefore be provided in the modified PSI of an example CMZF container structure.

In the TS sample variant streams, packet-based encryption may be effectuated for encrypting different variant streams using one or more encryptions. It will be appreciated that for a TS stream, there can be a main elementary stream and one or more associated sample variant elementary streams. According to an example embodiment, the associated sample variant elementary stream may have media sample encrypted with different encryption scheme(s). With the sub-sample encryption scheme, only part of the stream is encrypted and only part of the stream is duplicated in the sample variant stream. Packets may therefore have both clear data and encrypted data, which may be differentiated based on appropriate range descriptors, thus supporting one or more encryption schemes in the same CMZF stream having different TS elementary stream. An example implementation may involve one scheme per MPEG-TS packet and one scheme per elementary stream.

Although multiple types of extensions are illustrated in the example CMZF container structure of FIG. 3, one skilled in the art will recognize that not all extensions need to be present in a particular CMZF containerization scheme. For example, carriage of protected A/V media data with one or more encryption schemes may be implemented using ISOBMFF extensions pertaining to sample variants or using MPEG-TS extensions, e.g., sample variants extensions to a video TS elementary stream. Furthermore, carriage of the multi-encrypted A/V media data may be implemented without using CMZF-based containerization in an example implementation (e.g., by implementing the applicable extensions to ISOBMFF and MPEG-TS container formats, respectively). Accordingly, it should be appreciated that a number of independent embodiments may be obtained by combining the foregoing features in different ways.

In the network architecture of FIG. 2, multiple multicast ABR CMZF streams may be used for facilitating efficient distribution of ABR TV channels or media from the headend to edge/home network using the CMZF containerization set forth above, where each multi-bitrate CMZF stream is a collection of one or more MPEG-TS elementary streams including the new stream types as described. As noted previously, CMZF manifests define the CMZF streams' resources, which are provided to downstream nodes for appropriate processing including transformatting of the received media data. In one example embodiment, CMZF manifests may be based on DASH MPD with extended namespaces. In another embodiment, CMZF manifests may be based on HLS m3u8 index file structure with proper extensions to define the CMZF streams. FIGS. 21A-21C illustrate an example CMZF manifest file as a media presentation description (MPD) document according to an embodiment with respect to a particular CMZF stream scheme set forth hereinbelow. Broadly, a CZMF manifest generated by an upstream packaging entity (e.g., at a national/regional headend) may be configured to include parametric information defining stream characteristics such as, e.g., multicast address and UDP port for each ABR representation of a media content asset (provided as multicast CMZF streams), wherein manifest elements and attributes may define CMZF stream type, CMZF elementary stream type, encryption schemes carried in/for each CMZF elementary stream, as well as media formats such as, e.g., CMAF/ISOBMFF, TS, TS-SV, CMAF track sample variants, information relating to various A/V codecs, Timed-text/data format information, and the like.

In one implementation, an ABR TV channel/media may be distributed as a bundle of multicast ABR CMZF streams wherein each bitrate representation of the media content asset may be carried in a separate multicast stream. Each bitrate multicast stream may carry one or more CMZF TS elementary streams. Each CMZF TS elementary stream preferably contains all the audio, video or A/V data and metadata to generate the required ABR-delivery-format-compliant ABR segments or ABR multicast stream at the edge device.

Skilled artisans will recognize upon reference hereto that CMZF streams are therefore a combination of traditional A/V elementary streams and CMZF elementary streams with new stream types. For purposes of effectuating different embodiments, a variety of "building block components" of CMZF streams may be provided as noted below, at least some of which have been alluded to previously: (i) Carriage of traditional A/V elementary streams; (ii) Virtual segmentation or ATS EBP information at TS packet header level; (iii) Carriage of MPEG-TS A/V Sample variants in CMZF elementary stream; (iv) Carriage of A/V sample data with one or more common encryption schemes (e.g., CBCS, and CENS, where different common encryption schemes may be carried in different CMZF elementary streams; packet level encryption signaling for one or more encryption schemes); (v) Carriage of SCTE-35, etc. messages for downstream consumption; (vi) Carriage of MPEG-TS A/V sample variants in CMZF elementary stream; (vii) Carriage of A/V ISOBMFF/CMAF boxes in MPEG-TS PES as part of a CMZF elementary stream (CMAF over TS; ISOBMFF boxes in MPEG-TS PES); (viii) CMAF/ISOBMFF A/V sample variants (different encryption schemes for each variant); (ix) Carriage of CMAF/ISOBMFF AN sample variants boxes over TS (in PES as part of CMZF elementary stream); (x) Signaling of one or more encryption schemes (for various CMZF elementary stream types).

As noted previously, CMZF streams may be provided as a collection of CMZF MPEG-TS elementary streams configured for carrying different types of data, including audio, video, stream metadata, and the like, in suitable carriage components set forth above. According to example embodiments of the present invention, one or more of the following different types of CMZF elementary streams may be provided in an illustrative media distribution network implementation: (i) CMZF ATS MPEG-TS elementary stream ("CMZF-TS-ES"); (ii) CMZF TS Sample Variant MPEG-TS elementary stream ("CMZF-TS-SV-ES"); (iii) CMZF ISOBMFF/CMAF Track over MPEG-TS elementary stream ("CMZF-FF-ES"); (iv) CMZF ISOBMFF/CMAF Initialization Segment data over MPEG-TS elementary stream ("CMZF-FF-IS-ES"); (v) CMZF ISOBMFF/CMAF Sample Variants track over MPEG-TS elementary stream ("CMZF-FF-SV-ES"); and (vi) CMZF ISOBMFF/CMAF Track Metadata (no mdata) over MPEG-TS elementary stream ("CMZF-FF-MD-ES").

In accordance with the teachings herein, a CMZF stream scheme may be defined as a particular combination of one or more CMZF elementary streams carried in a single CMZF stream. In one arrangement, example CMZF stream schemes of the present patent disclosure may be broadly classified into two categories: (a) single encryption CMZF stream schemes configured for carriage of one or more CMZF elementary streams with a single encryption scheme; and (b) multi-encryption CMZF stream schemes configured for carriage of multiple CMZF elementary streams in different encryption schemes. It should be appreciated that CMZF stream scheme arrangements that carry CMZF elementary streams with one or more encryption schemes are more advantageous for ABR media streaming because they can help optimize streaming bandwidth and storage costs of a network. Skilled artisans will further recognize that various CMZF stream scheme combinations may be obtained based on different configurations of the example CMZF elementary stream types set forth above.

Set forth below is a table illustrating a non-limiting list of different types of CMZF elementary streams (ES) that may be implemented for purposes of one or more embodiments of the present invention:

TABLE 1A

| CMZF ES Type | Description |
| --- | --- |
| CMZF-TS-ES | CMZF TS Elementary Stream |
| CMZF-TS-SV-ES | CMZF TS Sample Variant MPEG-TS Elementary Stream |
| CMZF-FF-ES | CMZF ISOBMFF/CMAF Track over MPEG-TS Elementary Stream |
| CMZF-FF-SV-ES | CMZF ISOBMFF/CMAF Sample Variants Track over MPEG-TS Elementary Stream |
| CMZF-FF-IS-ES | CMZF ISOBMFF/CMAF Initialization segment data over MPEG-TS Elementary Stream |
| CMZF-FF-MD-ES | CMZF ISOBMFF/CMAF Track Metadata (no mdata) over MPEG-TS Elementary Stream |

Set forth below is a table illustrating valid CMZF stream schemes that support single encryption schemes or one or more encryption schemes according to example embodiments of the present invention wherein the schemes identified in bold signify one or more encryption schemes, wherein in general CBCS refers to CENC "cbcs" scheme, CENS refers to CENC "cens" scheme, CENC in the table refers to CENC "cenc" scheme, CBC1 refers to CENC "cbc1" scheme:

TABLE 1B

| CMZF Stream Scheme Type | Multiple Encryption (CBC & CTR) support | Video Main Elementary Stream | Video Sample Variant Elementary Stream | Audio Elementary Stream types (All the audio samples are full sample encryptions) |
|---|---|---|---|---|
| CMAF/ISOBMFF over MPEG-TS ES bundle based CMZF stream schemes | | | | |
| CMZF-FF-CBCS-SCH | No | CMZF-FF-ES (CBCS) | No | CMZF-FF-ES (Full sample CBC) |
| CMZF-FF-CENS-SCH | No | CMZF-FF-ES (CENS) | No | CMZF-FF-ES (Full sample CTR) |
| CMZF-FF-CENC-SCH | No | CMZF-FF-ES (CENC) | No | CMZF-FF-ES (Full sample CTR) |
| CMZF-FF-CBC1-SCH | No | CMZF-FF-ES (CBC1) | No | CMZF-FF-ES (Full sample CBC) |
| CMZF-FF-CBCS-CENS-SV-SCH | Yes | CMZF-FF-ES (CBCS) | CMZF-FF-SV-ES (CENS) | CMZF-FF-ES (Full sample CBC) CMZF-FF-ES (Full sample CTR) |
| TMZF-FF-CENS-CBCS-SV-SCH | Yes | CMZF-FF-ES (CENS) | CMZF-FF-SV-ES (CBCS) | CMZF-FF-ES (Full sample CTR) CMZF-FF-ES (Full sample CBC) |
| MPEG-TS ES bundle based CMZF stream schemes | | | | |
| CMZF-TS-CBCS-SCH | No | CMZF-TS-ES (CF CBC) | No | CMZF-TS-ES (CE CBC - full sample) |
| CMZF-TS-CENS-SCH | No | CMZF-TS-ES (CF CTR) | No | CMZF-TS-ES (CE CTR - full sample) |
| CMZF-TS-CENC-SCH | No | CMZF-TS-ES (CE CTR) | No | CMZF-TS-ES (CE CTR - full sample) |
| CMZF-TS-CBC1-SCH | No | CMZF-TS-ES (CE CBC) | No | CMZF-TS-ES (CE CBC - full sample) |
| CMZF-TS-CBCS-CENS-SV-SCH | Yes | CMZF-TS-ES (CF CBC) | CMZF-TS-SV-ES (CF CTR) | CMZF-TS-ES (CE CBC - full sample) CMZF-TS-ES (CE CTR - full sample) |
| CMZF-TS-CENS-CBCS-SV-SCH | Yes | CMZF-TS-ES (CF CTR) | CMZF-TS-SV-ES (CF CBC) | CMZF-TS-ES (CE CTR - full sample) CMZF-TS-ES (CE CBC - full sample) |

TABLE 1B-continued

| CMZF Stream Scheme Type | Multiple Encryption (CBC & CTR) support | Video Main Elementary Stream | Video Sample Variant Elementary Stream | Audio Elementary Stream types (All the audio samples are full sample encryptions) |
|---|---|---|---|---|
| Combined MPEG-TS + CMAF/ISOBMFF track metadata ES based CMZF stream schemes | | | | |
| CMZF-TS-FFMD-CBCS-SCH | No | CMZF-TS-ES (CBCS) CMZF-FF-MD-ES (CBCS) | No | CMZF-TS-ES (CE CBC - full sample) CMZF-FF-ES (full sample CBC) |
| CMZF-TS-FFMD-CENS-SCH | No | CMZF-TS-ES (CENS) CMZF-FF-MD-ES (CENS) | No | CMZF-TS-ES (CE CTR - full sample) CMZF-FF-ES (full sample CTR) |
| CMZF-TS-FFMD-CENC-SCH | No | CMZF-TS-ES (CENC) CMZF-FF-MD-ES (CENC) | No | CMZF-TS-ES (CE CTR - full sample) CMZF-FF-ES (full sample CTR) |
| CMZF-TS-FFMD-CBC1-SCH | No | CMZF-TS-ES (CBC1) CMZF-FF-MD-ES (CBC1) | No | CMZF-TS-ES (CE CBC - full sample) CMZF-FF-ES (full sample CBC) |
| CMZF-TS-FFMD-CBCS-CNES-SV-SCH | Yes | CMZF-TS-ES (CBCS) CMZF-FF-MD-ES (CBCS) | CMZF-TS-SV-ES (CENS) CMZF-FF-SV-ES (CENS) | CMZF-TS-ES (CE CBC - full sample) CMZF-FF-ES (full sample CTR) CMZF-FF-ES (full sample CBC) |
| CMZF-TS-FFMD-CENS-CBCS-SV-SCH | Yes | CMZF-TS-ES (CENS) CMZF-FF-MD-ES (CENS) | CMZF-TS-SV-ES (CBCS) CMZF-FF-SV-ES (CBCS) | CMZF-TS-ES (CE CTR - full sample) CMZF-FF-ES (full sample CTR) CMZF-FF-ES (full sample CBC) |

Because CMZF elementary streams are based on the ATS-compliant MPEG2-TS elementary streams, they may be configured to carry additional signaling metadata for providing information about segment boundaries such as EBP and virtual segmentation metadata as noted above. The signaling of a stream that is comprised of EBP or virtual segmentation may also be indicated within the PMT structure.

FIGS. 4A-4G depict various packet structures configured to carry different types of elementary streams for purposes of one or more embodiments of the invention. In one embodiment, a simple arrangement of basic unencrypted CMZF ATS-compliant MPEG2-TS bitstreams may carry the following: (i) ATS compliant A/V bit streams (ISO 14496 audio/video codec bit streams) carried in MPEG2-TS elementary streams; and (ii) ATS EBP Signaling or MPEG Virtual Segments signaling. With respect to encrypted CMZF ATS MPEG2-TS elementary streams, the A/V bitstreams may be encrypted using any of the encryption schemes defined in the ISO 23001-9 specification, referred to hereafter as [CENC-TS], two example available schemes being "ce" and "cf", as shown in the example elementary stream packet structure 400A of FIG. 4A. The bitstreams can be encrypted either with full or sub-sample pattern based (partial) encryption schemes, wherein the encryption signaling may be provided according to the [CENC-TS] specification. In a use case scenario involving single full/pattern subsample encryption scheme—ATS stream only, two example implementations may be provided. For example, a [CENC-TS] CF CBC pattern encryption scheme may be similar to CENC ISO 23001-7 specification, referred to hereafter as [CENC] "cbcs" scheme (involving a sample pattern of unencrypted bytes and encrypted bytes using AES 128-key in Cipher-block chaining mode (CBC)). Another implementation may comprise a [CENC-TS] CE CTR pattern encryption scheme, similar to [CENC] "cenc" scheme (involving a sample pattern of unencrypted bytes and encrypted bytes using AES 128-key in Counter mode (CTR)).

It should be recognized that CMZF ATS-compliant streams may be used as building blocks for generating other CMZF elementary streams of higher complexity at a media packaging facility. Furthermore, an EMR component of the present invention may be configured to generate an output transformatted stream from a more comprehensive CMZF stream scheme, as will be described in detail further below. Also, unencrypted CMZF ATS streams can be played by any player that can demultiplex and decode standard MPEG2-TS bitstreams, e.g., legacy devices. Likewise, the [CENC-TS] encryption scheme based encrypted CMZF stream may be used by existing STBs which need to be suitably modified to handle the [CENC-TS] encryption scheme. Furthermore, DRM signaling may need to be updated to handle the [CENC-TS] based encryption keys.

With respect to CMZF TS Sample Variants based elementary streams, it should be appreciated that such CMZF streams may be configured to carry A/V media sample variants data in the MPEG2-TS elementary streams, with suitable extensions as set forth herein. Skilled artisans will recognize that a sample variant is an assembled media sample that may replace the original sample in the stream, which may be a base sample in some example embodiments. As will be further described in relation to additional embodiments of the present invention, CMZF TS sample variant elementary streams may be configured to carry one or more encryption schemes in a CMZF stream that may be processed by a suitable variant processor for outputting appropriate samples for decoding. In general, the elementary stream may carry a portion of the sample sequence bytes with associated sample variant byte range metadata, wherein the sample variant byte range metadata may indicate the location of sequence of variant byte range that can be used to construct the complete sample variant data. In accordance with the teachings of the present invention, a CMZF Sample Variant MPEG-TS elementary stream may be provided as a new type of MPEG2-TS elementary stream, having its stream type defined in a modified PSI structure, along with a bitstream definition for the sample variant elementary stream(s). Thus, carriage of CMZF sample variant media content elementary streams in MPEG-TS systems may be accomplished using the CMZF containerization scheme set forth hereinabove, wherein a CMZF sample variant elementary stream may be carried in its own PID, with the PMT being extended to contain suitable descriptors for describing the additional stream type, PID and other information.

In one arrangement, a CMZF TS sample variant elementary stream may be configured to carry only partial sample data, which may be encrypted with one of the encryption schemes, e.g., the [CENC-TS] based "cf" encryption scheme. As is known in the art, the "cf" encryption scheme supports pattern-based encryption. Extensions to [CENC-TS] in order to signal encryption schemes for CMZF TS sample variant elementary streams may be provided according to the embodiments set forth elsewhere in the present patent application. Typically, a CMZF TS sample variant elementary stream may be associated with a CMZF ATS elementary stream, which may or may not be encrypted. A decoder can be configured to generate a CMZF ATS stream de-multiplexing data from sample variant elementary stream and associated ATS elementary stream using the metadata from the sample variant elementary stream. Based on the sample data from the ATS stream, plus sample data from the sample variant elementary stream, plus variant metadata from sample variant elementary stream, a complete sample variant may be constructed. Because a CMZF TS Sample Variant elementary stream may carry the subsample pattern encryption scheme encrypted data (e.g., for a "cbcs" pattern where 1 out of 10 blocks of data is encrypted), only a partial amount of data may be provided in the Sample Variant elementary stream. It should be appreciated that this arrangement advantageously enables CMZF to carry one or more encryption scheme data with around 10% overhead, which can be significant as it saves enormous amount of bandwidth and storage costs while supporting carriage of A/V data with one or more encryption schemes. Furthermore, significant operating costs savings may also be realized in an example implementation due to simplified workflows. As will be seen further below, in another embodiment relating to EMR functionality, a sample variant extractor component in an EMR node or component, e.g., deployed at various network node levels as well as STBs and UE devices, may be configured to extract a complete elementary stream with data from sample variant and main elementary stream samples, which will have the data encrypted with encryption scheme of the sample variant elementary stream.

Figure 4A:
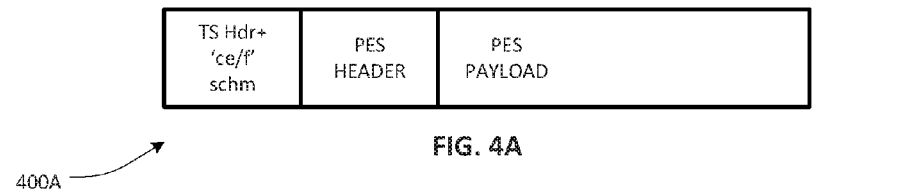
FIGS. 4A-4G depict various packet structures configured to carry different types of elementary streams that may be combined into one or more CMZF stream schemes for purposes of an embodiment of the present invention.
Figure 4B:
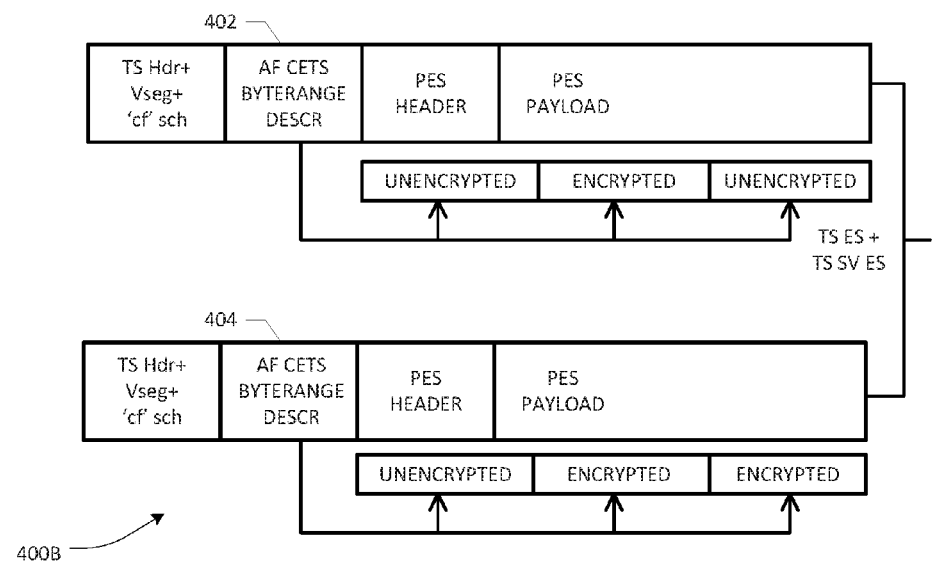

Referring to FIG. 4B, shown therein is an example packet format 400B for a CMZF TS Sample Variant elementary stream 404 along with a CMZF TS elementary stream 402. As illustrated, CMZF TS-ES 402 includes a TS elementary stream with PES payload and header, EBP or virtual segmentation information, and "cf" CBC subsample pattern encryption scheme signaling, i.e., "cbcs" scheme, which may be provided in a TS header. On the other hand, CMZF TS-SV-ES 404 includes a Sample Variants elementary stream's PES payload and header, along with EBP or virtual segmentation information in addition to "cf" CTR subsample pattern encryption scheme signaling, i.e., "cens" scheme, also suitably indicated in the corresponding TS header.

Figure 4C:
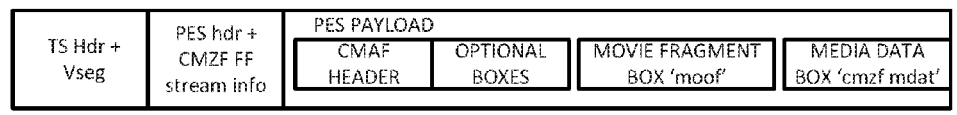

Example embodiments of the present invention also include a CMZF containerization scheme that supports carriage of ISOBMFF/CMAF over TS streams. In one example CMZF container embodiment, each CMAF/ISOBMFF track may be carried in a separate elementary stream with its own PID. The stream type for these types of elementary streams and additional metadata (as well as any descriptors) may be defined in modified PSI/PMT/PAT structures of the CMZF container. For each CMAF/ISOBMFF track there may be one or more associated elementary streams that carry the ISOBMFF/CMAF initialization segment data. In one variation, this CMAF initialization segment data may be repeated at certain intervals (e.g., similar to PAT/PMT SI data), wherein the initialization segment interval may be defined depending on a particular implementation. Example unencrypted CMZF CMAF/ISOBMFF fragments over MPEG2-TS bitstreams may carry one or more of the following pieces of information: (i) CMAF/ISOBMFF tracks compliant A/V bit streams (ISO 14496 audio/video codec bitstreams) carried in MPEG2-TS elementary streams; (ii) ATS EBP Signaling or MPEG Virtual Segments Signaling at the TS packet level; (iii) optional CMAF/ISOBMFF header boxes (typically, these may be carried in a separate elementary stream, in that case the instant elementary stream may not need to carry these boxes); (iv) optional CMZF related data in the PES header; (v) optional CMZF related boxes in the PES payload; (vi) ☐PES payload carrying Movie Fragments (MOOF Fragments); (vii) multiple fragments being carried within the same PES payload; and (viii) a new PES starting with a new MOOF fragment. An example packet structure 400C illustrating carriage of CMAF/ISOBMFF fragments over TS is shown in FIG. 4C. In one implementation, the presence of the CMAF fragments elementary stream may be signaled in the PMT by a predefined stream type, which PMT may also be modified to include one or more additional CMAF descriptors in the PMT to signal additional data.

Figure 4D:
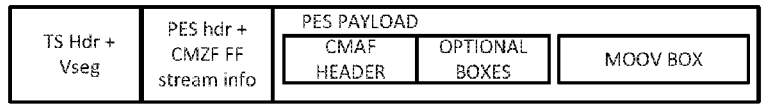
Figure 4E:
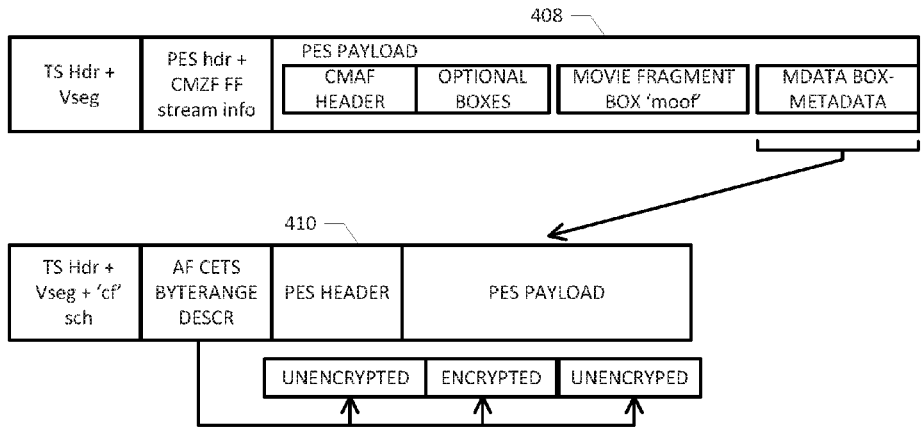

With respect to carriage of encrypted CMAF/ISOBMFF fragments over MPEG2-TS streams, an example embodiment may include encryption of CMZF CMAF/ISOBMFF fragments using any of the encryption schemes defined in the [CENC] specification, e.g., four example available schemes being "cenc", "cbc1", "cbcs" and "cens". The bitstreams may be encrypted either with full sample or subsample pattern based (partial) encryption schemes, wherein the encryption signaling may be according to the [CENC] specification. The [CENC]-specific boxes may be carried in the same elementary stream along with the other MOOF related boxes. The PSSH (Protection System Specific Header) data, if present, may be presented in the CMAF Header box (in the MOOV related boxes). In one arrangement, carriage of CMAF/ISOBMFF initialization segment data may be carried in a separate elementary stream, the presence of the CMAF/ISBMFF initialization segment elementary stream being signaled in a modified PMT with a predefined stream type. Example packet structure 400D for carrying this initialization data is shown in FIG. 4D. Preferably, this stream may remain unencrypted in an example implementation.

Example CMZF containerization schemes also support carrying CMAF/ISOBMFF sample variants, which may be encrypted using one or more encryption schemes at a national or regional packaging nodes, as previously noted. Whereas the details regarding ISOBMFF extensions to support multi-encrypted sample variants and associated variant processing at downstream nodes will be set forth further below in relation to additional embodiments of the present invention, a description of a stream format structure regarding carriage of CMZF ISOBMFF sample variants over MPEG2-TS elementary streams is provided in the following sections.

In accordance with the teachings of the present invention, an example CMZF containerization scheme may involve providing an ISOBMFF/CMAF Sample Variants track based elementary stream that carries audio/video media sample variants data (e.g., encoded in ISOBMFF/CMAF track boxes according to ISO 23001-12, incorporated by reference herein and which may be referred to as [SMPLEVAR] specification) in a MPEG2-TS elementary stream, wherein a sample variant is an assembled media sample that is operative to replace the original sample as previously noted. Preferably, a stream format for CMZF ISOBMFF/CMAF sample variant elementary stream is configured for carrying one or more encryption schemes in a single CMZF stream, wherein the elementary stream may carry a portion of the sample sequence bytes along with associated sample variant byte range metadata. In one implementation, the sample variant byte range metadata may include the location of sequence of variant byte range that will be used to construct the complete sample variant data. According to an example embodiment of the present invention, a CMZF ISOBMFF/CMAF Sample Variant elementary stream may be defined as a new type of MPEG2-TS elementary stream whose stream type may be defined in applicable TS metadata structures as extended herein. The bitstream definition for this sample variant elementary stream may also be defined accordingly. Carriage of CMZF ISOBMFF/CMAF sample variant track media content over TS may therefore be effectuated by providing a CMZF ISOBMFF/CMAF sample variant elementary stream having its own PID, wherein the modified PMT may include suitable descriptors with respect to the new stream type, PID and other information.

As with the MPEG-TS sample variants, an example CMZF ISOBMFF/CMAF sample variant elementary stream may be configured to carry only partial sample data, preferably encrypted with one of the [CENC] pattern based encryption schemes such as "cbcs" and "cens" encryption schemes. Further, the CMZF ISOBMFF/CMAF track metadata based elementary stream may carry ISOBMFF/CMAF A/V track related boxes/metadata in an MPEG2-TS stream using encoded ISOBMFF/CMAF track boxes, as previously noted. Typically, this would be all the boxes corresponding to an ISOBMFF/CMAF Fragment(s) except the Mdata box. This elementary stream doesn't carry any media sample data. Instead, a CMZF CMAF/ISOBMFF track with metadata stream may be associated with a CMZF ATS or TS Sample Variant elementary stream that carries sample or sample variant data. The possible embodiments are: (a) CMZF CMAF/ISOBMFF Track metadata elementary stream associated with CMZF ATS elementary stream; (b) ☐CMZF CMAF/ISOBMFF Track metadata elementary stream associated with CMZF TS sample variant elementary stream. It should be appreciated that these combinations advantageously allow CMZF streams to carry one or more encryption schemes as well carry both ATS and CMAF/ISOBMFF metadata at the same time, wherein the associated streams may be encrypted with one or more [CENC] encryption schemes. Although partial sample encryption schemes such as "cbcs" and "cens" may be used, it should be appreciated that full sample encryption scheme can also be supported as well, if needed.

Similar to the ISOBMFF/CMAF sample variants, carriage of CMZF ISOBMFF/CMAF track metadata (no Mdata) may be provided over TS using an elementary stream having its own PID, with the PMT being modified to include additional descriptors for the stream type, PID and other information. Skilled artisans will recognize that the following are some of the advantages of carrying CMAF/ISOBMFF track metadata over TS elementary streams: (i) makes CMZF stream compliant with ATS stream, thereby providing low-latency and backward compatibility; (ii) allows all the CMAF fragment related metadata to be created at an upstream packaging facility, e.g., the headend; (iii) allows a low-cost and low-complexity edge device implementation to generate the CMAF/ISOBMFF fragments/segments with low overhead transformation logic/software in the EMR components (associated with edge devices or premises nodes); (iv) efficient scaling to large set of edge devices/end devices as result; (v) associated ATS streams can be fed to existing STBs to consume low-latency ATS stream; (vi) makes CMZF streams playable by a TS-based player; (vii) by creating encryption/fragment boxes at the headend, which are carried end-to-end, it reduces the errors that may happen at the edge device during transformation; (viii) creating ISOBMFF/CMAF fragment boxes at the headend allows easy extensibility as new CMAF/ISOBMFF/DASH workflows can be introduced quickly. Reference numeral 400E in FIG. 4E refers to an example of CMZF CMAF/ISOBMFF Track metadata over TS elementary stream 408 in association with the CMZF TS elementary stream 410 according to an embodiment of the present invention, wherein PES payload of stream 408 includes CMAF boxes and "cbcs" signaling. On the other hand, TS stream 410 for the metadata includes a "cf" scheme signaling component with a suitable byte range descriptor.

As noted previously, embodiments of the present invention provide a number of CMZF stream schemes, each of which may comprise a bundle of particular types of CMZF elementary streams carrying A/V media data, associated metadata, etc., wherein the elementary streams are carried in their own respective PIDs as signaled through associated PMT metadata structures. Furthermore, such CMZF elementary streams may or may not be part of the same multicast CMZF stream generated from an upstream packaging facility. Whereas some CMZF stream schemes support a single encryption scheme at the packaging node, other schemes may support one or more encryption schemes from which a subset of schemes may be configured to be applied as part of or at the time of CMZF containerization. Set forth below are brief descriptions of example CMZF stream schemes that may be employed in one or more embodiments of the present invention, where elementary stream formats may comprise a combination of the foregoing stream structures. It will be apparent to skilled artisans that additional stream schemes are within the scope of the present invention in accordance with the teachings herein.

In an example single encryption CMZF-FF-CBCS-SCH scheme, the ES bundle comprises CMAF/ISOBMFF over TS elementary streams with single [CENC] encryption scheme, where the following types of CMZF elementary streams may be provided. Video Main Track Elementary Streams may be of CMZF-FF-ES stream type with "cbcs" [CENC] encryption scheme as defined in [CENC] specification, Section 10.4 (incorporated by reference herein), wherein AES-CBC subsample pattern encryption scheme is used. The ES bundle must not contain any Video Sample Variant Track Elementary Streams. Audio Track Elementary Streams may also be of CMZF-FF-ES type with "cbcs" encryption scheme, with audio streams being encrypted using whole-block full sample encryption. In "cbcs", tracks other than video may be protected using whole-block full-sample encryption as specified in [CENS], and hence skip_byte_block is configured to be 0. Video Initialization Segment Elementary Streams may be of CMZF-FF-IS-ES type, which must be present if a Video main track elementary stream is present. Audio Initialization Segment Elementary Streams may be of CMZF-FF-IS-ES type, which must be present if an Audio elementary stream is present.

Analogously, another example single encryption stream scheme such as CMZF-FF-CENS-SCH scheme may use similar elementary AN streams but with AES-CTR ("cens") encryptions.

In an example sample variants scheme involving CMAF/ISOBMFF media, such as CMZF-FF-CBCS-CENS-SV-SCH scheme, the ES bundle consists of a CMAF track over TS elementary streams in association with corresponding CMAF sample variants track over TS elementary streams. An example stream format structure 400F corresponding to this scheme is set forth in FIG. 4F, wherein a main CMAF main track over TS is shown at reference numeral 420 and an associated SV track over TS is shown at reference numeral 422. The CMAF main track 420 includes a TS elementary stream with PES payload that includes CMAF boxes and "cbcs" CBC signaling. A TS header also includes virtual segmentation information as well as CMZF CMAF track information. The associated SV track 422 also includes similar information but the PES payload comprises a different encryption, e.g., "cens" CTR, with appropriate signaling.

It should be appreciated that the foregoing arrangement allows for carriage of multiple [CENC] encryption schemes in its elementary streams, as defined in the following. In one embodiment, video Main Track Elementary Streams may be of CMZF-FF-ES type with "cbcs" [CENC] encryption scheme as described previously. On the other hand, video Sample Variant Track Elementary Streams may be CMZF-FF-SV-ES type with "cens" [CENC] encryption scheme. One skilled in the art will recognize a different CMZF stream scheme may be obtained by reversing the main track and SV track encryption schemes. With respect to audio content, Audio Track Elementary Streams may be CMZF-FF-ES type with either "cbcs" or "cens" encryption scheme, wherein audio elementary streams with "cbcs" or "cens" encryption schemes may be present in the same ES bundle. In an example implementation. audio streams may be encrypted with whole-block full sample encryption. As before, in "cbcs" schemes, tracks other than video are protected using whole-block full-sample encryption as specified in [CENC], with skip_byte_block set to 0. Likewise, in "cens" schemes, tracks other than video are protected using whole-block full-sample encryption as specified in [CENS], also with skip_byte_block set to 0. Video Initialization Segment Elementary Streams may be of CMZF-FF-IS-ES type, which must be present if a Video main track elementary stream is present. Likewise, audio Initialization Segment Elementary Streams may also be of CMZF-FF-IS-ES type, which must be if an Audio elementary stream is present and may comprise either "cbcs" or "cens" schemes.

In an example CMZF stream scheme involving sample variant TS streams, e.g., CMZF-TS-CBCS-CENS-SV-SCH, such a scheme may be configured to support carriage of multiple subsample pattern encryption schemes in its ES bundle which comprises TS elementary streams in association with corresponding TS sample variants elementary streams. Example packet format structure for such streams may comprise the stream structure 400B of FIG. 400B, described hereinabove. Accordingly, this scheme allows multiple TS streams with AES-CTR/AES-CBC encryption schemes conforming to [CENC-TS] in its ES bundle, wherein the following CMZF elementary streams may be defined. Main Video Elementary Streams may be of CMZF- TS-ES type with "cf" AES-CBC encryption scheme as defined in [CENC-TS] specification (incorporated by reference herein). It should be appreciated that this scheme uses AES-CBC subsample pattern encryption scheme—similar to "cbcs", wherein the encrypted data may use the same pattern as in [CENC] "cbcs" scheme. The value of CA_System_ID value is set to "cf", and parts of the payload may be non/un-encrypted, and encrypted and non-encrypted byte ranges are signaled in an adaptation field descriptor referred to as cets_byte_range_descriptor. In one example embodiment, the cets_byte_range_descriptor may be used to signal the "cbcs" subsample encryption pattern (1 out of 10 blocks of 16 bytes, for example). Video TS Sample Variant elementary streams may be CMZF-TS-SV-ES type with "cf" AES-CTR subsample pattern encryption scheme as set forth in the [CENC-TS] specification. Audio Elementary Streams may be of CMZF-TS-ES type with "ce" [CENC-TS] encryption scheme that allows whole-block full sample encryption using, e.g., either AES-CTR or AES-CBC subsample encryption—similar to audio stream encryption specified in [CENC] "cens" or "cbcs". As one skilled in the art will note, these schemes specify full-sample encryption except for the Audio Data Transport Stream (ADTS) headers. In one implementation, the value of CA_System_ID is set to "ce", and transport_scrambling_control is set to a value other than "00", the complete transport stream packet payload containing only encrypted bytes. In the case of ADTS frames, raw_data_bytes may be encrypted, while adts_fixed_header, adts_variable_header, adts_error_check, adts_header_error_check, and adts_raw_data_block_error_check are not encrypted. Video ECM Elementary Streams may be set to CMZF-TS-ECM-ES type, which much be included if a Video main elementary stream is present, wherein CETS ECM messages provide encryption signaling parameters. Audio ECM Elementary Streams may also be set to CMZF-TS-ECM-ES type, which must be included if an Audio elementary stream is present, wherein CETS ECM messages provide encryption signaling parameters with respect to the audio streams.

Additional example CMZF stream schemes may involve combined TS+FF Track Metadata based CMZF schemes. By way of illustration, a CMZF-TS-FFMD-CBCS-SCH scheme comprises an ES bundle consisting of combined MPEG2-TS and CMAF/ISOBMFF track metadata (no Mdata) elementary streams with single [CENC-TS]/[CENC] encryption scheme. In such an arrangement, the video related elementary streams may be based on the combined TS+FF-over-TS ES bundle. Analogously, audio elementary streams can be TS and/or FF-over-TS based ES. Example packet format structure for such streams may comprise the stream structure 400E of FIG. 4E, described hereinabove. An example CMZF-TS-FFMD-CBCS-SCH may therefore have the following types of CMZF elementary streams. Main video elementary streams may be defined as CMZF-TS-ES type with "cf" [CENC-TS] AES-CBC encryption scheme (which uses AES-CBC subsample pattern encryption scheme similar to "cbcs" as noted above). Preferably, the encrypted data may use the same pattern as in [CENC] "cbcs" scheme. The value of Conditional Access CA_System_ID value may be set to "cf", and parts of the payload may be un/non-encrypted, with encrypted and non-encrypted byte ranges signaled in an AF descriptor cets_byte_range_descriptor. Similar to some of the embodiments set forth previously, the cets_byte-rangedescriptor may be configured to signal the "cbcs" subsample encryption pattern (1 out of 10 blocks of 16 bytes, for example). Associated video ISOBMFF/CMAF track metadata (no mdata) elementary streams may be defined as CMZF-FF-MD-ES, with "cbcs" [CENC] AES-CBC encryption scheme in a similar manner. It should be noted that this elementary stream does not carry data in the mdata boxes. Rather, this elementary stream may be configured to carry metadata on how to extract the mdata data from the associated MPEG-TS video elementary stream. Further, the stream format structure corresponding to this scheme may not have any video Sample Variant elementary streams in the bundle. As to audio data, audio elementary streams may be defined to be of CMZF-TS-ES type with "ce" [CENC-TS] encryption scheme as defined in the [CENC-TS] specification. Audio streams may be encrypted with whole-block full sample encryption, which may specify full-samples—except for the adts headers—to be encrypted using AES-CBC. In one arrangement, the value of CA_System_ID may be set to "ce". Another parameter transport_scrambling_control may be set to a value other than "00", with the complete transport stream packet containing only encrypted bytes. In case of ADTS frames, raw_data_bytes may be encrypted similar to some of the example embodiments set forth above, while adts_fixed_header, adts_variable_header, adts_error_check, adts_header_error_check, and adts_raw_data_block_error_check are not encrypted.

Audio Track Elementary Streams may also be defined to be CMZF-FF-ES type with a "cbcs" encryption scheme, where whole-block full sample encryption may be used. As noted previously, in "cbcs" tracks other than video may be protected using whole-block full-sample encryption as specified in the [CENC] specification, and therefore a skip_byte_block parameter may be set to 0.

With respect to video Initialization Segment Elementary Streams, they may be defined to be CMZF-FF-IS-ES type, which must be present if an associated video ISOBMFF/CMAF track metadata elementary stream is also present. Audio Initialization Segment Elementary Streams may likewise be defined to be of CMZF-FF-IS-E' type, which should also be present if an audio ISOBMFF/CMAF over TS elementary stream is present. Video and audio ECM (Entitlement Control Message) Elementary Streams may be defied to be of CMZF-TS-ECM-ES type, which should be present if a video/audio main elementary stream is present. It should be appreciated that CETS ECM messages provide encryption signaling parameters relative to encrypted audio/video streams carried in the appropriate stream types.

The foregoing CMZF stream scheme may be expanded to include multiple subsample pattern encryption schemes using sample variants in another example embodiment of the present invention. By way of illustration, an example CMZF-TS-FFMD-CBCS-CENS-SV-SCH scheme may be configured to support carriage of multiple subsample pattern encryption schemes in its ES bundle which may consist of combined MPEG2-TS and CMAF/ISOBMFF track metadata (no Mdata) elementary streams as well as corresponding sample variants elementary streams. Example packet format structure for such streams may comprise a stream structure 400G of FIG. 4G, wherein packet structures for FF and its corresponding SV carriage are shown in structures 450, 454, while packet structures for TS and its SV carriage are shown in structures 452, 456. As one skilled in the art can readily appreciate that these stream structures and corresponding stream type definitions are similar to some of the structures and stream type definitions described hereinabove, no further discussion with respect to this CMZF scheme is provided, except that the such previous description may also be applied here, *mutatis mutandis*. Likewise, it should be appreciated that various other CMZF stream schemes set forth in Table 1B may also be described and defined in terms of the packet structures, stream types and encryption schemes with appropriate modifications within the scope of the teachings herein.

Skilled artisans will readily recognize upon reference hereto that naming of different types of elementary stream names has been provided in the present patent application to facilitate proper identification and associated description thereof, rather than being set forth as a limitation of scope. Accordingly, it will be appreciated that different names may be provided in additional or alternative arrangements with respect to a particular CMZF stream scheme within the context of an embodiment of the present invention.

Figure 5:
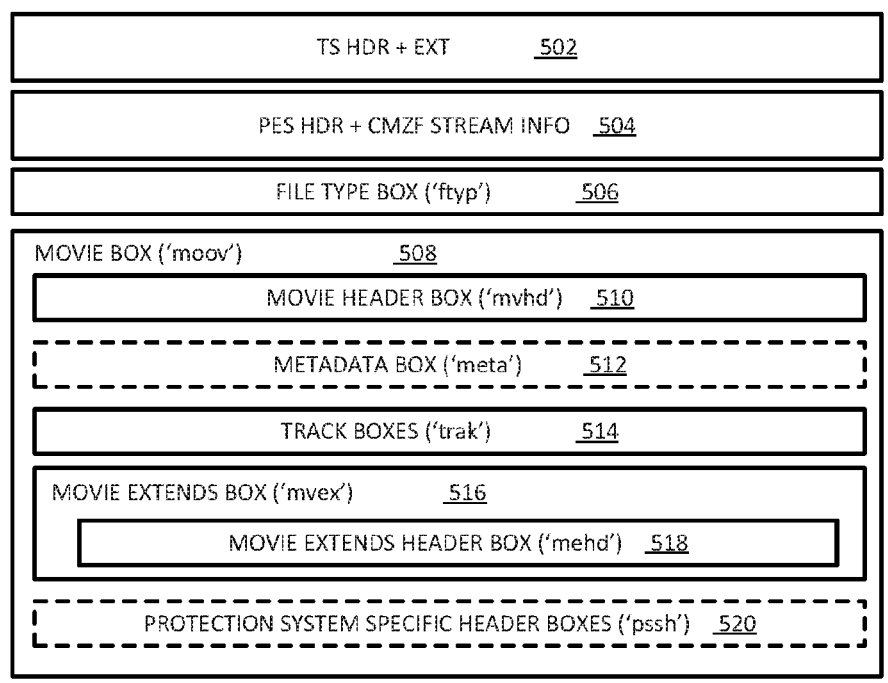
FIG. 5 depicts an example CMZF container initialization segment that may be used as part of a CMZF container structure in accordance with an embodiment of the present invention.

Turning now to FIG. 5, depicted therein is an example CMZF container initialization segment 500 that may be used as part of a CMZF container header structure for facilitating carriage of CMAF/ISOBMFF-based media in accordance with a media object model embodiment of the present invention. A suitable TS header and extensions block 502 may be followed by a PES header and CMZF stream information portion 504. A File Type Box ("ftyp") 506 may provided in the initialization segment 500, consistent with the ISOBMFF specification. A Movie Box ("moov") 508 follows the ftyp box 506 and may include a plurality of boxes in a hierarchical/extensible arrangement. By way of illustration, a Movie Header box 510, a Metadata Box 512, one or more Track Boxes 514 and a Movie Extends Box 516 comprising a corresponding Header Box 518 are shown. Additionally, one or more protection-related boxes, e.g., Protection System Specific Header ("pssh") Boxes 520 may be provided as part of the Movie Box 508.

Figure 6:
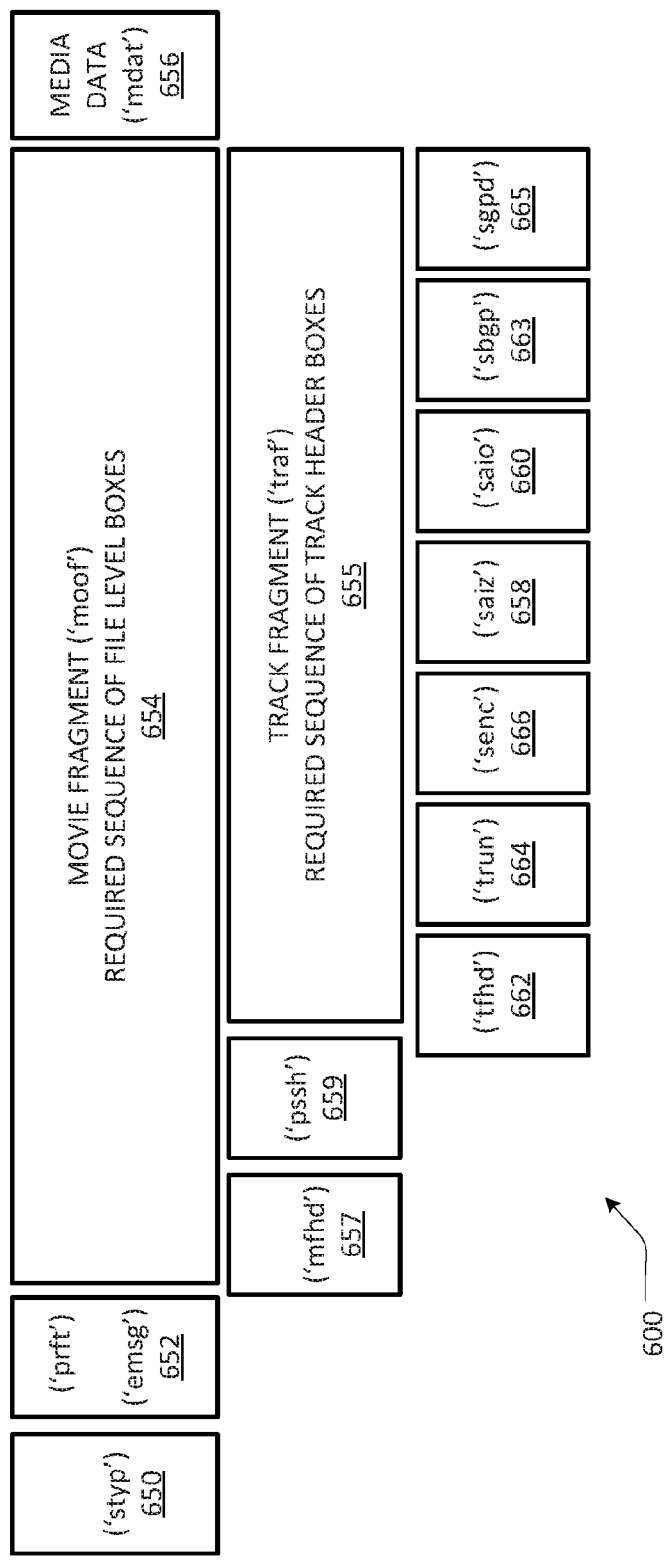
FIG. 6 depicts an example media object compliant with ISO Base Media File Format (ISOBMFF) or Common Media Application Format (CMAF) for carriage in a CMZF container structure in accordance with an embodiment of the present invention.

A CMAF Track for purposes an example embodiment of the present invention is a media object that may be defined as a byte sequence equivalent to a track in a single track ISO media file. Tracks may begin with a File Header and the samples are stored in Segments that each contain a single Track Fragment referencing a complete sample sequence stored in a Media Data Box ("mdata"), which immediately follows each Movie Fragment Box in delivery/storage order. Each Track contains a Track Box ("trak") in accordance with ISO 14496-12, with the following constraints. In one arrangement, Track Boxes ("trak") may not reference media samples. Only audio Track Boxes may contain an Edit Box ("edts") that contain one Edit List Box ("elst"). If an Edit List Box ("elst") is included in a CMAF audio Track, the value of entry_count is set to 1, and all fields are set to the values specified in accordance with the standard. In similar fashion, a CMZF CMAF Segment is a media object that is defined as a byte sequence equivalent to a segment from the ISO Base media file format. FIG. 6 illustrates the box sequence and containment of a CMAF Segment 600 in one arrangement, wherein a Segment Type 650 is followed by a Producer Reference Time Event Box 652, which is followed by a sequence of File Level boxes required for a Movie Fragment 654. A Metadata Box 656 then follows. At a lower level, a Movie Fragment Header Box 657 is followed by a Protection Specific Header Box 659 and a plurality of Track Header boxes required for a Track Fragment 655. It should be recognized that Track Fragment 655 sequences and/or pssh Box 659 may be optional and/or recommended in an example implementation. Various boxes relative to Track Fragment 660 may comprise a Track Fragment Header 662, Track Fragment Run 664, Sample Encryption 666, Sample Aux Info Sizes Box 658, Sample Aux Info Offsets Box 660, Sample To Group Box 663 and Sample Group Descriptions Box 665.

As previously noted, EMR components may be provided at different hierarchical levels in an example media distribution/delivery network wherein an EMR may be configured as a network or end-device resident component that performs the transformation of CMZF streams to different stream/segment and storage formats which can be consumed by the STBs, OTT devices, and storage formats that are used to store segments for Time-Shift/Catch-Up consumption. The various types of CMZF streams described above can be transformatted by an EMR into a wide variety of stream and segment formats, preferably depending on where the EMR is located in an end-to-end network architecture. As will be set forth in additional detail herein, an EMR functionality may be effectuated by a fairly low complex EMR hardware/software that can be resident in low cost/low complexity edge device, thereby advantageously providing a low cost scalable solution to convert CMZF streams to a variety of output delivery formats suitable for different deployments.

According to example embodiments, EMR functionality may be provided as part of any of the following devices, nodes or elements: (i) origin servers where CMZF segments can be transformatted to different ABR delivery formats as part of a Just-In-Time Packaging (JITP) architecture; (ii) regional or access network edge packagers, e.g., co-located at a Central Office node, where CMZF streams can be transformatted to ABR delivery format segments, single encryption scheme multicast streams, CMZF segments for storage for Time-Shift/Catch-UP or nDVR; (iii) home/premises network gateways where CMZF multicast streams can be terminated and converted to unicast streams or segments for consumption by the local STB and/or reach devices, wherein the ABR segments can be served from a local cache on the gateway; and (iv) STBs where CMZF streams can be consumed by the STB and EMR functionality in the STB Client Proxy can be used to transformat the CMZF stream to appropriate ABR delivery format segments and stored on a local cache on the STB for native player consumption.

Figure 7:
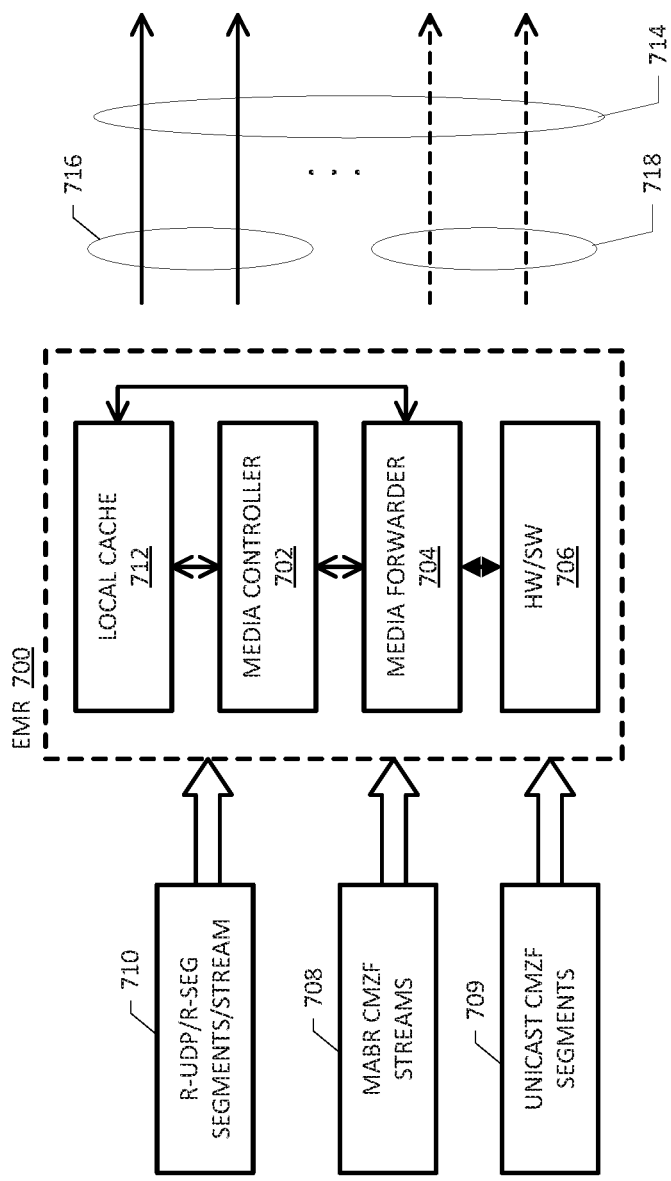
FIG. 7 depicts a block diagram of an Edge Media Router (EMR) component that may be deployed at various hierarchical levels of an end-to-end communications network for receiving and processing CMZF-packaged media content assets in accordance with an embodiment of the present invention.

A generalized EMR component 700 according to an embodiment is illustrated in FIG. 7, wherein a variety of input streams/segments are exemplified. MABR CMZF streams 708 are representative of the various streams received from an upstream entity that may be transformatted into a plurality of segmented output 718 or stream output 716 shown as part of generalized transformatted MFX output 714. R-UDP/R-SEG segments and stream input 710 may also be provided to EMR 700 in certain embodiments. Likewise, unicast CMZF segments 710 may also be provided as an input to EMR 700. A media controller 702 may be configured for providing the control plane functionality in the EMR component 700, which may include hardware/software arranged to provide an intelligent proxy to handle various requests from the downstream devices and handle or forward them to upstream devices. For example, these requests could be for segments/stream or manifest with respect to a particular media content asset. In addition, such requests could be for R-UDP/R-SEG for effectuating ICC/FCC features. Media controller 702 may further include Media Format Transformation (i.e., MFX) control functions to control a media forwarder component or module 704 that effectuates main transformation functionality in EMR 700 with respect to its data plane functionality. Preferably, media forwarder component 704 is configured to transformat CMZF streams/segments to different transformatted output formats using one or more MFX modules, which can be purely software based or software with hardware assist, or in some other virtualized implementations, as illustrated at reference numeral 706 in FIG. 7.

An example EMR component such as EMR 700 may also include a local cache 712 for storing CMZF segments, e.g., transformatted from one or more incoming CMZF content streams, as well as manifests for effectuating Time-shift, Catch-up and ICC/FCC workflows. For Time-Shift, Catch-Up and nDVR workflows the CMZF streams may be transformed and stored as CMZF segments in network storage, e.g., video storage/cache 712. It should be appreciated that CMZF segments can be of any CMZF scheme type. CMZF streams with one or more encryption schemes may be transformed to CMZF segments with single encryption. Further, CMZF segments may be RTP encapsulated. Since most of the CMZF schemes are MPEG-TS based streams in some of the example embodiments of the present invention, the CMZF segments in such arrangements may be provided as TS based streams, which will be RTP/TS based segments upon RTP encapsulation. For ICC, CMZF segments may be kept in ring/circular buffer memory (for low latency access) or in video storage/cache devices provided as part of or in association with cache 712. Furthermore, input CMZF segments 709 can be transformatted to different ABR delivery segment formats based on the CMZF segment scheme. For example, EMR as part of a suitable workflow may be configured to transformat the CMZF segments into ABR delivery format segments and stores them in its local cache 712 and/or at a remote cache (not specifically shown), or may have a more involved workflow to upload to an origin server for end devices to access the segments for ABR playout. CMZF segments (e.g., of different schemes) may be stored in a video storage processor server (not specifically shown) for a JITP playout of the segments, wherein the video storage server may be configured to transform the CMZF segments to appropriate ABR delivery format during JITP playout.

In one example embodiment, the stored CMZF segments are encrypted and there is no need for encryption or trans-encryption during JITP. End devices, e.g., reach/STB clients with a suitable proxy client configured in them, may consume the CMZF segments, wherein the end device proxy may be configured to transform (e.g., as part of EMR functionality) the CMZF segments into ABR delivery format segments and suitable manifest and make them available via a local cache (i.e., end device cache) for the native/associated player. As noted previously, CMZF segments may carry an initialization segment elementary stream in them similar to the CMZF scheme streams. In one embodiment, the initialization segment data may be extracted from CMZF segments during CMZF segment transformation by EMR. Further, the initialization segment for ABR delivery format may therefore be generated and stored in a local and/or remote cache.

As previously noted, CMZF streams may be transformatted at the edge network or in the end device to enable a number of different workflows in an example network architecture. According to some embodiments, example output formats to enable ABR workflows are as follows: (i) multicast ABR stream with single encryption mode, e.g., for STB consumption and backward compatibility; (ii) ABR delivery format segments, e.g., CMAF, HLS-TS, DASH ISOBMFF, etc.; and (iii) CMZF stream format segments suitable storage format for Time-Shift and Catch-Up playback. A number of different types of transformations can therefore be effectuated based on the CMZF scheme of the input streams.

By way of further illustration, the following are some main types of transformations: (i) from one or more encryption CMZF scheme stream to single encryption CMZF scheme stream, e.g., for multicast stream consumption by and edge/end device, STB, etc.; (ii) from one or more encryption CMZF scheme stream to single encryption ABR delivery format stream for multicast ABR delivery format stream, e.g., multicast RTP/TS or RTP/TS/CMAF format stream; (iii) from one or more encryption CMZF scheme to single encryption scheme ABR delivery format segment, e.g., for delivery to an ABR client from a local cache; (iv) from one or more encryption CMZF scheme to one or more encryption CMZF scheme format segment, e.g., for storage in CMZF scheme format for Time-Shift and Catch-Up playback; (v) from single encryption CMZF scheme stream to single encryption ABR delivery format stream, e.g., multicast/unicast ABR delivery format stream such as multicast/unicast RTP/TS or RTP/TS/CMAF format stream; (vi) from single encryption CMZF scheme to single encryption scheme ABR delivery format segment, e.g., for delivery to an ABR client from a local cache; and (vii) from single/one or more encryption CMZF scheme to single encryption scheme ABR delivery format initialization segment, e.g., for delivery to an ABR client from a local cache. One should clearly recognize that several other types of transformations may be provided in additional or alternative embodiments of the present invention. Tables 2 and 3 below illustrate a list of various transformatted output formats wherein Table 2 exemplifies single encryption CMZF scheme transformatted output formats while Table 3 exemplifies one or more encryption CMZF scheme transformatted output formats:

TABLE 2

| Input stream CMZF Scheme | Single encryption CMZF scheme multicast/ unicast stream (Multicast ABR delivery format) | Encryption scheme CBC or CTR | ABR delivery format segments | CMZF Segment Format For Storage (for Time-Shift and Catch-Up, nDVR and ICC) | RTP encap. | R-UDP/ R-SEG |
|---|---|---|---|---|---|---|
| ISOBMFF/CMAF over TS based CMZF stream schemes | | | | | | |
| CMZF-FF-CBCS-SCH | CMZF-FF-CBCS-SCH CMZF-TS-CBCS-SCH | AES-CBC | CMAF DASH/ISOB MFF HLS/TS | (RTP encapsulated) CMAF over TS Segment format CMZF-FF-CBCS-SCH | Yes | R-UDP R-SEG |

TABLE 2-continued

| Input stream CMZF Scheme | Single encryption CMZF scheme multicast/unicast stream (Multicast ABR delivery format) | Encryption scheme CBC or CTR | ABR delivery format segments | CMZF Segment Format For Storage (for Time-Shift and Catch-Up, nDVR and ICC) | RTP encap. | R-UDP/R-SEG |
|---|---|---|---|---|---|---|
| CMZF-FF-CENS-SCH | CMZF-FF-CENS-SCH CMZF-TS-CENS-SCH | AES-CTR | CMAF DASH/ISOBMFF HLS/TS | In addition, CMZF segments MAY be stored in the (RTP) CMAF over TS format: CMZF-FF-CBCS-SCH (RTP/TS) Segment format CMZF-TS-CENS-SCH In addition, CMZF segments MAY be stored in the (RTP) CMAF over TS format: CMZF-FF-CENS-SCH | Yes | R-UDP R-SEG |
| MPEG-TS ES bundle based CMZF stream schemes | | | | | | |
| CMZF-TS-CBCS-SCH | CMZF-TS-CBCS-SCH CMZF-FF-CBCS-SCH | AES-CBC | CMAF DASH/ISOBMFF | (RTP encapsulated) TS Segment format CMZF-TS-CBCS-SCH In addition, CMZF segments MAY be stored in the (RTP) CMAF over TS format: CMZF-FF-CBCS-SCH | Yes | R-UDP R-SEG |
| CMZF-TS-CENC-SCH | CMZF-TS-CENS-SCH CMZF-FF-CENS-SCH | AES-CTR | CMAF DASH/ISOBMFF | (RTP encapsulated) TS segment with CMZF-TS-CENCE-SCH In addition, CMZF segments MAY be stored in (RTP) CMAF over TS format: CMZF-FF-CENS-SCH | Yes | R-UDP R-SEG |
| Combined MPEG-TS + CMAF/ISOBMFF track metadata ES based CMZF stream schemes | | | | | | |
| CMZF-TS-FFMD-CBCS-SCH | CMZF-TS-CBCS-SCH CMZF-FF-CBCS-SCH CMZF-TS-FFMD-CBCS-SCH | AES-CBC | CMAF DASH/ISOBMFF HLS/TS | (RTP encapsulated) CMAF over TS Segment format with CMZF-TS-FFMD CBCS-SCH format In addition, CMZF segments MAY be stored in the | Yes | R-UDP R-SEG |

TABLE 2-continued

| Input stream CMZF Scheme | Single encryption CMZF scheme multicast/unicast stream (Multicast ABR delivery format) | Encryption scheme CBC or CTR | ABR delivery format segments | CMZF Segment Format For Storage (for Time-Shift and Catch-Up, nDVR and ICC) | RTP encap. | R-UDP/R-SEG |
|---|---|---|---|---|---|---|
| CMZF-TS-FFMD-CENS-SCH | CMZF-TS-CENS-SCH CMZF-FF-CENS-SCH CMZF-TS-FFMD-CENS-SCH | AES-CTR | CMAF DASH/ISOBMFF | (RTP)/TS formats: CMZF-FF-CBCS-SCH CMZF-TS-CBCS-SCH (RTP encapsulated) CMAF over TS Segment format CMZF-TS-FFMD-CENS-SCH In addition, CMZF segments MAY be stored in the (RTP)/TS formats: CMZF-FF-CENS-SCH CMZF-TS-CENS-SCH | Yes | R-UDP R-SEG |
| CMZF-TS-FFMD-CENC-SCH | CMZF-TS-CENC-SCH CMZF-FF-CENC-SCH CMZF-TS-FFMD-CENC-SCH | AES-CTR | CMAF DASH/ISOBMFF | (RTP encapsulated) CMAF over TS Segment format CMZF-TS-FFMD-CENC-SCH In addition, CMZF segments MAY be stored in the (RTP)/TS formats: CMZF-FF-CENC-SCH CMZF-TS-CENC-SCH | Yes | R-UDP R-SEG |

TABLE 3

EMR Output Formats Information

| Input stream CMZF Scheme | Single encryption CMZF scheme multicast/unicast stream (Multicast ABR delivery format) | ABR delivery format segments | CMZF Segment Format For Storage (for Time-Shift and Catch-Up) | RTP encap. support | R-UDP/R-SEG |
|---|---|---|---|---|---|
| ISOBMFF/CMAF Over TS based CMZF stream schemes | | | | | |
| CMZF-FF-CBCS-CENS-SV-SCH | CMZF-FF-CBCS-SCH CMZF-FF-CENS-SCH CMZF-TS-CBCS-SCH CMZF-TS-CENS-SCH | CMAF DASH/ISOBMFF HLS/TS | (RTP encapsulated) CMAF over TS Segment format CMZF-FF-CBCS-CENS-SV-SCH In addition, CMZF segments MAY be stored in the following (RTP)/TS formats: CMZF-FF-CBCS-SCH | Yes | R-UDP R-SEG |

TABLE 3-continued

| | EMR Output Formats Information | | | | |
|---|---|---|---|---|---|
| Input stream CMZF Scheme | Single encryption CMZF scheme multicast/unicast stream (Multicast ABR delivery format) | ABR delivery format segments | CMZF Segment Format For Storage (for Time-Shift and Catch-Up) | RTP encap. support | R-UDP/ R-SEG |
| CMZF-FF-CENS-CBCS-SV-SCH  MPEG-TS ES bundle based CMZF stream schemes | CMZF-FF-CBCS-SCH CMZF-FF-CENS-SCH CMZF-TS-CBCS-SCH CMZF-TS-CENS_SCH | CMAF DASH/ISOBMFF HLS/TS | CMZF-FF-CENS-SCH CMZF-TS-CBCS-SCH CMZF-TS-CENS-SCH (RTP encapsulated) CMAF over TS Segment format CMZF-FF-CENS-CBCS-SV-SCH In addition, CMZF segments MAY be stored in the following (RTP)/TS formats: CMZF-F-CBCS-SCH CMZF-FF-CENS-SCH CMZF-TS-CBCS-SCH CMZF-TS-CENS-SCH | Yes | R-UDP R-SEG |
| CMZF-TS-CBCS-CENS-SV-SCH | CMZF-TS-CBCS-SCH CMZF-TS-CENS-SCH CMZF-FF-CBCS-SCH CMZF-FF-CENS-SCH | CMAF DASH/ISOBMFF HLS/TS | (RTP encapsulated) CMAF over TS Segment format CMZF-TS-CBCS-CENS-SV-SCH In addition, CMZF segments MAY be stored in the following (RTP)/TS formats: CMZF-FF-CBCS-SCH CMZF-FF-CENS-SCH CMZF-TS-CBCS-SCH CMZF-TS-CENS-SCH | Yes | R-UDP R-SEG |

TABLE 3-continued

EMR Output Formats Information

| Input stream CMZF Scheme | Single encryption CMZF scheme multicast/unicast stream (Multicast ABR delivery format) | ABR delivery format segments | CMZF Segment Format For Storage (for Time-Shift and Catch-Up) | RTP encap. support | R-UDP/ R-SEG |
|---|---|---|---|---|---|
| CMZF-TS-CENS-CBCS-SV-SCH | CMZF-TS-CBCS-SCH<br>CMZF-TS-CENS-SCH<br>CMZF-FF-CBCS-SCH<br>CMZF-FF-CENS-SCH | CMAF DASH/ISOBMFF HLS/TS | (RTP encapsulated) CMAF over TS Segment with CMZF-TS-CENS-CBCS-SV-SCH In addition, CMZF segments MAY be stored in the following (RTP)/TS formats:<br>CMZF-FF-CBCS-SCH<br>CMZF-FF-CENS-SCH<br>CMZF-TS-CBCS-SCH<br>CMZF-TS-CENS-SCH | Yes | R-UDP R-SEG |
| Combined MPEG-TS + CMAF/ISOBMFF track metadata ES based CMZF stream schemes | | | | | |
| CMZF-TS-FFMD-CBCS-CNES-SV-SCH | CMZF-TS-CBCS-SCH<br>CMZF-TS-CENS-SCH<br>CMZF-FF-CBCS-SCH<br>CMZF-FF-CENS-SCH<br>CMZF-TS-FFMD-CBCS-SCH<br>CMZF-TS-FFMD-CENS-SCH | CMAF DASH/ISOBMFF HLS/TS | (RTP encapsulated) CMAF over TS Segment with CMZF-TS-FFMD-CBCS-CENS-SV-SCH format In addition, CMZF segments MAY be stored in the following (RTP)/TS formats:<br>CMZF-FF-CBCS-SCH<br>CMZF-FF-CENS-SCH<br>CMZF-TS-CBCS-SCH<br>CMZF-TS-CENS-SCH<br>CMZF-TS-FFMD-CBCS-SCH<br>CMZF-TS-FFMD-CENS-SCH | Yes | R-UDP R-SEG |
| CMZF-TS-FFMD-CENS-CBCS-SV-SCH | CMZF-TS-CBCS-SCH<br>CMZF-TS-CENS-SCH<br>CMZF-FF-CBCS-SCH<br>CMZF-FF-CENS-SCH<br>CMZF-TS- | CMAF DASH/ISOBMFF HLS/TS | (RTP encapsulated) CMAF over TS Segment format CMZF-TS-FFMD-CENS-CBCS-SV-SCH In addition, | Yes | R-UDP R-SEG |

TABLE 3-continued

| | EMR Output Formats Information | | | | |
|---|---|---|---|---|---|
| Input stream CMZF Scheme | Single encryption CMZF scheme multicast/unicast stream (Multicast ABR delivery format) | ABR delivery format segments | CMZF Segment Format For Storage (for Time-Shift and Catch-Up) | RTP encap. support | R-UDP/R-SEG |
| | FFMD-CBCS-SCH CMZF-TS-FFMD-CENS-SCH | | CMZF segments May be stored in the following (RTP)/TS formats: CMZF-FF-CBCS-SCH CMZF-FF-CENS-SCH CMZF-TS-CBCS-SCH CMZF-TS-CENS-SCH CMZF-TS-FFMD-CBCS-SCH CMZF-TS-FFMD-CENS-SCH | | |

One skilled in the art will recognize that an example MFX module, which may be hardware/software-assisted, may therefore be configured to execute suitable program instructions to carry out any combination of the transformations illustrated in the Tables above. In one example arrangement, EMR 700 may be configured to comprise one MFX module per CMZF scheme, wherein the MFX module may transform a given input CMZF scheme stream into different possible outputs. Accordingly, at a broad level, an MFX module may comprise hardware/software programmed to effectuate at least some of the following: (i) Extraction of ISOBMFF/CMAF MOOF fragments from the CMAF/ISOBMFF over TS elementary streams; (ii) Extraction of ISOBMFF/CMAF MOOF fragments from the combined main track and sample variants track carried over TS elementary streams. As will be seen hereinbelow, this track may comprise data encrypted with the encryption scheme(s) carried from the sample variants tracks, wherein the extraction process may use sample data from both main and sample variants track; (iii) Extraction of TS elementary stream from combined main and sample variant elementary streams. In this case the encrypted data from TS sample variants sample may be combined with the unencrypted parts of the TS main elementary stream. The encrypted and non-encrypted parts are signaled at the TS packet level in the Adaptation Field; (iv) Extraction of RTP encapsulated CMZF segments (in the input stream format); (v) Extraction of RTP encapsulated CMZF segments in single encryption format; (vi) Conversion of one or more encryption scheme streams to single encryption scheme streams; (vii) Extraction of ABR delivery format segments (CMAF/ISOBMFF/HLS-TS segments) from the various scheme streams.

Figure 4F:
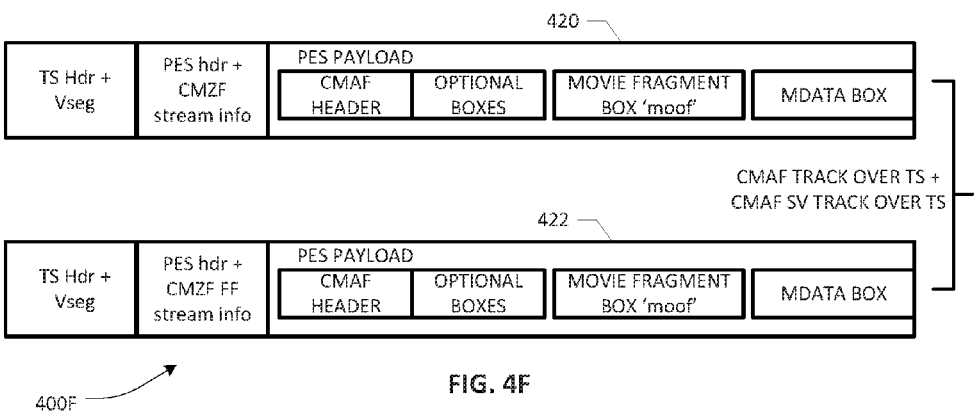
Figure 4G:
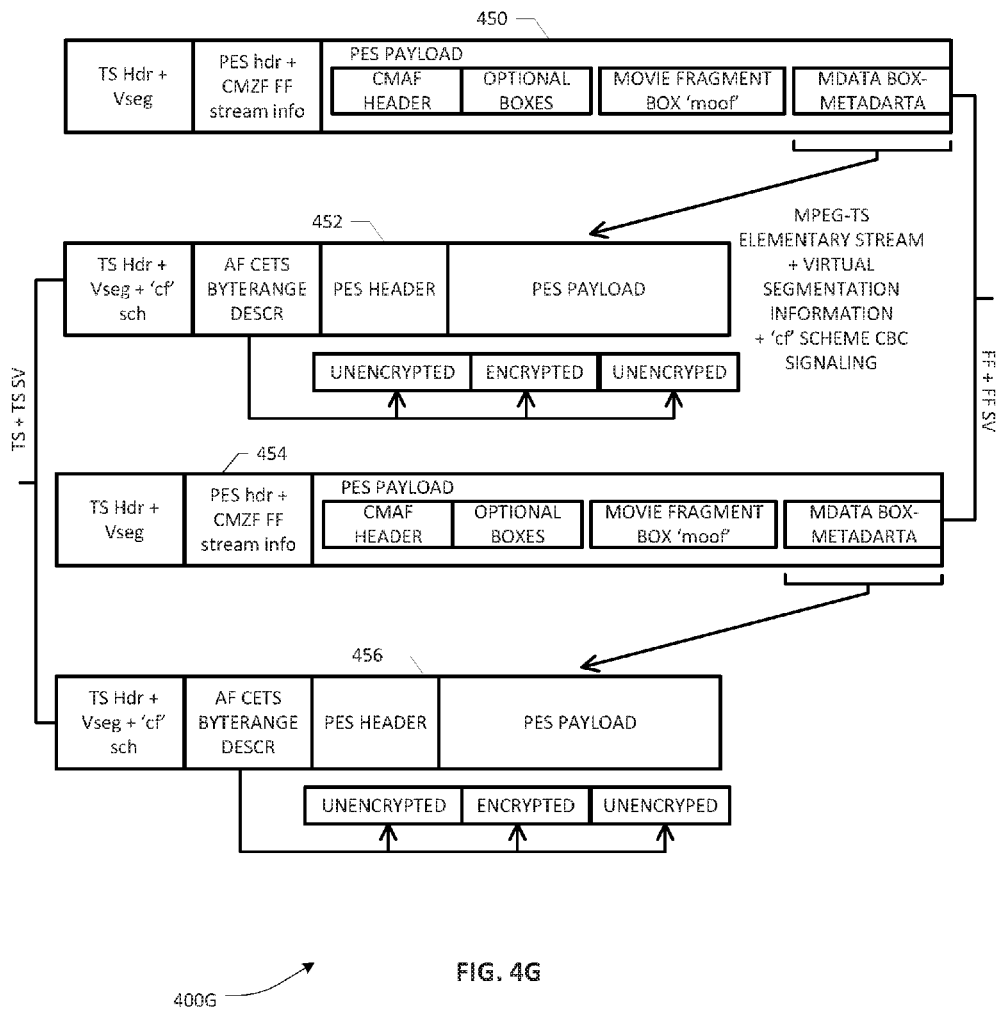

In further detail, an example MFX module/functionality with respect to a specific CMZF input stream scheme CMZF-FF-CBCS-CENS-SV-SCH, highlighted in Table 3 above, which may have elementary stream structure 400F of FIG. 4F, may be described as follows:

[A] CMZF-FF-CBCS-CENS-SV-SCH stream to CMZF-FF-CBCS-SCH transformation: In this case one or more encryption scheme CMZF stream is transformatted into single encryption (CBCS) CMZF scheme stream. The output stream is a CMAF/ISOBMFF over TS unicast/multicast stream for downstream consumption, e.g., by STB, Reach device, and/or EMR. Here, the MFX module extracts only the main video stream (CBCS stream) PID PES packets from the input MPEG-TS stream and forwards them to the new output TS stream (with new PAT/PMT descriptors). The output stream will have single PID corresponding to the main video stream.

[B] CMZF-FF-CBCS-CENS-SV-SCH stream to CMZF-FF-CENS-SCH transformation: This transformation is more involved than the embodiment above. In this case, again, a single encryption (CENS) CMZF scheme stream is generated from the input stream. The output would be a CENS based CMAF over TS stream. The input stream has main CMAF over TS stream and sample variant CMAF track over TS secondary stream. The MFX module creates a new output TS stream with CMAF over TS with CENS scheme, along with generating new PAT/PMT descriptors. It also creates CENS MOOF fragments from the data from both main video track and sample variants track. Most of the unencrypted data preferably comes from the main video track and the encrypted data comes from the sample variants track. The CENS CMAF/ISOBMFF track will have all the corresponding track and encryption metadata boxes in it. The CENS MOOF fragments may be encapsulated in the TS PES packets, which carry the same corresponding presentation and decoding timestamp values (PTS/DTS values) from the input stream. The main video samples and the sample variants samples are provided as time parallel samples. The generated output stream will be CMAF over TS with CENS scheme, which can be unicast and/or multicast and may be consumed by the downstream STB/Reach device/EMR.

[C] CMZF-FF-CBCS-CENS-SV-SCH stream to CMAF/ISOBMFF Segment transformation: In this case, MFX module transforms the input stream to CMAF/ISOBMFF segments for ABR delivery. Since the input stream carries both CBCS/CENS schemes, the outputs can be CMAF/ISOB-MFF segment with CBCS encryption or CENS encryption. In the case of CMAF/CBCS segments, MFX module generates CMAF/CBCS segment from the input CMZF stream. MFX module processes the main video PES packets and extracts the CMAF MOOF fragments from the PES packets and generates CMAF ISOBMFF track segment with all the CMAF track metadata and CBCS related encryption metadata. In the case of CMAF/CENS segments, MFX module generates CMAF/CENS segment from the input CMZF stream. MFX module processes both CMAF MOOF fragments samples from the main video stream PES packets and CMAF sample variants track sample from the secondary sample variants elementary stream. It combines the data from main and sample variants track to create MOOF fragments for CENS CMAF track. The output track will have all the corresponding CMAF metadata tracks and encryption related metadata boxes.

[D] CMZF-FF-CBCS-CENS-SV-SCH stream to RTP/TS encapsulated CMZF Segment transformation: In this embodiment, MFX module (in an EMR component) generates CMZF segments for storage and DVR workflows. The output CMZF segments in this scheme can be segments with single or one or more encryption schemes. The CMZF segments are typically TS segments. In addition, these CMZF segments may be RTP encapsulated. Where RTP encapsulated one or more encryption scheme CMZF segments are generated, the input stream may be used to cut or cleave the CMZF segments of certain segment duration (for example, 2 seconds or 6 seconds). In one arrangement, these segments may have the same number of elementary streams as does the input scheme stream. In addition, these TS segments may be RTP encapsulated. The TS stream may be provided with an RTP header, with TS packets as payload. These RTP encapsulated CMZF segments may again be transformed by the EMR to appropriate ABR delivery format by a downstream EMR for client delivery. In a single encryption scenario, RTP encapsulated CMZF segments may be transformatted to single encryption scheme, e.g., CMAF/ISOBMFF CBCS segment or CMAF/ISOBMFF CENS segment. MFX module may be configured to process the CMZF segment and generates requested output ABR segment. MFX module may further extract or generate the appropriate MOOF fragments with corresponding metadata boxes and corresponding encryption metadata boxes.

[E] CMZF-FF-CBCS-CENS-SV-SCH stream to RTP/TS encapsulated CMAF/ISOBMFF Segment transformation: In this embodiment, the input stream is transformatted to single encryption scheme CMAF segment(s) carried in the RTP/TS encapsulation. The MFX module extracts the appropriate MOOF fragments (from main and sample variants track, if needed) and generates the RTP/TS segment with these MOOF fragments in the PES packets.

Figure 8:
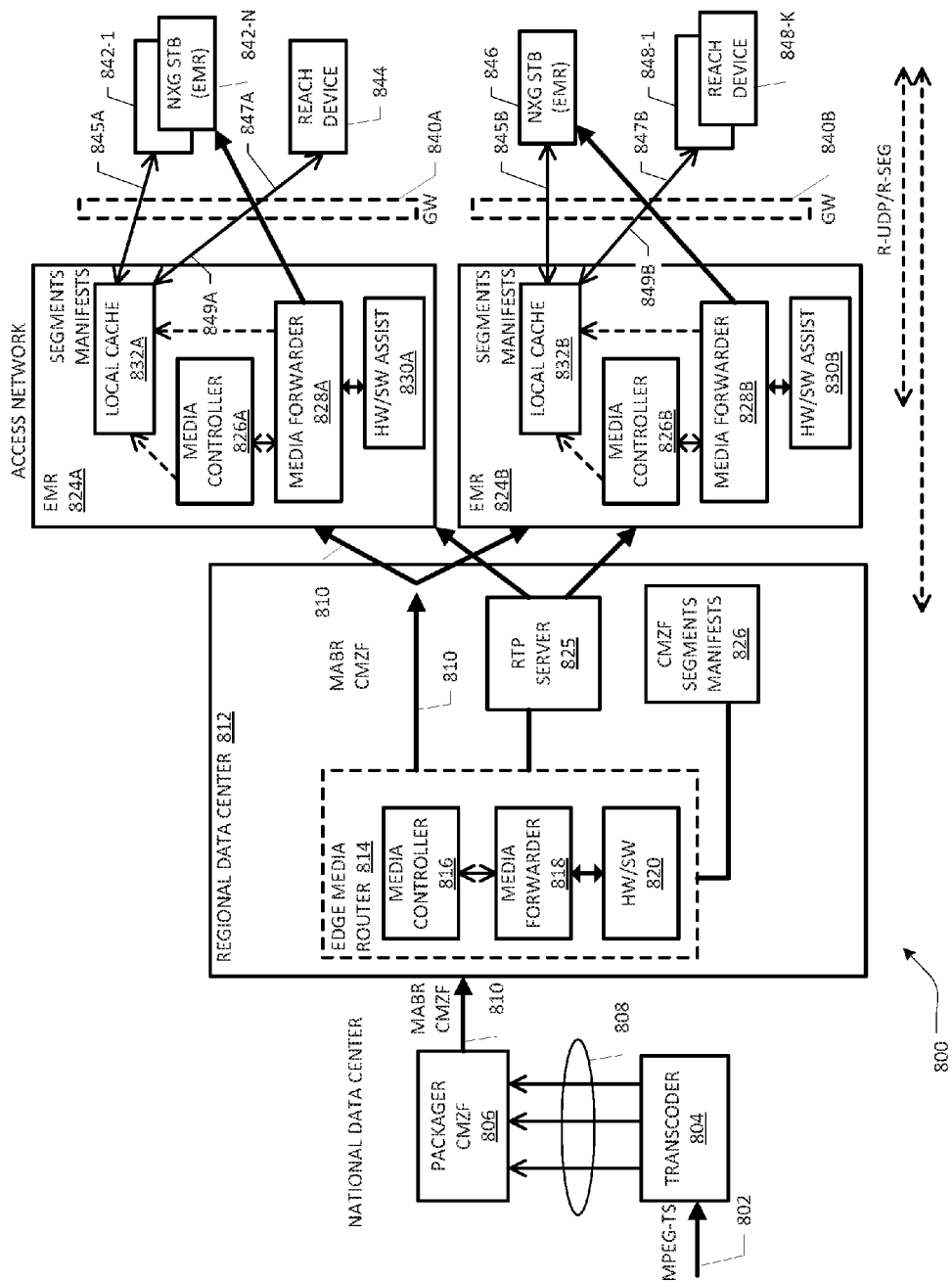
FIG. 8 depicts an aspect of the example network architecture of FIG. 1 deploying multiple EMRs at different hierarchical levels for facilitating CMZF-based media distribution and delivery to IP-based set-top-boxes (STBs) and other user equipment (UE) devices in accordance with an embodiment of the present invention.

One skilled in the art will therefore recognize that the versatility of EMR's transformatting functionality advantageously facilitates an EMR-based network architecture that enables a variety of workflows, e.g., legacy STB workflows, NXG STB workflows, as well as reach device workflows, in addition to supporting VOD, Live and Time-Shifted services, ad insertion, provisioning/enforcing various Playback Business Rules (PBRs) and Program Entitlements in a particular implementation. FIG. 8 depicts an aspect of the example network architecture of FIG. 2 deploying multiple EMRs at different hierarchical levels for facilitating CMZF-based media distribution and delivery to IP-based NXG STBs and other UE devices (e.g., reach devices) in accordance with an embodiment of the present invention. It will be apparent upon reference hereto that RDC-level EMR nodes 814 and access level EMR nodes 824A, 824B are example implementations of a more generalized EMR component described in detail hereinabove, with specific transformatting capabilities operative to support the workflows necessary for delivering media to the NXG-STB and reach end points. As illustrated, a high quality, single bitrate source media stream 802 in MPEG-TS is provided to a transcoder 804 which generates ATS streams 808 to a CMZF-based packager 806 for generating multicast CMZF streams 810, preferably comprising variant streams with one or more encryption schemes as set forth elsewhere in the present disclosure, which are provided to RDC 812 via a suitable core network infrastructure. EMR 814 associated with RDC 812 includes media controller 816 and media forwarder 818, with suitable hardware/software assist module 820 as discussed above, for providing unicast CMZF segments 822 to RDC-based origin server(s) 825. A CMZF segments/manifest storage facility 826 may be provided in association with origin servers 825 and EMR 814. In addition to generating unicast CMZF segments 822, multicast CMZF stream and associated stream manifest 810 is further provided downstream to access level EMRs 824A/824B. Origin server(s) 825 may be configured to provide unicast CMZF segments 822 to each of EMRs 824A/824B for supporting, e.g., VOD, Time-Shifted services, recovery/repair (via R-UDP/R-SEG). Each EMR 824A/824B may be configured to provide multiple client delivery formats via appropriate premises nodes/gateways 840A/840B to one or more NXG STBs and reach devices. As illustrated, NXG STBs 842-1 to 842-N and reach device(s) 844 are served via gateway or some other wired/wireless access node 840A. Likewise, NXG STB(s) 846 and reach devices 848-1 to 848-K are served via gateway or access node 840B. To support the necessary transformatting functionality, each EMR 824A/824B is provided with media controller 826A/826B, media forwarder 828A/828B, associated hardware/software assist modules 830A/830B, as well as respective local caches 832A/832B. Media forwarder 828A/828B is operative to generate a single encryption multicast CMZF stream to NXG STBs, which may be provided as RTP encapsulated MPEG-TS streams 847A/847B. Unicast segments in DASH, HLS, etc. may be provided to the reach devices, e.g., as exemplified by segment paths 849A and 849B. Unicast segments may also be encapsulated in RTP for delivery to respective NXG STBs as illustrated by RTP paths 845A/845B. As noted previously, NXB STBs as well as reach/UE devices may also include suitable EMR functionality in additional or alternative arrangements of the environment 800 set forth hereinabove.

Figure 9:
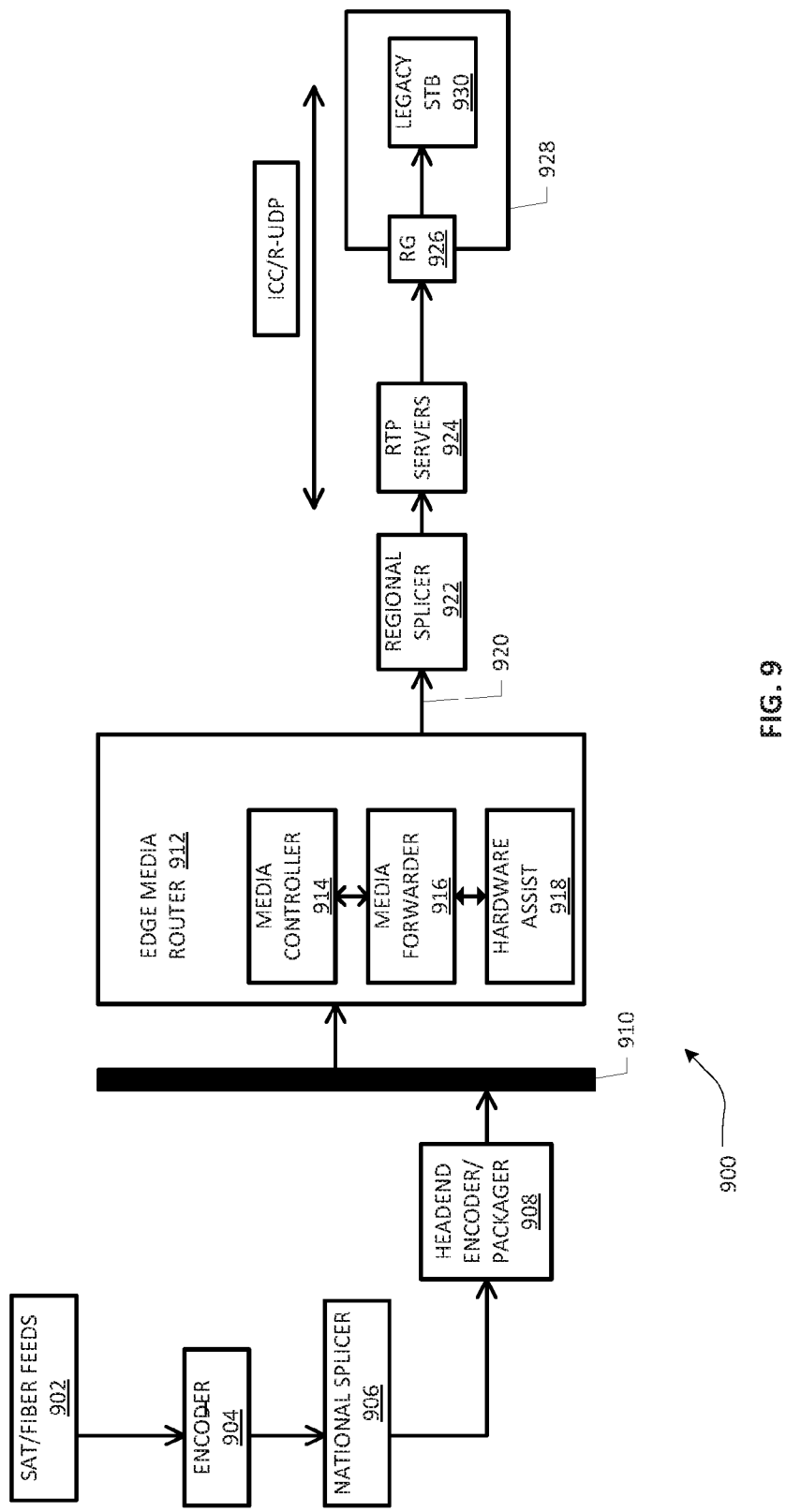
FIG. 9 depicts an aspect of the example network architecture of FIG. 1 deploying an EMR in a regional distribution network for facilitating CMZF-based media distribution and delivery to a legacy STB in a streaming environment according to an embodiment of the present invention.

FIG. 9 depicts an aspect of the example network architecture of FIG. 2 deploying an EMR in a regional distribution network for facilitating CMZF-based media distribution and delivery to a legacy STB in a streaming environment according to an embodiment of the present invention. Similar to the description of FIG. 2, satellite/fiber feeds 902 are provided to an encoder 904 whose output is processed by a national ad insertion splicer 906. A headend encoder/transcoder/packager node 908 generates MABR CMZF streams and manifests which are provided via a backbone 910 to an RDC-level EMR 912, which is configured to convert/transformat the CMZF stream to RTP/MPEG-TS stream 920. A regional ad splicer 922 may be deployed to facilitate regional ad insertion into the RTP/MPEG-TS stream, which may be propagated via RTP servers 924 for effectuating ICC/FCC. The RTP/MEPG-TS stream is provided to gateway or other premises node 926 serving a legacy STB 930 disposed in subscriber premises 928. As one skilled in the art will recognize, the legacy STB 930 may be provided with appropriate decoder functionality to decode the received RTP/MPEG-TS stream (e.g., encrypted with CBC CF encryption scheme) and provide the decoded data to a renderer or display device.

Although the foregoing example network environments illustrate a static or fixed deployment of EMR components at different hierarchical network levels, it should be appreciated that EMR components of the present invention may also be dynamically instantiated and provisioned in a more flexible manner at various levels of the architecture to facilitate JIT packaging coupled with CMZF-based distribution according to still further additional or alternative embodiments. A higher-level service manifest control layer may be provided with respect to controlling the streams across the various levels and/or domains (including, e.g., additional service providers) in an end-to-end architecture, wherein one or more service manifests may include metadata relating to any phase in the distribution and delivery of the media, such as entitlements associated with the media, limitations on how the media is to be prepared, etc., so that the actual control of the media may be decentralized.

Entitlements, in the context of media distribution and delivery, refer to the business rules that define the relationship between the media and the user, i.e., how the media can be consumed. Entitlements can include who may access the media, when and where and requires the correlation of subscriber, content rights, and the delivery end point or device. In order to manage entitlements across a distributed network, identification may be normalized for both content and users across the network and appropriate analytics may be propagated throughout the network.

Whereas a stream manifest is a network element that controls bitrates, formats, and the associated resources, service manifests, generated by service manifest controllers, may include metadata information with respect to the creation/enforcement of entitlements by providing appropriate end-to-end control. In an arrangement, service manifest controllers (SMCs) may be provided at multiple locations across the network. Typically, each regional data center may have one or more SMCs. Additional SMCs may be created for any portions of the network where it is desired to provide business rules for a specific part of the network. For example, downstream manifest controllers may be created for: (i) crossing from the super headend to regional headends; (ii) crossing from the core network to the edge network; (iii) crossing from one network administrative domain to another; (iv) handing off between wireline and wireless networks; and (v) traversing between wholesale and access networks, etc.

Figure 10:
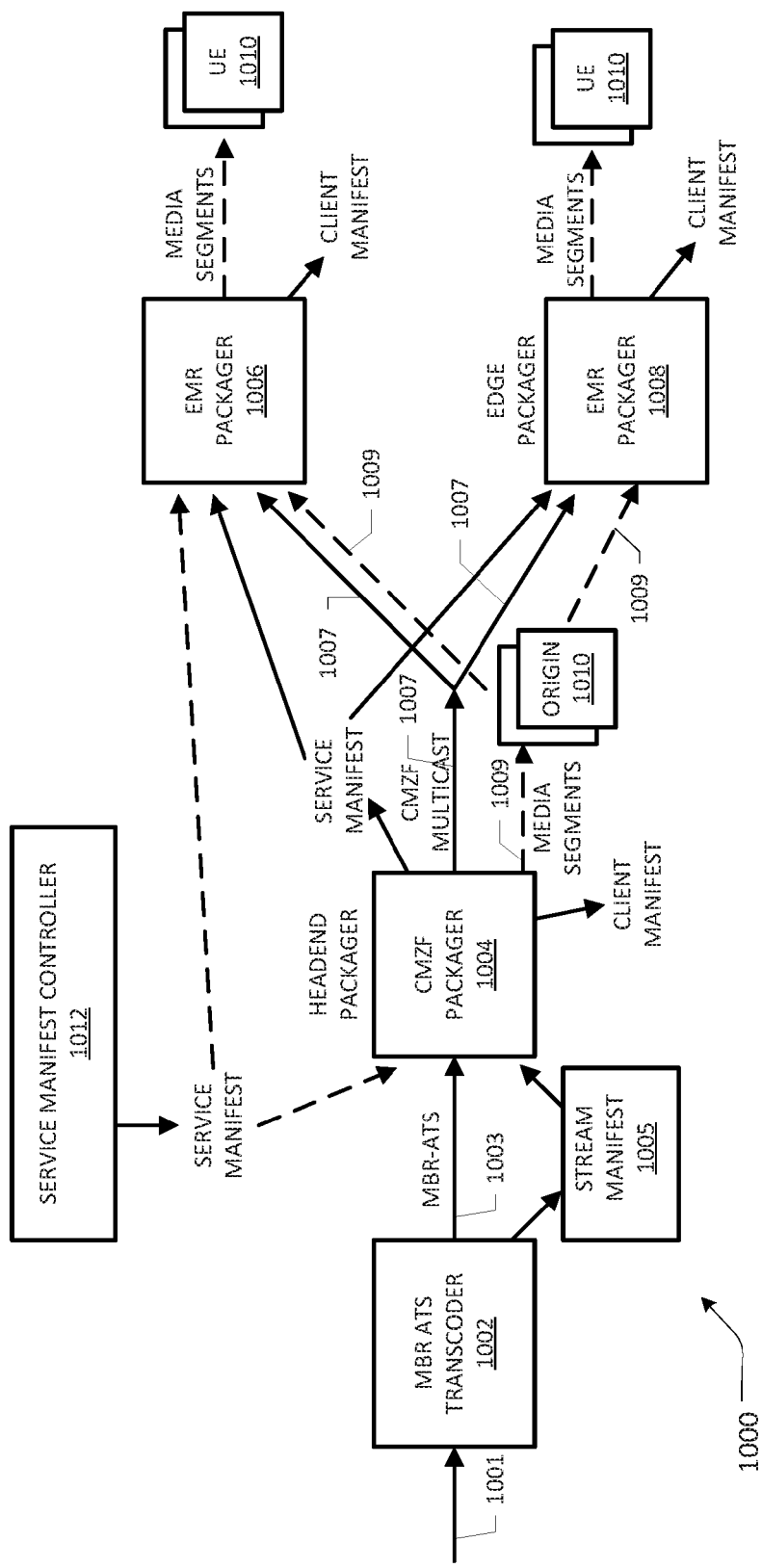
FIG. 10 depicts an example ABR media network environment wherein multiple EMRs may be dynamically coordinated with a headend CMZF packager according to a further aspect of the present invention.

FIG. 10 depicts an example ABR media network environment 1000 wherein multiple EMRs may be dynamically coordinated with a headend CMZF packager 1004 according to a further aspect of the present invention. As before, an MBR ATS transcoder 1002 is operative to receive a source media feed 1001 in MPEG-TS and generate MBR ATS streams 1003 and associated stream manifest(s) 1005 to a headend CMZF-based packager 1004. One or more service manifests may be published by headend packager 1004 in conjunction with SMC 1012, which may be propagated to downstream EMR packagers, such as packagers 1006, 1008, disposed at different levels of a multi-domain hierarchical network architecture of the media network environment 1000. Headend packager 1004 may further be configured to provide CMZF-packaged segments 1009 to one or more origin servers 1010, which may be propagated to downstream EMR nodes 1006, 1008, as described previously. Likewise, multicast CMZF ABR streams 1007 may also be propagated to downstream nodes. The service manifest(s) may be updated and re-published by downstream EMR packagers 1006, 1008, e.g., if additional packagers (not specifically shown) are used. In one example implementation involving a push model, headend packager 1004 may use the service manifest and other information, such as the configurations of downstream packagers 1006, 1008 to determine how to distribute channels within the network environment 1000, wherein the additional information can include the channel bindings, CDN, and recording configurations, content protection using various DRM and forensic marking schemes, service configuration, channel and/or packager configuration, local business logic, etc. The edge packagers 1006/1008 may use service manifest information as well as CMZF stream manifest information to effectuate appropriate MFX operations to generate client delivery media formats various UEs 1010. Additional details regarding a packager network involving dynamically instantiated packager nodes under the control of service manifest controller(s) may be found in the following commonly owned co-pending patent application(s): (i) "DYNAMIC PACKAGER NETWORK BASED ABR MEDIA DISTRIBUTION AND DELIVERY," application Ser. No. 15/098,835, filed Apr. 14, 2016, in the name(s) of Raj Nair and Prabhudev Navali; and (ii) "DYNAMIC PACKAGER NETWORK BASED ABR MEDIA DISTRIBUTION AND DELIVERY," application Ser. No. 15/098,971, filed Apr. 14, 2016, in the name(s) of Raj Nair and Prabhudev Navali, which is/are hereby incorporated by reference herein.

In some example network architecture embodiments described above, it should be noted that part of EMR's MFX functionality at the edge/access network may include encapsulating the streams over RTP. A related feature provided at the edge/access level EMR is to support R-UDP/R-SEG functionality for facilitating ICC/FCC and packet recovery/repair. In one example embodiment, an ICC/FCC server may be provided as an R-UDP server in association with the EMR component, which uses enhanced reliability provided by R-UDP but with less overhead than is typically associated with TCP. In order to ensure certain level of quality, R-UDP may include features such as, e.g., acknowledgment of received packets, windowing and flow control, retransmission of lost packets, over buffering, etc., although not all such features may be implemented in an example network deployment. In one embodiment, R-UDP-based communications may be provided between a client and R-UDP server and/or between a downstream EMR component and an upstream R-UDP server, depending on the workflow relative to repair and ICC functionality. An example stream repair mechanism performed using R-UDP may be initiated by the client, which generates Retry requests (e.g., between STB and R-UDP server) that can be unicast or multicast. Unicast retries may involve a workflow between STB to R-UDP server whereas multicast retries may involve workflows between R-UDP servers. It should be appreciated that when a receiver reports a data loss event (e.g., periodically or otherwise), there may be enough data buffering in the client for the retry/repair workflow time.

As R-UDP involves RTP-encapsulated MPEG-TS packets (which can be either TS elementary streams or MPEG-TS ISOBMFF elementary streams), in one arrangement, R-UDP mechanisms may be based on the RTP sequence numbers. Furthermore, TS segments may carry EBP or virtual segmentation information. Pursuant to tuning to the RTP/TS multicast stream of a channel, a client may request a plurality of refill RTP packets from the EMR or associated ICC server. It should be appreciated that the requests can be for initialization packets and/or refill packets where the packets may be of different duration. Whereas the refill RTP packets may be sent via unicast or multicast, it should be appreciated that multicast mode is more scalable, with R-UDP data being delivered using UDP.

Based on a CMZF packaging scheme, an embodiment of the present invention may use additionally or alternatively what may be referred to as "R-segs", short for "RTP segments" or virtual segments delivered over RTP, by employing RTP Segment protocol (R-SEG). R-segs are segments with virtual segments information, which may be multicast using RTP in conjunction with a unicast repair mechanism. As noted previously, such segments can be based on MPEG-TS elementary streams or MPEG-TS ISOBMFF elementary streams, which can be encapsulated in RTP and delivered using HTTP or UDP. Again, segments can be of full duration or partial duration, wherein an implementation of R-SEG protocol may be based on the RTP sequence number as well as virtual segments information. Preferably, virtual segmentation information may include sub-segment information. As the client is tuned to the RTP/TS virtual segmented stream of a channel (multicast or unicast), the client can generate requests for the refill segments and/or initialization segments from the EMR/server based on the sub-segment index information in the virtual segments information fields.

Similar to the R-UDP approach, R-segs may comprise refill segments or ICC segments, and may be of different segment durations, which may be provided using unicast or multicast, although multicast may be preferred for scalability. For unicast, either HTTP or UDP may be used, while multicast uses UDP. Signaling information may comprise RTP sequence, segment number, sub-segment number, wall clock information, channel mapping table (e.g., in the EMR/FCC server) provided via suitable header fields of the RTP packets. As the segments can be partial, a segment may include a single ISOBMFF fragment and may start with different types of stream access points (SAPs).

With respect to an embodiment of RTP-based FCC, a unicast mode may be used for transmitting a burst of video and audio packets corresponding to the point at which the channel change is requested. Accordingly, this functionality may be implemented by having FCC servers tuned to the multicast channels being supported by the EMR. In an example arrangement, therefore, an FCC server may receive and cache the multicast streams, e.g., for a period of time of a live program. During a channel change, responsive to the user request, the FCC server delivers a unique burst and RET packets to the viewer's STB. Further, any visual and audio distortion due to packet loss may be repaired/recovered by resending lost video packets. As the burst is being played by the client, the requested channel's multicast stream may be joined at a suitable point, e.g., pursuant to an IGMP join operation, thereby resulting in a relatively fast and seamless channel change experience to the viewer. In another embodiment, R-UDP may be reused in combination with R-SEG and HTTP to help improve performance under lossy conditions where R-UDP alone may have known reliability issues. This can be alleviated by using http byte range requests for requesting parts of the R-seg file to fill the gaps and for ICC. It should be noted that while HTTP may also have latency, it would limit performance degradation to a floor during the channel change in an example embodiment.

Accordingly, one skilled in the art will recognize that an embodiment of the present invention may provide ICC functionality based on either or both approaches, by utilizing the R-UDP and/or R-SEG protocols. In an illustrative scenario, the client tunes to the RTP/TS virtual segmented multicast/unicast stream, followed by a request for ICC R-UDP packets or RSEG-segments. Such a request may include RTP sequence, segment and sub-segment information, wall clock information, etc. Whereas a UDP request is generated for R-UDP, HTTP or UDP request may be used R-SEG. The receiving EMR/server responds with unicast/multicast R-UDP packets or R-SEG segments, which are received, buffered, decoded/decrypted and rendered by the client device, while waiting for the requested stream to be joined.

Figure 11:
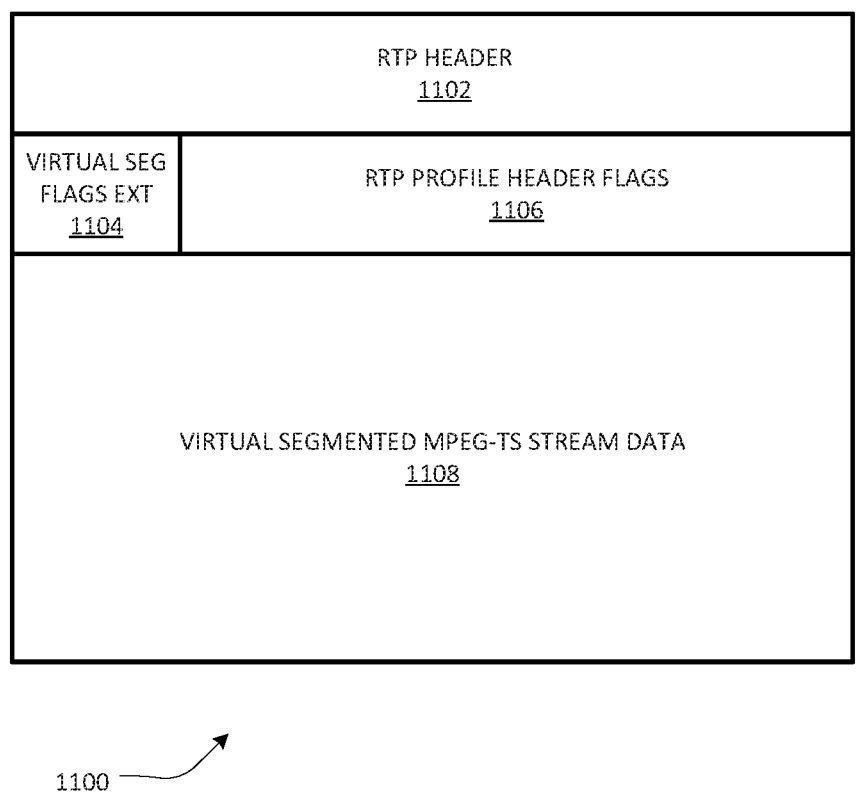
FIG. 11 depicts an example Reliable User Datagram Protocol (R-UDP) over RTP packet structure configured to carry virtually segmented TS stream data according to an embodiment of the present invention.

FIG. 11 depicts an example R-UDP over RTP packet structure 1100 extended or otherwise configured to carry virtually segmented TS stream data according to an embodiment of the present invention. A header portion 1102 may comprise RTP header information. A virtual segment flags extension 1104 as well as RTP profile header flags 1106 may be provided as part of the example packet structure 1100. Payload 1108 of several bytes may include virtual segmented RTP/TS stream A/V data, metadata, etc., that may be signaled via header extensions 1104 to indicate the various pieces of timing/SAP and segment EBP information, etc. as noted above. Skilled artisans will recognize that another example RTP packet structure may also comprise one or more suitably modified header fields, etc., for signaling TS or ISOBMFF elementary streams having virtual segmentation for purposes of R-SEG implementations of the present invention.

Figures 1, 14A:
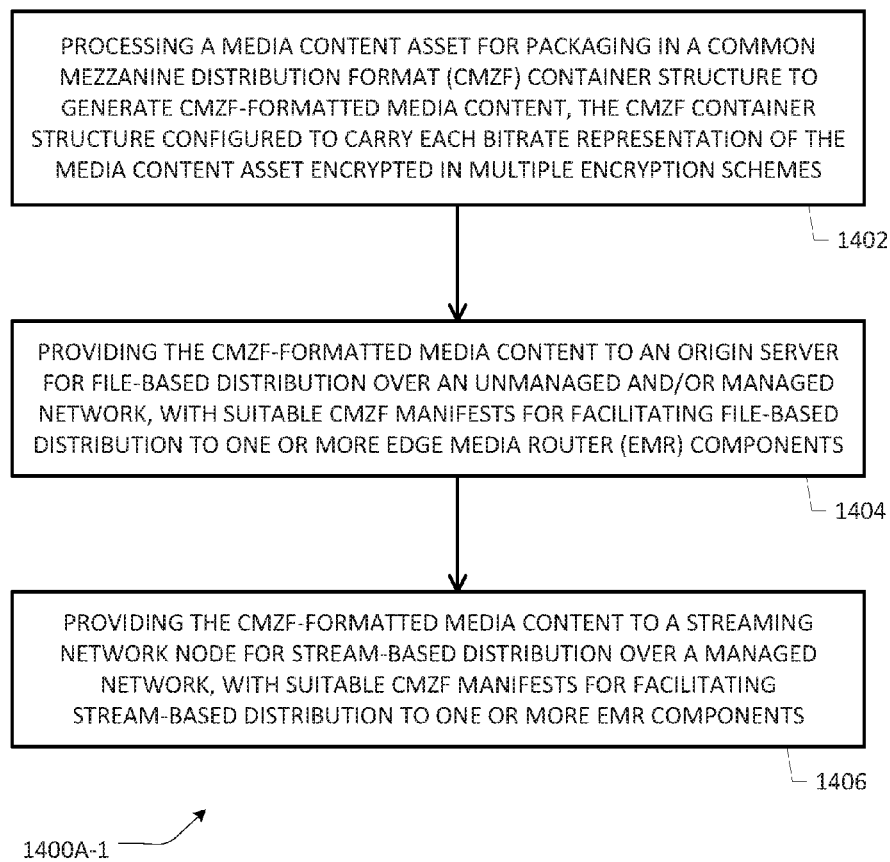
Figures 2, 14A:
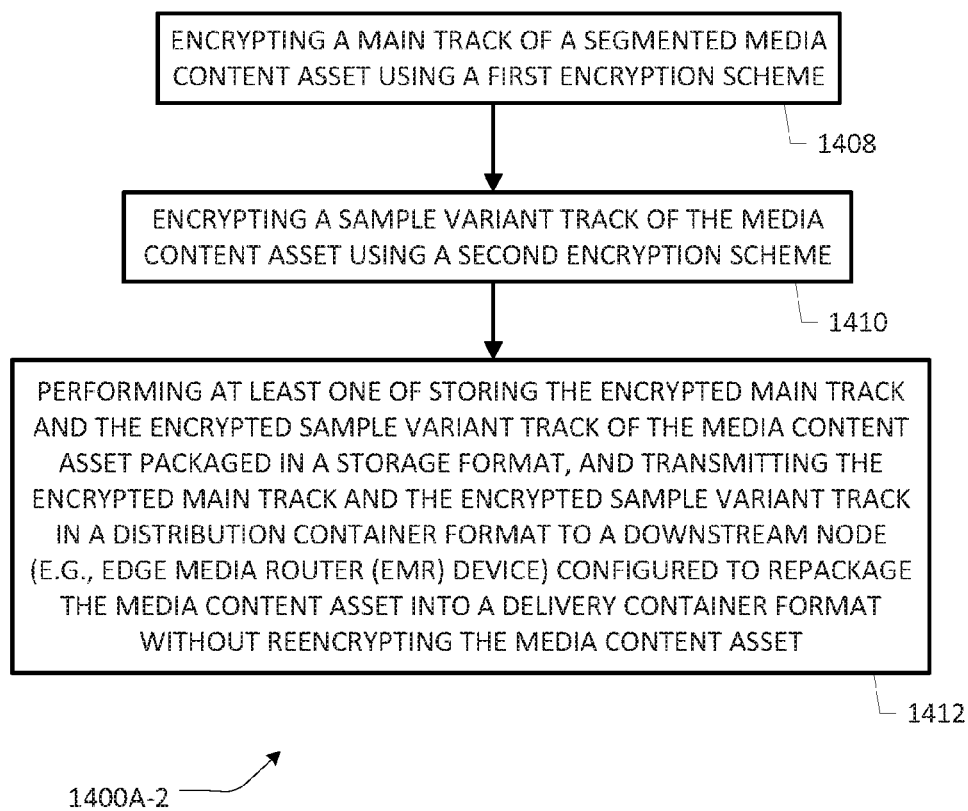

Turning now to FIGS. 14A-1, 14A-2 to 14D, depicted therein are flowcharts of various steps, blocks or acts that may be combined or arranged into one or more embodiments for facilitating distribution of content with end-to-end encryption in an example streaming network according to the teachings of the present patent application. Process 1400A-1 of FIG. 14A-1 is representative of some of the blocks, functions and/or acts that may take place at an upstream or headend facility according to an embodiment. At block 1402, a media content asset may be processed for packaging in a common intermediary/mezzanine distribution format (e.g., CMZF) container structure, thereby generating CMZF-formatted media content in a suitable, valid CMZF stream scheme. As described in detail above, the CMZF container structure may be configured to carry each bitrate representation of the media content asset encrypted in one or more encryption schemes, resulting in a variety of CMZF stream types and schemes. At block 1404, the CMZF-formatted media content may be provided to an origin server for file-based distribution over a first network infrastructure comprising at least one of an unmanaged network, managed network, a federated network, etc., or a combination thereof, with suitable CMZF manifests for facilitating file-based distribution to one or more EMR components. At block 1406, the CMZF-formatted media content may be provided to a streaming network node (e.g., node 222) for stream-based distribution over a second network infrastructure comprising at least one of a managed network, unmanaged network, and/or a federated network, etc., or a combination thereof, with suitable CMZF manifests for facilitating stream-based distribution to one or more EMR components. Although not specifically set forth in FIG. 14A-1, it should be appreciated that the first and second network infrastructures may comprise the same infrastructure or otherwise integrated or associated. Further, an additional variation may include providing for storage of the CMZF-formatted media content at a suitable storage facility, either at a headend or an upstream node.

In a still further embodiment involving distribution of media content with end-to-end encryption, e.g., using one or more encryption schemes in conjunction with an encryptor node, an exemplary process 1400A-2 at a headend or upstream node in association with a media encryptor module may comprise the following, inter alia, which may be provided independent of or in conjunction with a CMZF containerization process in another aspect of the present invention. As set forth in FIG. 14A-2, a main track of a media content asset may be encrypted using a first encryption scheme (block 1408). A sample variant track of the media content asset may be encrypted using a second encryption scheme (block 1410). Appropriate program instructions or module may be configured to perform at least one of the following as set forth in block 1412: storing the encrypted main track and encrypted sample variant track of the media content asset packaged in a storage format, e.g., any of the container formats set forth in the present patent application, and/or transmitting the encrypted main track and the encrypted sample variant track in a distribution container format to a downstream node (e.g., an EMR device) configured to repackage the media content asset into a delivery container format without reencrypting the media content asset, the delivery container format comprising a format compatible for processing by at least one of a premises gateway node, a set-top-box (STB), and a user equipment (UE) device. In a further arrangement, the downstream EMR node may be configured to distribute the encrypted main track and sample variant track(s) to another EMR node further downstream in a network.

Figure 14B:
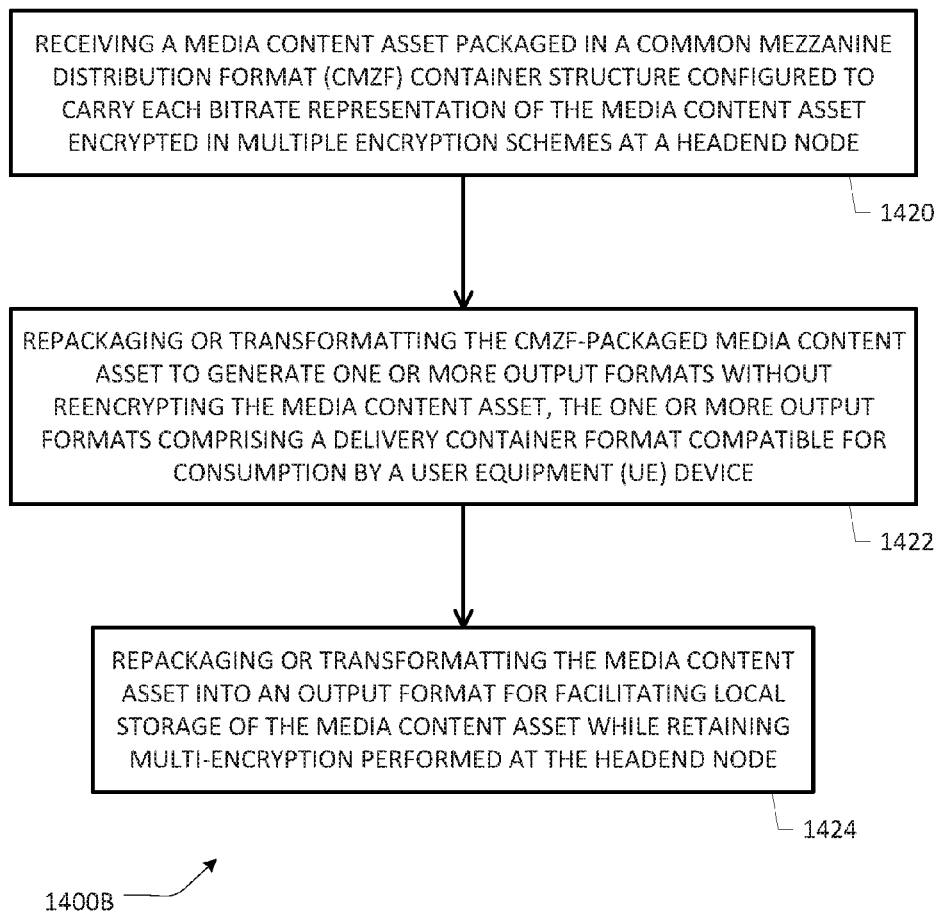

Example process 1400B of FIG. 14B is representative of some of the blocks, functions and/or acts that may take place at a downstream node, e.g., EMR component, according to an embodiment. At block 1420, a media content asset packaged in a common intermediary/mezzanine distribution format (e.g., CMZF) container structure is received by the EMR component from an upstream node or headend node. It should be appreciated that an upstream node could be an upstream EMR node in some embodiments. As noted previously, the media content asset is provided as CMZF-formatted media content in a suitable valid CMZF stream scheme, the CMZF container structure preferably configured to carry each bitrate representation of the media content asset encrypted in one or more encryption schemes at a headend or upstream node. At block 1422, the CMZF-packaged media content asset may be repackaged or transformatted to generate one or more output formats without reencrypting the media content asset, wherein the one or more output formats may comprise a delivery container format compatible for consumption by a UE device. Additionally or alternatively, process 1400B may include repackaging/transformatting the media content asset into an output format for facilitating local storage of the media content asset while retaining encryption performed at the headend node (block 1424). Additionally or alternatively, process 1400B may include providing the CMZF-formatted media content to a streaming network node for stream-based distribution over network infrastructure comprising at least one of an unmanaged network, managed network, a federated network, etc., or a combination thereof. Likewise, in a still further embodiment, process 1400B may include providing the CMZF-formatted media content to a local server for file-based distribution over network infrastructure comprising at least one of an unmanaged network, managed network, a federated network, etc., or a combination thereof. As before, the first and second network infrastructures may be shared, integrated, or otherwise associated in the same network environment. Accordingly, an additional or alternative embodiment of process 1400B may include providing or generating one or more manifests associated with a delivery container format (e.g., file-based delivery format or stream-based delivery format), which may be executed as part of the MFX functionality of a network node.

Figure 14C:
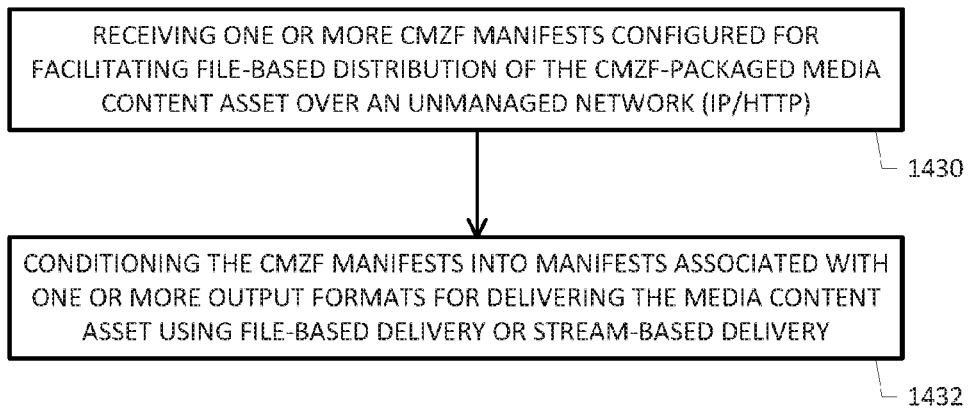
Figure 14D:
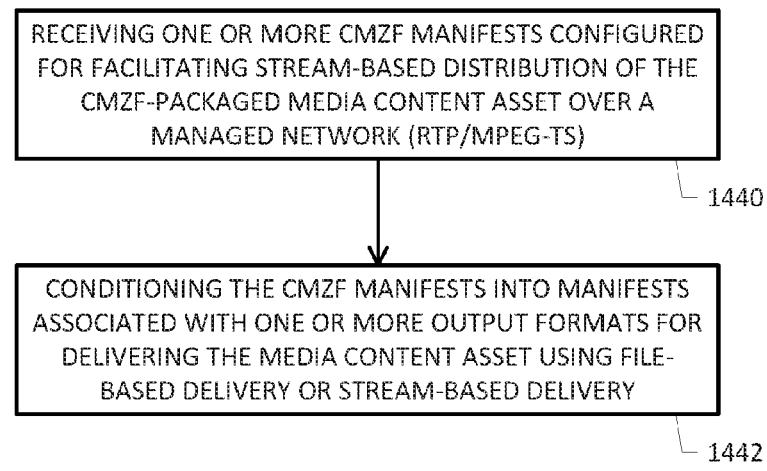

One or more processes that may be performed at a network node are exemplified by processes 1400C and 1400D of FIGS. 14C and 14D, respectively, (e.g., downstream or upstream node processing, depending on receipt/transmission of information), which may be combined/recombined with additional functions set forth herein resulting in one or more additional and/or alternative embodiments. At block 1430, a downstream node receives one or more CMZF manifests (provided/generated by an upstream node or headend node) configured for facilitating file-based distribution of the CMZF-packaged media content asset over an unmanaged network (e.g., based on IP/HTTP). The received CMZF manifests may be conditioned or otherwise modified into manifests associated with one or more output formats for delivering the media content asset using file-based delivery or stream-based delivery (block 1432). Analogously, a downstream node may also receive one or more CMZF manifests (provided/generated by an upstream node or headend node) configured for facilitating stream-based distribution of the CMZF-packaged media content asset over a managed network (e.g., based on RTP/MPEG-TS), as set forth at block 1440. Further, the downstream node may condition or otherwise modify the stream-based CMZF manifests into manifests associated with one or more output formats for delivering the media content asset using file-based delivery or stream-based delivery (block 1442).

Figure 15:
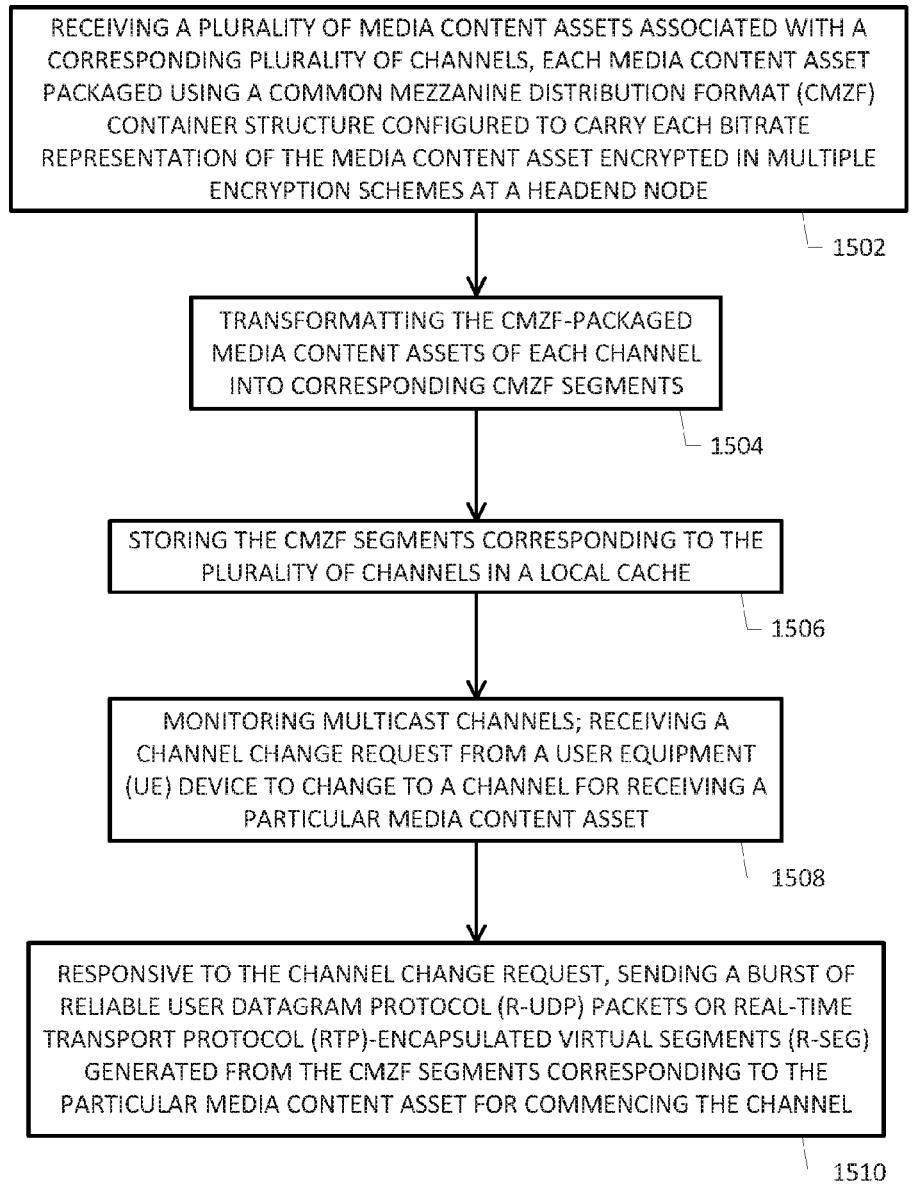
FIG. 15 is a flowchart of various steps, blocks or acts that may be combined or arranged into one or more embodiments for facilitating fast channel change in an example streaming network according to the teachings of the present patent application.

FIG. 15 is a flowchart of various steps, blocks or acts that may be combined or arranged into one or more embodiments for facilitating FCC/ICC in an example media streaming network according to the teachings of the present patent application set forth above. At block 1502, example process 1500 commences by receiving at a downstream node (e.g., EMR and/or associated ICC/FCC server) a plurality of media content assets associated with a corresponding plurality of channels, wherein each media content asset is packaged using a common intermediary/mezzanine distribution format (e.g., CMZF) container structure, the media content asset being provided as CMZF-formatted media content in a suitable valid CMZF stream scheme, the CMZF container structure configured to carry each bitrate representation of the media content asset encrypted in one or more encryption schemes at an upstream or headend node. At block 1504, the CMZF-packaged media content assets of each channel are transformatted into corresponding CMZF segments, which may be stored in a local cache (block 1506). At block 1508, various multicast channels consumed by the client devices may be monitored, including detecting that a channel change request from a UE device is received to change to a channel for receiving a particular media content asset. As noted previously, the channel change request may comprise R-UDP/R-SEG based request. Responsive to the channel change request, the EMR/server sends one of a unicast or multicast burst of R-UDP packets or RTP-encapsulated partial or full virtual segments (e.g., R-SEG segments) generated from the CMZF segments corresponding to the particular media content asset for commencing the channel, preferably using one or more R-UDP or R-SEG mechanisms described in detail above (block 1510).

As described previously, example embodiments of the present invention may be preferably configured to carry media data encrypted in one or more encryptions schemes at a headend facility, e.g., headend 202 in FIG. 2, using a CMZF-based containerization scheme. As further noted, extensions to ISO 13818-1 and ISO 23001-9 (with respect to MPEG-TS) and to ISO 23001-12 (with respect to ISOBMFF) may also be advantageously provided in order to support carriage of media data encrypted using one or more encryption schemes. One skilled in the art will appreciate that an example embodiment of the present invention may therefore involve: (i) carriage of multi-encrypted media data using CMZF containerization which uses either MPEG-TS and/or ISOBMFF extensions; (ii) carriage of multi-encrypted media data using MPEG-TS extensions only in a non-CMZF-based architecture (e.g., using the MPEG-TS containerization); (iii) carriage of multi-encrypted media data using ISOBMFF extensions only in a non-CMZF-based architecture (e.g., using the ISOBMFF containerization); or (iv) any combination hereof.

Further, it will be apparent that regardless of which multi-encryption embodiment is implemented, an example method of the present invention may involve standards-based encryption schemes such as, e.g., CENC protection scheme. In particular, example embodiments may therefore involve encryption schemes comprising any of the following: Advanced Encryption Standard (AES) 128-bit keys in Counter mode (CTR), a CENC protection scheme using AES 128-bit keys in Cipher-block chaining mode (CBC), a CENC CTR mode using a sample pattern of unencrypted bytes and encrypted bytes of the media content asset's audio/visual (A/V) data ("cens" scheme), and a CENC CBC mode using another sample pattern of unencrypted bytes and encrypted bytes of the media content asset's A/V data ("cbcs" scheme), "cf" AES-CBC encryption scheme, "ce" AES-CBC encryption scheme, etc., as previously noted. Additionally or alternatively, a plurality of encryption schemes, e.g., "cenc" and "cbc1", may be configured for deployment at a headend facility, from which a subset of encryption schemes may be selected responsive to a selection process for applying to various media content assets, e.g., depending on available cryptography techniques, program entitlements, evolving service level agreements and business rules, etc. Also, an example selection process may be configured to be dynamically executed, e.g., responsive to end user control, network operator control, content provider control, etc., or a combination, in a on-demand manner, to facilitate a paradigm of "encrypt once—distribute once—store once" in an end-to-end network architecture that advantageously reduces the costs associated with current technologies.

Example embodiments below focus on ISOBMFF-based carriage of multi-encrypted media by way of illustration, wherein different sample variants in the ISOBMFF format may be encrypted using different schemes, which may be referred to as "normalized encryption". As one skilled in the art will recognize, ISO/IEC 23001-12 [SMPLEVAR] specification defines carriage of sample variants in the ISOBMFF format, where the original use case for sample variants as defined in the [SMPLEVAR] is to carry forensic/watermarking data in the sample variants, with the variant framework being intended to be compatible with the [CENC] standard specified by ISO/IEC 23001-7. In this forensic use case, a content publisher may encode encrypted, compressed sample variant data into the ISOBMFF file and ensure that each set of sample variant data for a given sample time is encrypted with a different key and signaled with a different Key Identifier (KID). Whereas the sample variant framework [SMPLEVAR] provides three core constructs, namely, Variant Constructors, Variant Byte Ranges, and Variant Samples, to define and carry sample variant data in ISOBMFF, some of the constraints require that Sample Variants and the main track samples be encrypted with same [CENC] scheme and Variant Constructors be encrypted. According to the teachings of the present patent disclosure, embodiments herein relate to using sample variants for normalized encryption (SVNE) where sample variants may be encrypted using different, e.g., two or more, encryption schemes. In one specific illustrative use case scenario, sample variants of the present invention enable ISOBMFF tracks to carry sample data with two different encryption schemes, "cbcs" and "cens", which use subsample pattern based encryption of the video streams as noted previously (i.e., 1 out of 10 blocks (pattern) of data is encrypted). In the SVNE embodiments herein, sample variants tracks are configured to carry only encrypted part of sample data (e.g., 10% of sample data) with a different encryption scheme (for example "cens" subsample pattern based scheme) from the main/base track sample data (with "cbcs" subsample encryption scheme), or vice versa. In an example arrangement, there may be provided only one sample variant for every sample, and every sample in the main track has a sample variant, thereby allowing ISOBMFF to carry video sample data with two encryption schemes at the same time with just over 10% overhead. In other arrangements, the sample variant track can have a different pattern than the main track, if needed, for example like 20% or 30% data subsample data encrypted (2 of 10 blocks or 3 out of 10 blocks etc.). In one example SVNE use case, two tracks of a media content asset may be provided, with one main track that carries samples with one (i.e., first) encryption scheme and another sample variants track that carries samples in a different (i.e., second) encryption scheme. In an illustrative arrangement, for every sample in the main track, there may be provided an associated sample variant in the sample variant track, wherein the sample variants may have the same KID(s) as the main track samples. In another arrangement, the sample variants may be provided with KID(s) different than the main track's KID.

Figure 12:
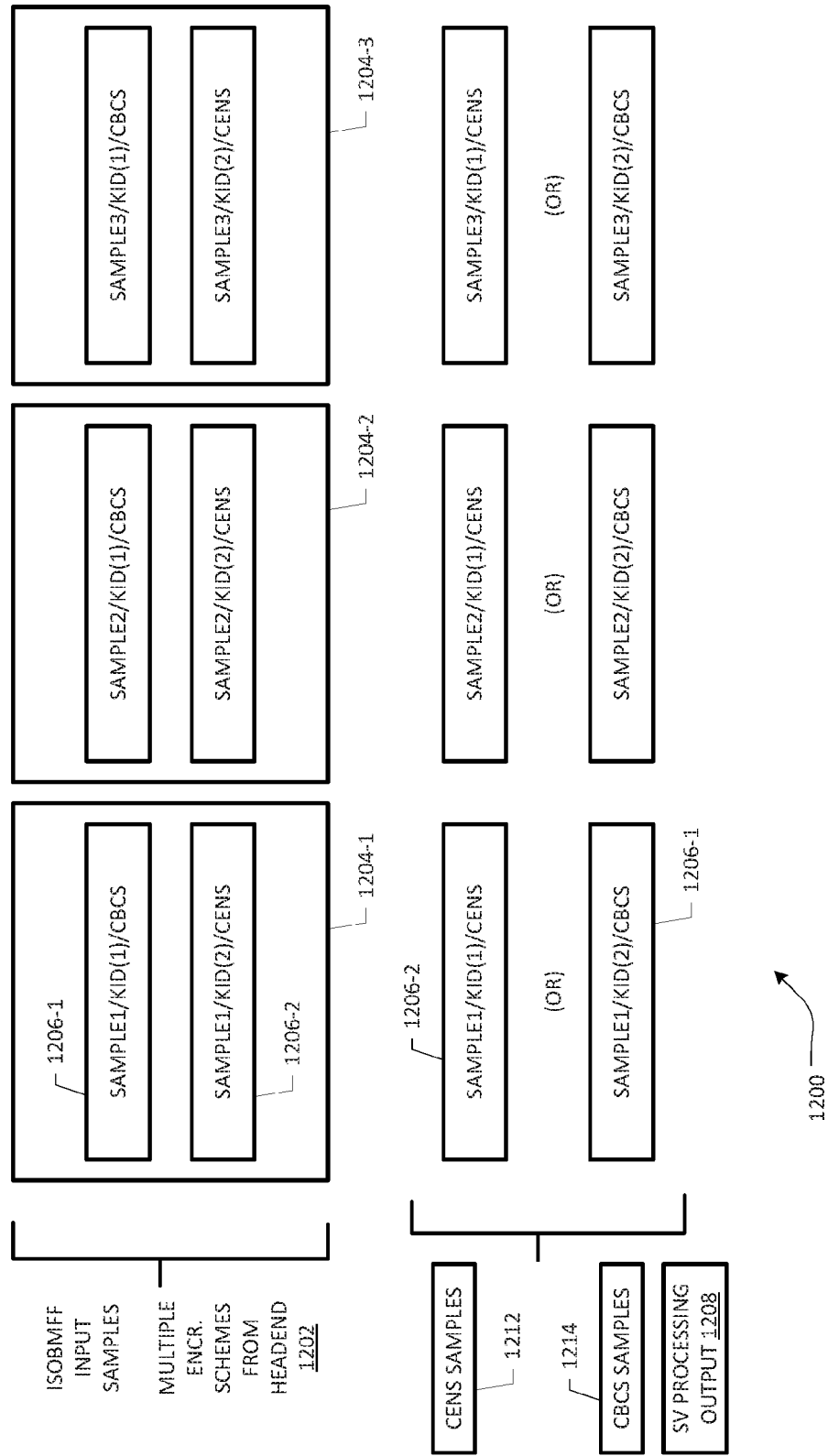
FIGS. 12 and 13 depict an example sample variant processing scheme for facilitating transmission of media with one or more encryption schemes according to an embodiment of the present invention.

FIG. 12 depicts an example SVNE processing scheme 1200 for facilitating encryption of media with multiple schemes according to an embodiment of the present invention. In the illustrated scheme 1200, three media sample blocks 1204-1 to 1204-3 are shown as a series from left to right, which represent ISOBMFF samples 1202 of a media content asset encrypted in one or more encryption schemes from a headend. The top row in each sample block comprises samples from the main track and the bottom row is illustrative of sample variants. As illustrated with respect to media sample block 1204-1, main sample 1206-1 is encrypted using "cbcs" scheme with KID(1) while corresponding variant sample 1206-2 is encrypted using "cens" scheme with KID(2), although the same KIDs may also be used in some arrangements.

Processed media content samples obtained at a receiver decoder (e.g., downstream EMR and/or UE device) may comprise samples output 1208 of a sample variant processing module (not specifically shown in this FIG.). Depending on the encryption scheme, the output may comprise either CENS samples 1212 or CBCS samples 1214. As illustrated with respect to the input media sample block 1204-1, such output may therefore comprise CENS sample 1206-2 or CBCS sample 1206-1, with respective KID values. One skilled in the art will recognize that selection of either of the two input encryption schemes (or, a particular one in the case of more than two encryption schemes) may vary from media sample block to media sample block, with or without the same KIDs, in some example implementations.

Consistent with the [SMPLVAR] specification, control/selection of encryption schemes may be located with a content publisher in the foregoing SVNE processing framework. Accordingly, a content publisher (or an authorized headend entity or agent) may be configured to encode, encrypt (using multi-encryption), and compress media sample variants into the ISOBMFF file and provide that each set of Sample Variant data for a given sample time may be encrypted with same/different key and signaled with a same/different KID, wherein the Sample Variant data for different variants of sample block is encrypted with a different encryption scheme. The content publisher (or its authorized agent) may interface with one or more suitable DRM entities to manage the release of KIDs/keys such that the playback path (for the actual sample data) is controlled and the player can only decrypt and render the data that it has been authorized to render. As will be further described in additional detail below, when a Variant Processor is not available in a decoder, an SVNE Media Track Extractor may be used to extract an ISOBMFF media track from a SVNE track, wherein the extractor generates a complete ISOBMFF media track (with complete samples and track metadata) from ISOBMFF (file or stream) that has both main track and sample variant track. The resulting ISOBMFF track comprises media track metadata, track sample data encrypted with sample variant track encryption scheme (different than main track encryption scheme).

Figure 13:
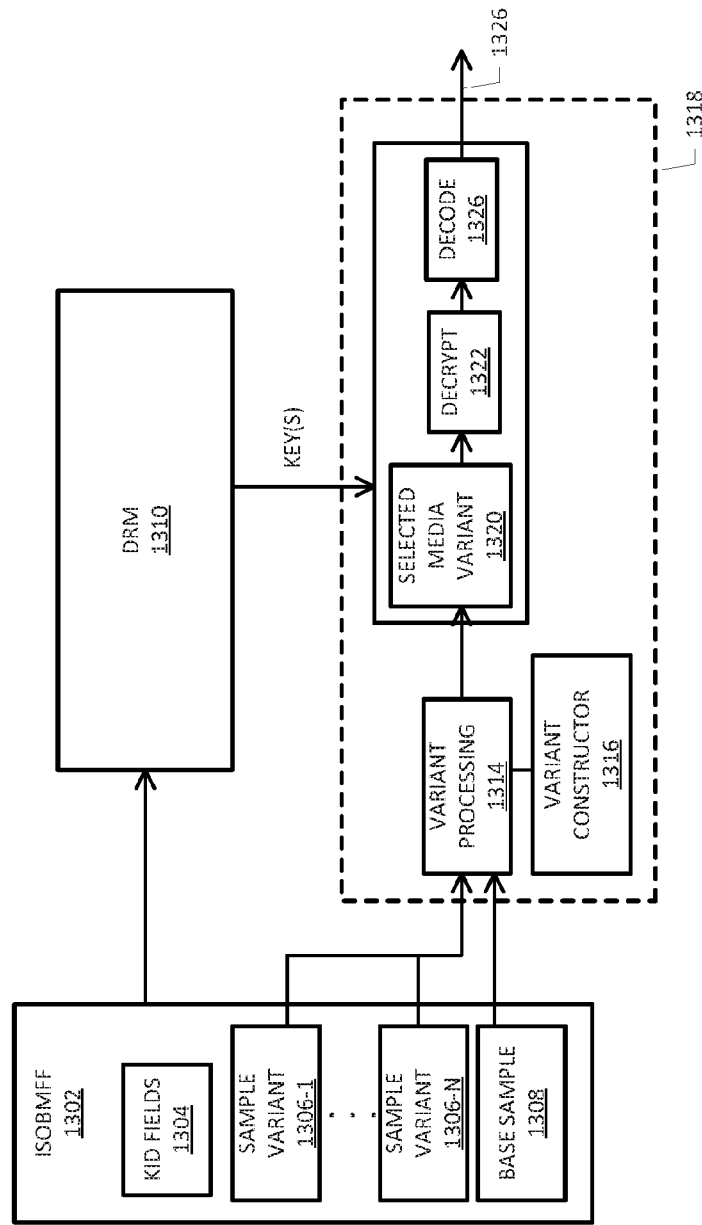

An example decoder scheme 1300 for processing SVNE-based files (or segments) is shown in FIG. 13. ISOBMFF-containerized and multi-encrypted media content asset (or sample blocks) may be provided, generated and/or propagated from an authorized upstream node or entity 1302 wherein a plurality of sample variants (preferably time-parallel sample variants) 1306-1 to 1306-N are associated with a base sample or main track 1308, along with associated KID values/fields 1304, for the media content asset. A DRM entity 1310 is operative to interface with the upstream node (e.g., a headend facility, an RDC facility, etc.) and a receiver/decoder module 1318 executing at a downstream entity (e.g., an ERM, STB, or a client reach device) 1312. A Variant Constructor block 1316 is interfaced with a Variant Processor block 1314 operative to receive the encrypted media base sample and variant sample tracks. A processed output sample having a specific encryption scheme is selected by a media variant selector 1320 operating in conjunction with or as part of Variant Processor 1314. The selected encrypted output sample is provided to a decryptor module 1322 and associated decoder 1324, which together may comprise a standard CENC decoder in an example implementation involving "cens" and "cbcs" schemes. The decrypt/decode of the selected encrypted output sample is facilitated by appropriate key(s) received from DRM 1310, whereupon the decrypted/decoded sample may be presented to either a native and/or connected renderer/player (not shown).

Several aspects related to using suitable Variant Constructors, Variant Samples and Variant Byte Ranges in an example SVNE implementation are set forth in additional detail in the following sections. In the context of the present patent application, a Variant Constructor defines which bytes are used to assemble a Sample Variant. According to an example SVNE use case implementation, there may be only one Variant Constructor defined for a given ISOBMFF sample. The Variant Processor may use a Variant Constructor if the Variant Processor has access to the Variant Constructor. A Variant Constructor may be configured to define which data is used to assemble a Sample Variant and the associated KID, encryption scheme and initialization vector for decrypting the Sample Variant. As noted previously, an example SVNE use case may provide that for every sample in the media track there is a sample variant and one Variant Constructor associated with it. With respect to having access to Variant Constructors, if the decoder is given access to the Media Key (i.e., encryption key associated with one or more media samples) for the sample defined by the ISOBMFF media track, an example embodiment of the present invention may determine that Sample Variant processing is not required for this sample. On the other hand, if the decoder does not have access to the original Media Key for the sample defined by the ISOBMFF media track, the Variant Processor may be given access to the Variant Constructor associated with the sample. As there may be only one Variant Constructor per sample in an example embodiment, it may be automatically made available/accessible to the Variant Processor. Preferably, only one Variant Constructor per sample may therefore be made available to the Variant Processor in one implementation. If the Variant Processor is given access to a Variant Constructor, the decoder may also be given access to the Key associated with the KID defined in the Variant Constructor.

In accordance with the teachings of the present invention, a Variant Constructor of an example SVNE embodiment may be provided in unencrypted form (i.e., not encrypted). Accordingly, it will be apparent to a skilled artisan that it is a non-encrypted Variant Constructor rather than an encrypted Variant Constructor that may be utilized for purposes of an SVNE embodiment. Further, each Variant Constructor may be configured to define a sequence of one or more Variant Byte Ranges. Each Variant Byte Range defines the location of a sequence of bytes that might constitute bytes in a Sample Variant. In an example SVNE use case implementation, Variant Byte Ranges can contain only data used as part of the sample. In SVNE use case, the sequence of Variant Byte Ranges defined in a Variant Constructor may be grouped into only one Variant Byte Range group. All the data in the Variant Byte Range in this group may be provided as part of the Sample Variant. Accordingly, it should be appreciated that there are no spurious Variant Byte Ranges in an example SVNE implementation of the present invention.

With respect to providing access to Variant Byte Ranges, if a Variant Byte Range within a Variant Byte Range group signals that the data referenced by the Variant Byte Range is unencrypted (and the Variant Processor has access to the Variant Constructor), then the Variant Processor has access to the Variant Byte Range and the associated unencrypted bytes. In [SMPLEVAR] specification, if the Variant Byte Range defined within a Variant Byte Range group signals that the data referenced by the Variant Byte Range is encrypted, then access to the Variant Byte Range and the associated bytes is controlled by the KID/Key associated with each Variant Byte Range—either the Media Key defined by the Variant Constructor if no Variant Byte Range key is defined for the particular Variant Byte Range group or by the Variant Byte Range key if one is defined. On the other hand, in an example SVNE-based embodiment of the present invention, the Variant Byte Range may be encrypted with Key defined in the Variant Constructor. Access to the Variant Byte Range and the associated data referenced by a Variant Byte Range is therefore a function of the set of KID/Key value pairs made available to the Variant Processor by the DRM. Only one Variant Byte Range within a Variant Byte Range group may be made available to the Variant Processor. Also, in an example SVNE-based embodiment, there may be no double encryption support, i.e., all the variant byte range data is preferably single encrypted with the key defined in the Variant Constructor. In one arrangement, the data source for the unencrypted data in the variant byte range may be from the associated media track sample. Accordingly, one skilled in the art will recognize that in an example SVNE-based embodiment, Variant Byte Range definitions are not encrypted—as they are part of the Variant Constructor, which is not encrypted as well.

In an example SVNE embodiment of the present invention, the data used for rendering a sample may be defined by either a Variant Constructor (if the Variant Processor has access to the Variant Constructor for the sample as set forth above), or by the media data defined by ISOBMFF. When Variant Constructors are used, the actual data used for reconstructing the sample is obtained by assembling, in the order of appearance in the Variant Constructor, the byte data referenced by the Variant Byte Ranges made available to the Variant Processor. Preferably, such a construction scheme results in a valid encrypted sample for the underlying encryption system appropriately signaled in the packaged data, e.g., as a Sample Variant. Once the Sample Variant is assembled from the Variant Byte Ranges, access to the sample data may be controlled by the Key defined in the Variant Constructor, and is therefore a function of the set of KID/Key value pairs made available to the Variant Processor 1314 by the applicable DRM entity, e.g., DRM 1310.

As noted above, the Sample Variants in an example SVNE use case scenario are encrypted according to the scheme(s) signaled in the Variant Track, e.g., "cbcs" and "cens", with a typical use case being where the main/base media track would be encrypted with either "cbcs" or "cens" scheme and the sample variant track samples would be encrypted with "cens" or "cbcs" (i.e., a scheme other than what is used for the main track). Consistent with the [CENC] specification, a pattern parameter, Pattern Block length, i.e., crypt_byte_block+skip_byte_block may be set to 10 for both "cbcs" and "cens" schemes, although variable pattern block lengths may be provided for either schemes in further embodiments. Additionally, Variant Byte Ranges of a Sample Variant may be unencrypted, or may be encrypted with a Key, which may be associated with one or more samples.

With respect to ISO storage, Sample Variant data may be stored in one or more ISOBMFF metadata tracks (variant tracks) according an example SVNE implementation. An ISOBMFF video media track (media track) may be associated with a variant track as defined further below. When an association is established between a media track and a variant track, Sample Variant processing may be executed whenever a decoder does not have access to the KID/key defined for a sample in the media track. In one implementation, a given Sample variant track is always associated with a corresponding video media track, though the converse need not always true. Further, samples within associated tracks are associated if they are time-parallel as defined below, and in an example SVNE implementation, samples in the associated tracks may always be provided to be time-parallel. Further, variant data may be stored in an ISOBMFF metadata track that complies with the following constraints: (i) the track uses the "meta" handler type in the Handler Reference Box ("hdlr") per ISOBMFF specification; (ii) the track uses the VariantMetaDataSampleEntry( ) sample entry as defined elsewhere in this document; (iii) variant data is stored in the track as samples in accordance with the definition(s) provided elsewhere in this document; and (iv) the track use the same timebase as the corresponding video media track.

Regarding the sample association, ISOBMFF tracks may be associated with variant tracks via one of the following means in an example SVNE implementation: (i) in an externally defined context; and/or (ii) in the source track (e.g., in the original media track), using a Track Reference Type Box in the Track Reference Box ("tref") of the Track Box ("trak") which has a reference_type of "svne" and one or more track_IDs that each correspond to a track_ID of a variant track that is to be referenced in the same file. In one particular SVNE use case scenario, there may be only one sample variant track associated with the media track, i.e., there will be only one track_ID. Further, the following additional requirements may apply to track_IDs in a Track Reference Type Box of reference_type "svne": (i) track_ID may have a value that does not correspond to a track_ID of a track in the same file, i.e., an example implementation may be agnostic as to defining how the referenced file containing such a track is located; and (ii) if the track_ID does correspond to a track_ID of a track in the same file, the corresponding track may be a variant track that complies with the definitions set forth herein. Moreover, variant track references defined for a media track may be defined in a Variant Constructor search order such that the Variant Processor may be configured to process variant tracks according to this order when searching for an accessible Variant Constructor. An example Variant Metadata Sample Entry for an SVNE embodiment may comprise the following syntax:

```
class VariantMetaDataSampleEntry( ) extends MetaDataSampleEntry
   ('svne')
{
    unsigned int(32) variant_constructor_scheme_type;
    unsigned int(32) variant_constructor_scheme_version;
    unsigned int(32) media_track_scheme_type;
    unsigned int(32) media_track_scheme_version;
    unsigned int(32) IV_Size;
    unsigned int(32) variant_byte_range_scheme_type;
    unsigned int(32) variant_byte_range_scheme_version;
_}
```

Associated semantics corresponding to the foregoing syntax scheme may be provided as below:

variant_constructor_scheme_type—in SVNE use case example, shall be set to 0. Variant constructor is not encrypted and will be signaled with 'svne' scheme.

variant_constructor_scheme_version—in SVNE use case example, shall be set 0.

media_track_scheme_type—in SVNE use case example, shall be set to the four character code defining the protection scheme applied to associated variant track, as defined for the schema_type field in the associated sample variant track by ISOBMFF section 8.12.5.3.

media_track_scheme_version—in SVNE use case example, shall be set to the version of the protection scheme applied to the associated sample variant track, as defined for the scheme_version field in the associated sample variant track by ISOBMFF section 8.12.5.3.

IV_Size—shall signal the size of the IV in bytes that is applied to the Variant Track (as used in the Variant- ConstructorList and VariantConstructor structures). The IV_Size shall match the IV_Size of the associated media track.

variant_byte_range_scheme_type—shall be set to 0. In SVNE use case example, there is no double encryption.

variant_byte_range_scheme_version—shall be set to 0.

As to Sample Variant data, a sample in a variant track may be defined as either empty (i.e., zero size) or in a VariantData( ) structure, with an example syntax provided below:

```
aligned(8) class VariantData
{
    VariantConstructorList( )      variant_list;
    VariantConstructor( )[ ]       variant_constructors;
    unsigned int(8)[ ]             variant_pool;
}
```

Associated semantics corresponding to the foregoing syntax scheme may be provided as below:

variant_list—the Variant Constructor list as defined elsewhere herein.

variant_constructors—the array of Variant Constructors referenced by the Variant Constructor list.

variant_pool—a pool of variant bytes that may be referenced by a Variant Constructor.

In an example SVNE implementation, the VariantConstructorList( ) defines sample specific information on the location of potential Variant Constructors for Sample Variants. Each sample definition in a variant track may have one or more Variant Constructor location entries in the VariantConstructorList( ). In one arrangement, exactly one individual Variant Constructor location entry may be used during playback of a given sample, and the Variant Processor uses the first Variant Constructor that it has access to in order of definition in the VariantConstructorList( ) structure. As noted above, there may be only one Variant Constructor per sample in an example SVNE implementation.

An example syntax for the Variant Constructor list is provided below:

```
aligned(8) class VariantConstructorList
{
    unsigned int(32)        size;
    unsigned int(8)         variant_constructors_count;
    for( i=1 ; i<= variant_constructors_count; i++) {
        unsigned int(8)[16]     vcKID;
        unsigned int(8*IV_Size) vcIV;
        unsigned int(32)        variant_constructor_offset;
        unsigned int(32)        variant_constructor_size;
    }
    unsigned int(8)[ ]      padding;
}
```

Associated semantics corresponding to the foregoing syntax scheme may be provided as below:

size—shall be set to the size, in bytes, of the VariantConstructorList( ).

variant_constructors_count—in SVNE use case example, shall be set to 1—the number of Variant Constructor entries in the constructors array in the VariantData( ).

vcKID—the "Variant Constructor KID". This KID shall indicate the ID of the Variant Constructor metadata key used for decrypting the encrypted Variant Constructor. In SVNE use case example this shall be set to 0.

vcIV—the "Variant Constructor Initialization Vector". This field shall contain the initialization vector used for decrypting the encrypted Variant Constructor. In SVNE use case example, this shall be set to 0.

variant_constructor_offset—the byte offset of the corresponding VariantConstructor( ). This offset is relative to the start of the VariantData( ).

variant_constructor_size—the length, in bytes, of the VariantConstructor( ). The combination of variant_constructor_offset and variant_constructor_size indicates the location and size of the VariantConstructor( ). The byte range defined by variant_constructor_offset and variant_constructor_size shall only reference bytes within the variant_constructors array in the VariantData( ) and no other bytes.

padding—the byte array may contain any data and be used to increase the size of the VariantConstructorList( ). In one arrangement, this padding can be used to obfuscate the actual size of the VariantConstructorList( ) if it is encrypted.

An example syntax for the Variant Constructor according to an SVNE embodiment is provided below:

```
aligned(8) class VariantConstructor
{
    unsigned int(8)[16]      KID;
    unsigned int(8*IV_Size)  IV;
    unsigned int(32)         variant_byte_ranges_count;
    for( i=1; i<= variant_byte_ranges_count; i++ )
    {
        unsigned int(8)      variant_byte_range_flags;
        if( variant_byte_range_flags & 0x02 )
        {
            unsigned int(8)[16]      vbrKID;
            unsigned int(8*IV_Size)  vbrIV;
        }
        if( variant_byte_range_flags & 0x08 ) {
            unsigned int(8)      variant_track_reference_index;
        }
        signed int(8)            relative_sample_number;
        unsigned int(32)         variant_byte_range_offset;
        if( variant_byte_range_flags & 0x06 != 0x02 ) {
            unsigned int(32)     variant_byte_range_size;
        }
    }
    unsigned int(8) [ ]      padding;
}
```

Associated semantics corresponding to the foregoing Variant Constructor syntax scheme may be provided as below:

KID—the Media KID. This KID shall indicate the ID of the Media Key that is used for decrypting the encrypted Sample Variant data after re-assembly of the applicable Variant Byte Ranges. Decryption occurs in accordance with the protection scheme signaled in the corresponding Sample Variant track.

IV—the Initialization Vector that shall be used for decrypting the encrypted Variant Media Data after re-assembly of the applicable Variant Byte Ranges in accordance with the protection scheme signaled in the corresponding sample variant track.

variant_byte_ranges_count—shall be set to the number of Variant Byte Ranges defined for this Variant Constructor. See Section 5 for more information.

variant_byte_range_flags—shall be set as follows:

0x01 encrypted When set, the Sample Variant data referenced by the Variant Byte Range shall be encrypted with the corresponding Variant Constructor Media Key.

0x02 double-enc Not used in SVNE use case.

0x04 group-start When set, the Variant Byte Range shall be the start of a Variant Byte Range group and thus provides a marker for Variant Byte Range groups within the VariantConstructor( ). As per Section 5, the Variant Byte Ranges defined in the VariantConstructor( ) are grouped into one or more Variant Byte Range groups, and one Variant Byte Range from each Variant Byte Range group is used by the Variant Processor. This therefore requires that even if there is only one Variant Byte Range defined in the VariantConstructor( ), or there is only one Variant Byte Range within a Variant Byte Range group (i.e. there are no alternative Variant Byte Ranges for a particular byte range of the Variant Media Data), that the start of Variant Byte Range group be signaled with this singular Variant Byte Range.

In one arrangement, this flag can be used by a Variant Processor to determine that a data error has occurred—if no Variant Byte Range is in a Variant Byte Range group is recognized, an error has occurred.

In SVNE use case, there is only Variant Byte Range per group.

0x08 data-source When set to 0, the data source for this range shall be the original media track. In SVNE use case, always set to 0 for the data source.

0x10 pattern-enc New flag to signal pattern encryption in SVNE use case.

When set, the Sample Variant data in the Variant Byte Range shall have the encrypted data of the pattern encrypted sample data. This flag will be used with data-source flag. When both of them are set, the combination of the encrypted bytes from the range and the data source for this range—which is media track—will be able construct the pattern encrypted sample data range. When this flag is set, the encrypted data in the range will be multiples of 16 byte blocks. The pattern will be 1 out 10 blocks—as per the Pattern Block length, i.e. crypt_byte_block+ skip_byte_block SHOULD equal to 10 for both 'cbcs and 'cens' schemes. For example if the range defines 320 bytes of pattern encrypted data—then range will have 2 blocks of 16 bytes of data. The range size will be 32 bytes. 320 bytes—20 blocks— signaled by this range will be constructed by assembling—1$^{st}$ block from the Variant Byte Range and next 9 blocks from the data-source (from media track) and then 11$^{th}$ block from the 2$^{nd}$ block of Variant Byte Range and the next 9 blocks (12-20) from the media-source (media track). All the blocks are referenced from the same variant_byte_range_offset.

vbrKID—in SVNE use case, shall be set to 0.
vbrIV—in SVNE use case, shall be set to 0.
variant_track_reference_index—shall either be the 1-based index (according to order of reference definition set forth elsewhere in this document) of the track references from this variant sample track to another variant track containing the variant data to be used; or if this value is 0, the data is drawn from this variant track. In SVNE use case, shall be set to 0.
relative_sample_number—having found the track data source (see the data-source flag and variant_track_reference_index field above), this field defines which sample data source shall be used for the Variant Byte Range as follows: when set to 0, the sample data-source is the time-parallel associated sample as set forth elsewhere in this document; when set to a negative value, the Nth prior sample is used; when set to positive value, the Nth succeeding sample is used. In SVNE use case, shall be set to 0—always in time-parallel with the media track sample.

variant_byte_range_offset—is the byte offset from the start of the referenced sample (original sample in the media track, the VariantData( ) that contains this Variant Constructor, or the VariantData( ) in a referenced variant track, depending on the data-source flag and variant_track_reference_index) to the beginning of the data for this Variant Byte Range.

variant_byte_range_size—the size of the Variant Byte Range in bytes. The combination of variant_byte_range_offset and variant_byte_range_size indicates a byte range for the Variant Byte Range in the referenced sample. The Variant Byte Range defined by variant_byte_range_offset and variant_byte_range_size shall only reference bytes within the referenced sample and no other bytes. If there is more than one Variant Byte Range in a Variant Byte Range group, this field only exists for the first Variant Byte Range as the size of Variant Byte Ranges in a Variant Byte Range group is the same.

padding—the byte array may contain any data and be used to increase the size of the Variant Constructor.

In one arrangement, this padding can be used to obfuscate the actual size of the Variant Constructor as it is encrypted.

With respect to encryption, whereas Variant Constructors in an example SVNE implementation are provided in unencrypted form, the sample encryption schemes may be signaled in the VariantMetaDataSampleEntry( ). Unencrypted Variant Constructor is signaled with four character code of "svne" and scheme_version value of 0x00010000 (Major version 1 and minor version 0) in the VariantMetadataSampleEntry( ). In an example SVNE implementation, samples may be associated as follows: (i) a sample in a media track may always be associated with a sample in a variant track referenced by the media track if the samples are time-parallel, and (ii) samples are considered to be time-parallel as follows: If To is the decode time of the sample in the original track, then the time-parallel sample in a referenced track is the sample in that referenced track that has a decode time Tv and duration D, such that $Tv \le To < (Tv+D)$. It should be noted that sample association may occur at media decode time before any consideration of edit lists or composition offset.

Figure 16A:
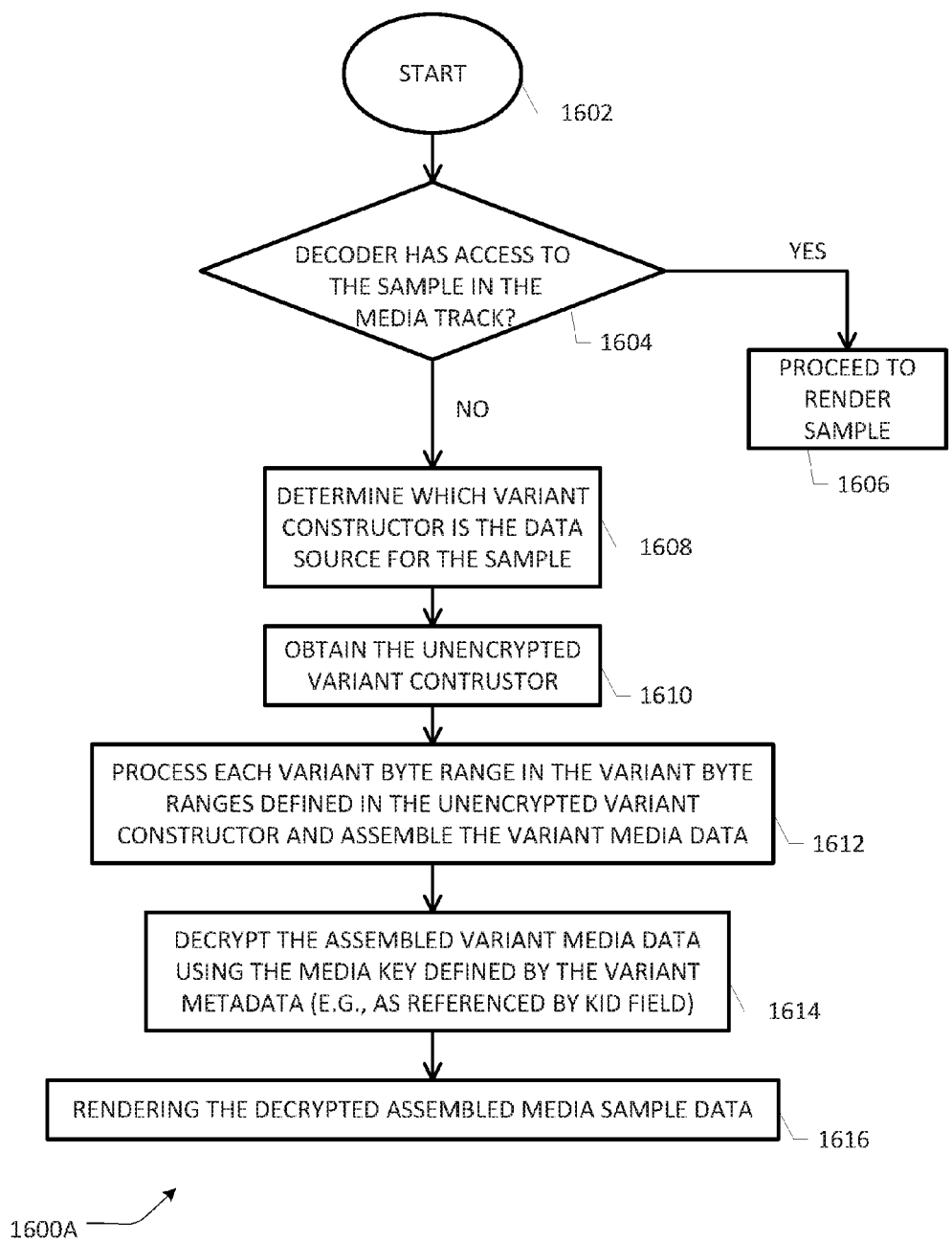
FIGS. 16A-16C are flowcharts of various steps, blocks or acts that may be combined or arranged into one or more embodiments for facilitating processing of sample variants of a media content asset having one or more encryption schemes in an example streaming network according to the teachings of the present patent application.
Figure 16B:
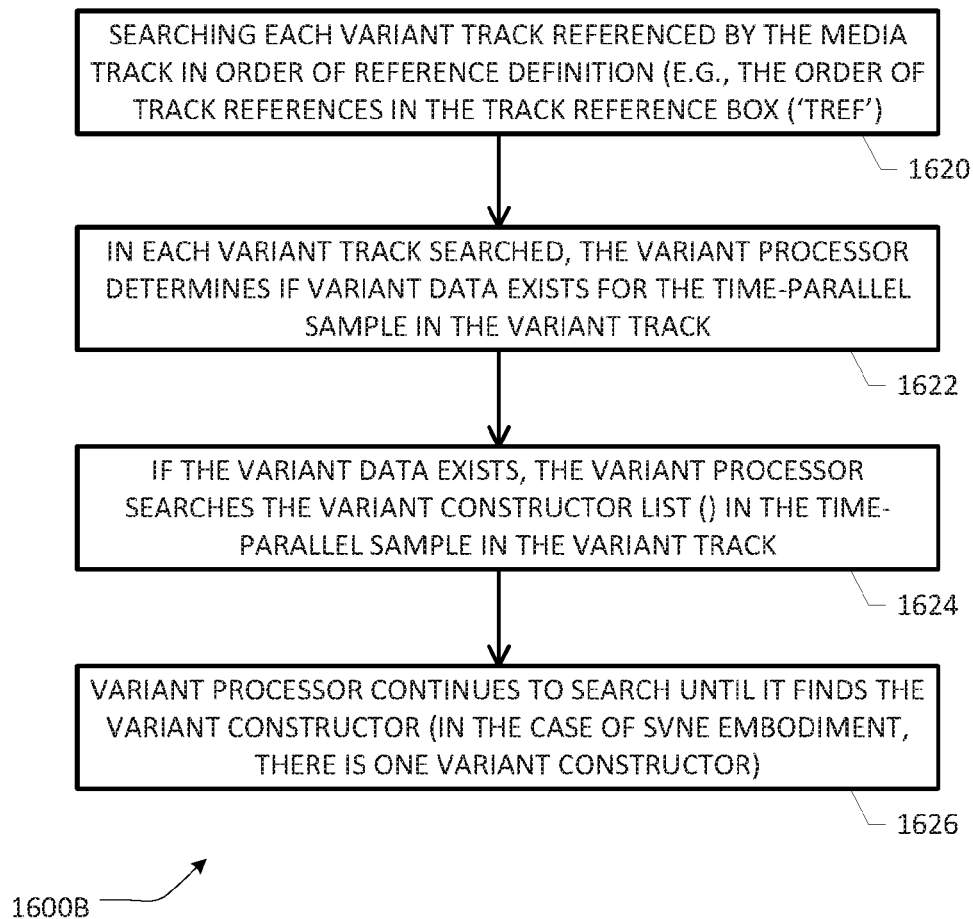
Figure 16C:
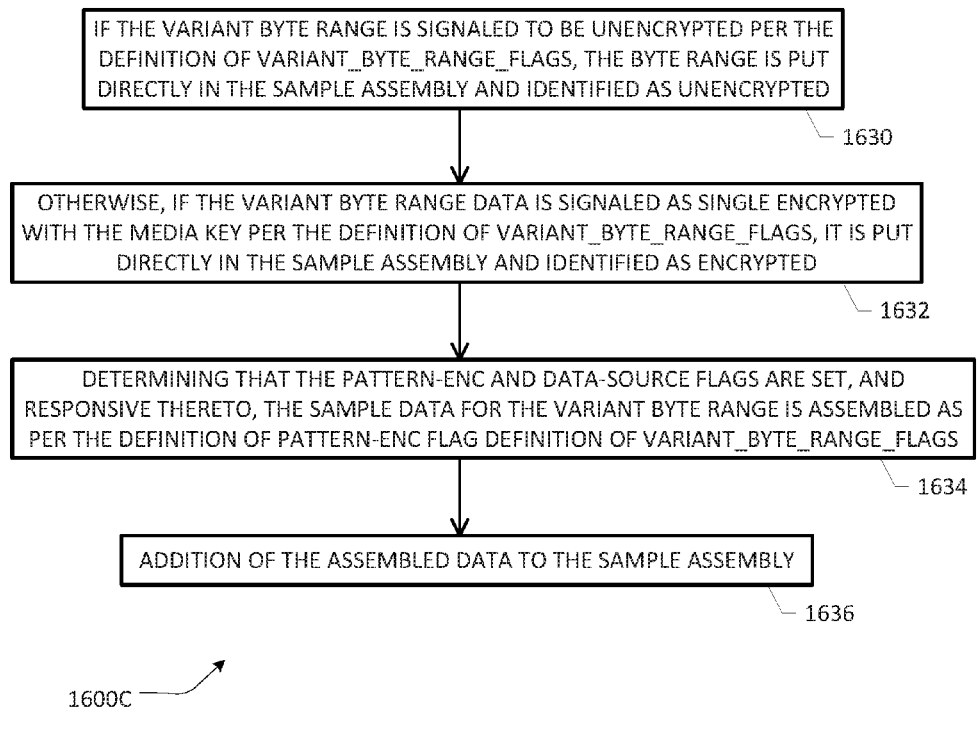

FIGS. 16A-16C are flowcharts of various steps, blocks or acts that may be combined or arranged into one or more embodiments for facilitating processing of sample variants of a media content asset having one or more encryption schemes in an example streaming network according to the teachings of the present patent application. Process 1600A in FIG. 16A refers to a Variant Processor scheme operative at a receiver-decoder in accordance with the teachings set forth above regarding Variant Constructors, Variant Byte Ranges and Variant Samples for an example SVNE implementation. Upon commencing, e.g., upon receiving a main track of a media content asset using a first encryption scheme and a sample variant track of the media content asset using a second encryption scheme (block 1602), process 1600A evaluates the data source for each sample as follows. If the decoder has access to the sample in the media track (e.g., having a main/base track and/or any sample variants), the decoder proceeds to render the sample as set forth above when a Media Key is accessible (block 1606). If the decoder does not have access to the sample in the media track (block

1604), process 1600A proceeds to determine which Variant Constructor is the data source for the sample (block 1608). In one example implementation, the Variant Processor executing at the receiver searches for an accessible Variant Constructor in accordance with a scheme 1600B set forth in FIG. 16B. At block 1620, the Variant Processor searches each variant track referenced by the media track, e.g., in order of reference definition (e.g., the order of track references in the Track Reference Box ("tref"). At block 1622, in each variant track searched, the Variant Processor determines if variant data exists for the time-parallel sample in the variant track. If the variant data exists, the Variant Processor searches the VariantConstructorList ( ) in the time-parallel sample in the variant track (block 1624). Preferably, Variant Processor may continue to search until it finds the Variant Constructor as set forth at block 1626.

Once the unencrypted Variant Constructor is obtained and ready to be processed, it is passed on to the Variant Processor (block 1610), which processes each Variant Byte Range in the Variant Byte Ranges defined in the Unencrypted Variant Constructor (e.g., sequential processing) and assembles the Variant Media Data (block 1612). FIG. 16C sets forth an exemplary process 1600C with respect to such processing according to an example embodiment. If the Variant Byte Range is signaled to be unencrypted per the definition of variant_byte_range_flags, the byte range is put directly in the sample assembly and identified as unencrypted, as set forth at block 1630. Otherwise, if the Variant Byte Range data is signaled as encrypted with the Media Key per the definition of variant_byte_range_flags, it is put directly in the sample assembly and identified as encrypted (block 1632). Additionally, a determination is made as to whether the pattern-enc and data-source flags (defined in the foregoing sections) are set, and responsive thereto, the sample data for the Variant Byte Range is assembled as per the definition of pattern-enc flag definition of variant_byte_range_flags (block 1634). The assembled data is then added to the sample assembly (block 1636). Thereafter, process flow 1600A proceeds to decrypt the assembled Variant Media Data using the Media Key defined by the Variant Metadata (e.g., as referenced by KID field) in accordance with CENC (block 1614). The decrypted assembled media sample data may then be made available to the receiver's client display device for rendering (block 1616) in an example embodiment.

An example SVNE use case scenario according to an embodiment may be illustrated as follows. Consider a Variant Constructor consisting of three byte range groups: (i) The first byte range group has one Variant Byte Range S1, which is unencrypted; (ii) The second byte range group has one Variant Byte Range S2, which is encrypted. The variant_byte_range_flags, i.e., pattern-enc and data-source are set; (iii) The third byte range group has one Variant Byte Range S3, which is unencrypted. At encryption time, the Sample Variant data associated with Variant Byte Range S1 and S3 are not encrypted, resulting in unencrypted Sample Variant data {D1, D3}. On the other hand, the Sample Variant data associated with Variant Byte Ranges {S2} is subsample pattern encrypted with Media Key K1 (KID KID1), resulting in subsample pattern encrypted Sample Variant data {D2*}. The resulting Variant Constructor will have 3 byte ranges and is structured as [|S1|S2|S3], where the symbol "|" indicates the start of a byte range group. The underlying media data is stored as {D1, D2*, D3}. If the Variant Processor has access to KID1 only, the Variant Processor will do the following: (i) Process S1, establish it as unencrypted and consequently add D1 to the sample assembly and identify it as unencrypted (as per process block 1630 above). (ii) Process S2, match KID1 and consequently add D2* to the sample assembly and identify it as subsample pattern encrypted (per process block 1632 above); (iii) Process S3, establish it as unencrypted and consequently add D3 to the sample assembly and identify it as unencrypted (per process block 1630); and (iv) Decrypt the sample assembly [D1 D2* D3] by skipping D1 and using the Media Key K1 to decrypt subsample pattern encrypted D2* and skipping D3, resulting in unencrypted Sample Variant [M1 M2 M3] (per process block 1614).

As previously noted, an SVNE Media Track Extractor may be used to extract an ISOBMFF media track from a SVNE track. The extractor may be configured to generate a complete ISOBMFF video media track (with complete samples and track metadata) from an ISOBMFF (file or stream) that has both main track and sample variant track. The resulting ISOBMFF video media track will have associated media track metadata, track sample data encrypted with sample variant track encryption scheme (different than main track encryption scheme). The SVNE Media Track Extractor may be configured to process the sample variants as specified in the process flows 1600A-C, *mutatis mutandis*, except for the step of decrypting in block 1614. The sample data will not be decrypted. The assembled sample data will be added to the new media track that the extractor is creating with the SVNE track and media track sample data. The resulting track will be an ISOBMFF video media track with sample data encrypted with subsample pattern encryption signaled by the SVNE track.

Skilled artisans will recognize that an embodiment of SVNE extraction may take place at various hierarchical levels, e.g., based on EMR location, as well as at STB/UE nodes, where media decoding may be performed.

Figure 17:
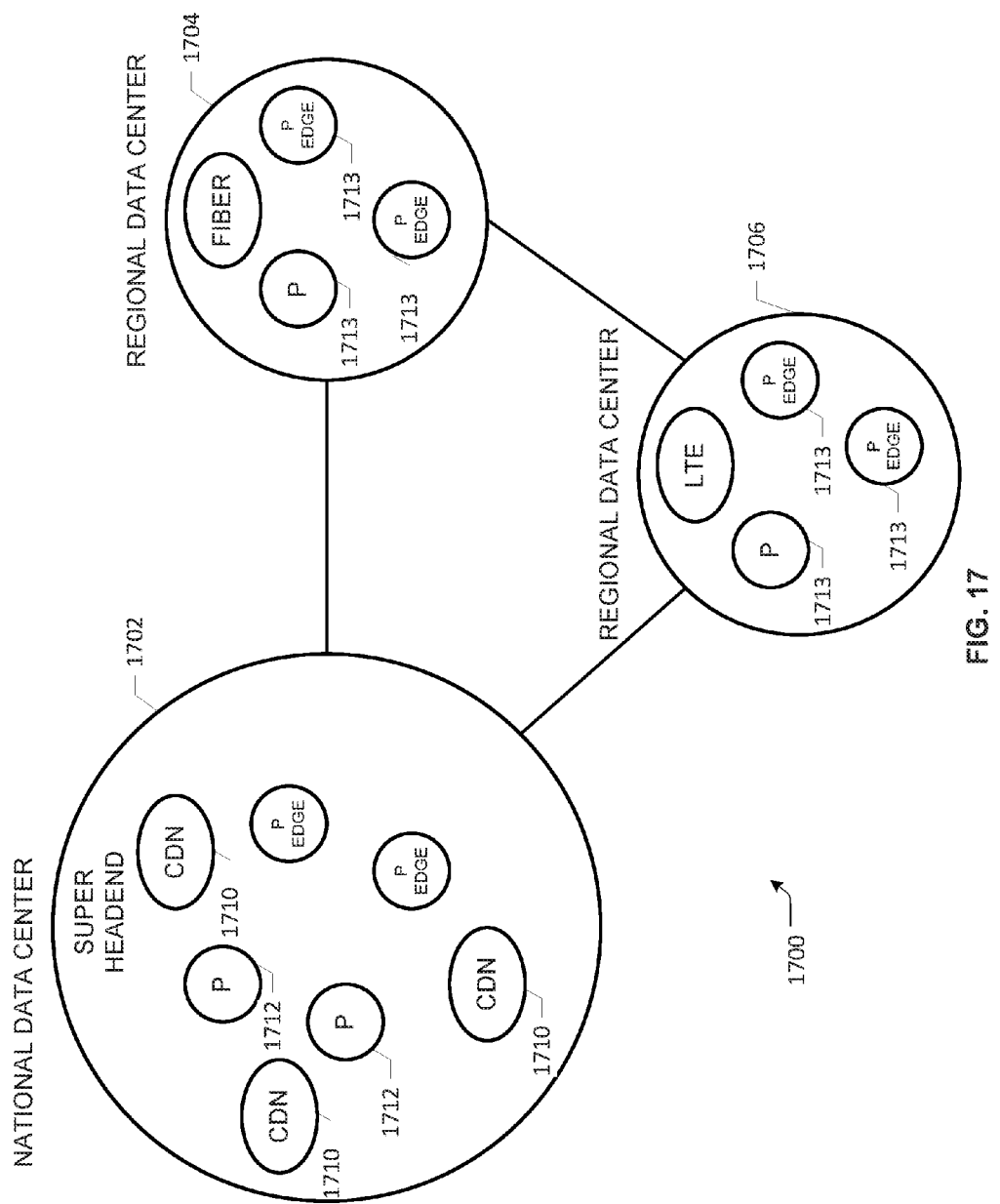
FIG. 17 depicts a generalized media network environment in which an architectural embodiment of the present invention may be practiced according to the teachings of the present patent application.

Turning to FIG. 17, depicted therein is a generalized media network environment 1700 in which an architectural embodiment of the present invention may be practiced according to the teachings of the present patent application. As seen in this Figure, environment 1700 includes a national data center exemplified by a super headend facility 1702 and a plurality of regional data centers 1704, 1606. It will be understood that the number of regional data centers, packagers, CDNs, etc. shown in FIG. 17 are for illustration only and can include any number of these elements or components. National Data Center 1702 is connected to each of Regional Data Centers 1704, 1706, which may be connected to each other and to other regional data centers (not specifically shown). National Data Center 1702 includes CDNs 1710 and CMZF Packagers 1712, some of which may operate as edge packagers that provide media to clients. As one skilled in the art will appreciate, all packagers may potentially operate as edge packagers, although they may not be used as such in all instances. Regional Data Center 1704 may be disposed is in a Fiber-based network infrastructure while Regional Data Center 1706 may be disposed in a Long-Term Evolution (LTE) network infrastructure. Either or both RDCs 1704, 1706 may contain EMR/packagers 1713, which may include both edge packagers and non-edge packagers. The media provided to clients can originate at multiple points within network environment 1700 and can be exchanged across boundaries, such as between RDCs 1704, 1706, as well as with super headend 1702.

It should be appreciated that the foregoing network environment 1700 allows for multi-domain media distribution while supporting end-to-end content protection, especially in a CMZF-based implementation. Where a content peering scheme is implemented, entitlements may be configured to facilitate controlled delivery of protected content, wherein a service provider may deliver content on behalf of other service providers and/or content providers. In addition to supporting media distribution across multiple regions and multiple providers, the network architecture can also facilitate local and/or remote origination of content, e.g., channel bundles, VOD catalogs, secondary media insertion and blackout. Further, cloud-based TV distribution using content peering may also be provided in an example implementation of the network architecture 1700.

Figure 18:
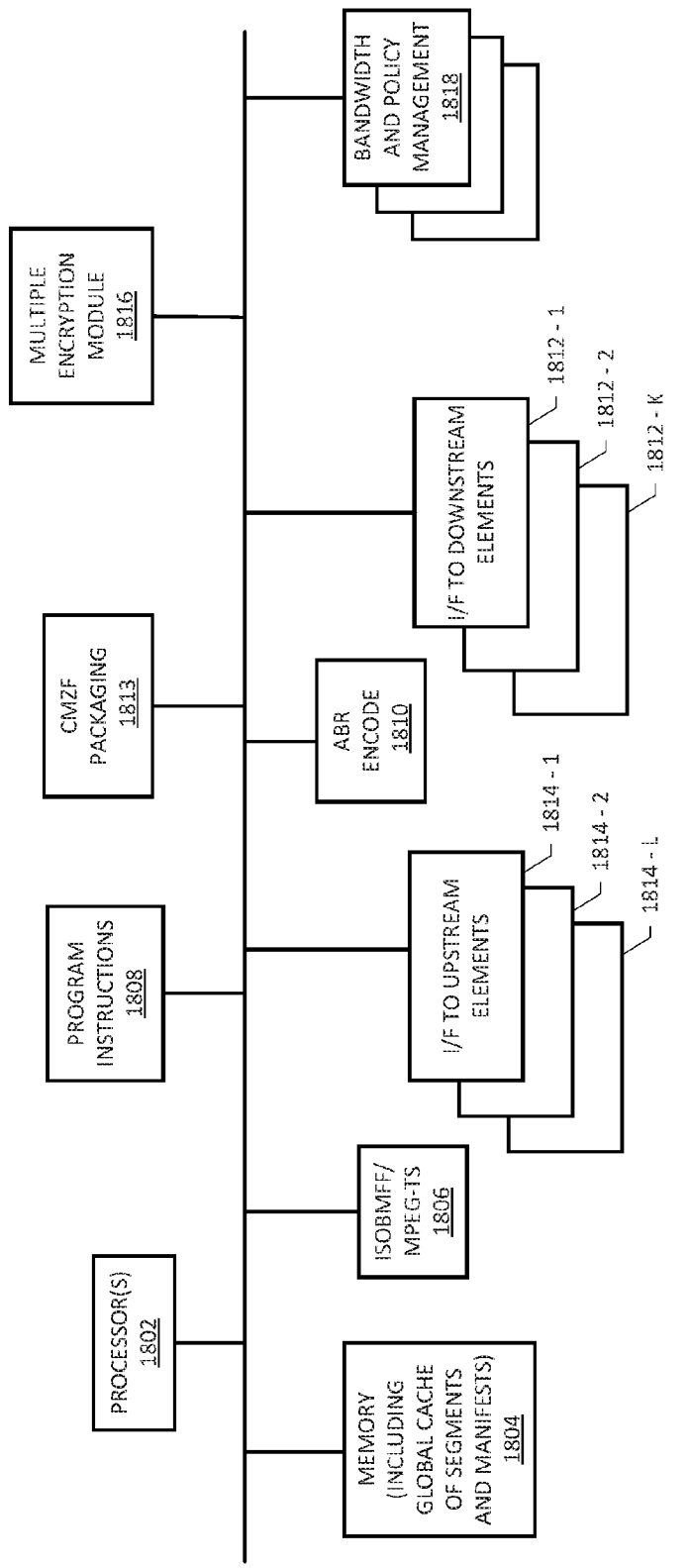
FIG. 18 depicts a block diagram of an apparatus that may be configured or arranged as a network element or node for packaging media content assets for purposes of one or more embodiments of the present patent application.

FIG. 18 depicts a block diagram of an apparatus 1800 that may be configured or arranged as a network element, subsystem or node for facilitating one or more aspects of CMZF-based containerization according to an embodiment of the present patent disclosure. Depending on implementation and/or network architecture of a media communications network, apparatus 1800 may be configured in different ways suitable for operation at multiple hierarchical levels, e.g., at a super headend node, regional headend node, video hub office node, ABR origin server node, central or regional or edge distribution node in a CDN, etc., on the basis of where source media feeds or other content sources are injected into an example deployment. Accordingly, suitable network interfaces, e.g., I/F 1814-1 to 1814-L, operative for effectuating communications with other network infrastructure elements and databases (e.g., source feeds, global databases for storing encoded media fragments, metadata/manifest files, DRM entities, etc.) as well as interfaces 1812-1 to 1812-K for effectuating communications sessions with one or more downstream nodes, e.g., EMRs, origin servers, CDNs, RDCs, MABR network elements, etc., may be provided as part of the apparatus 1800. One or more processors 1802 may be provided as part of a suitable computer architecture for providing overcall control of the apparatus 1800, which processor(s) 1802 may be configured to execute various program instructions stored in appropriate memory modules or blocks, e.g., persistent memory 1804 as well as program instructions 1808, including additional modules or blocks specific to client request processing, encoding/transcoding, media segmentation, CMZF containerization, etc. By way of illustration, ABR encode/transcode block 1810 is operative for generating segments of multibitrate representations of various source media, for which suitable metadata files may be generated by a manifest generator (not specifically shown). A multi-encryption block 1816 is operative for encrypting the content in a plurality of encryption schemes as described in detail hereinabove. A media packaging block 1806 for packaging the media in ISOBMFF and/or MPEG-TS formats may be provided for operation in conjunction with or independent of a CMZF packager 1813 for effectuating various levels of formatting/containerization and associated manifest generation for purposes of one or more embodiments of the present invention. In additional or alternative arrangements, a content push policy management module, a bandwidth and content policy management module, program entitlements, etc., collectively shown as modules or blocks 1818, may also be provided as part of a backend management node in an example network architecture.

Figure 19:
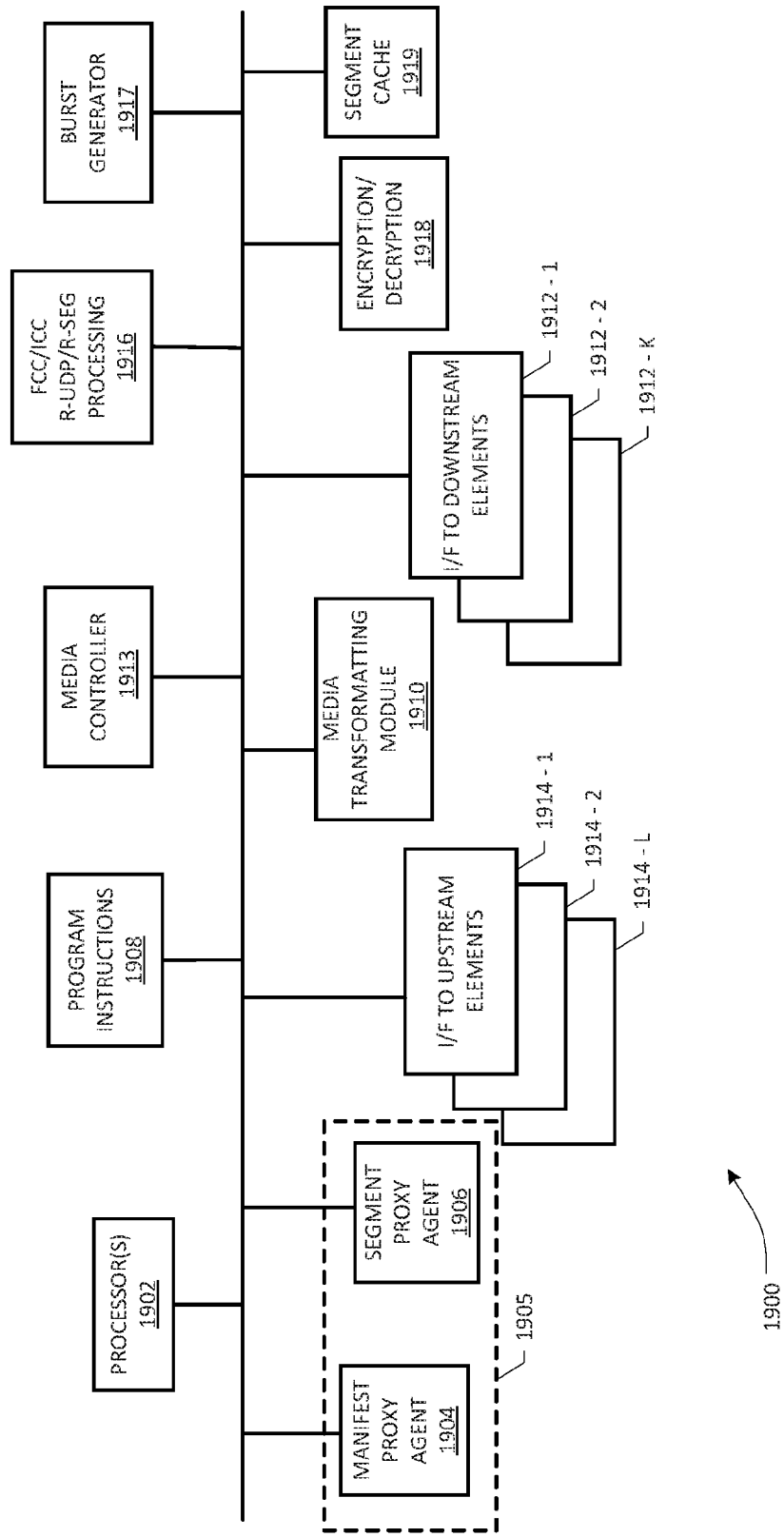
FIG. 19 depicts a block diagram of an apparatus that may be configured or arranged as an EMR element or node for operating at different hierarchical levels of a media network for purposes of one or more embodiments of the present patent application.

FIG. 19 depicts a block diagram of an apparatus 1900 that may be configured or arranged as a network element, subsystem or node for facilitating one or more aspects of an EMR component and/or FCC/ICC server component associated therewith, according to an embodiment of the present patent disclosure. Depending on implementation and/or network architecture of a media communications network, apparatus 1900 may be configured in different ways suitable for operation at multiple hierarchical levels, including at a premises node, as previously noted. Accordingly, various network interfaces, e.g., I/F 1914-1 to 1914-L, operative for effectuating communications with other network infrastructure elements, DRM entities, origin servers, and cache databases as well as interfaces 1912-1 to 1912-K for effectuating communications sessions with one or more downstream nodes, e.g., including lower-level EMRs, origin servers, CDNs, ICC/FCC servers, premises gateway nodes, STBs, reach devices, caches, etc., may be provided as part of the apparatus 1900. One or more processors 1902 may be provided as part of a suitable computer architecture for providing overcall control of the apparatus 1900, which processor(s) 1902 may be configured to execute various program instructions stored in appropriate memory modules or blocks, e.g., persistent memory 1908, including additional modules or blocks specific to EMR functionalities depending on the hierarchical level at which the apparatus 1900 may be deployed as described in detail hereinabove such as, e.g., facilitating MFX as well as sample variants extractor functionality, among others. For example, EMR functionality may include a sample variant extractor component as part of program instructions 1908 configured to extract a complete elementary stream with data from sample variant and main elementary stream samples, which will have the data encrypted with encryption scheme of the sample variant elementary stream, as has been explained detail hereinabove.

A proxy module 1905 may include a manifest proxy agent 1904 and a segment proxy agent 1906 with respect to processing client requests for specific media, which may be stored in local caches 1919 in some implementations. A media controller module 1913 operating in association with a media transformatter module 1910 is provided for effectuating media transformation, trans-containerization, etc. for purposes of one or more embodiments of the present invention. An encryption/decryption block 1918 may be included in an embodiment where sample variant processing may be provided at an EMR component. In another arrangement, FCC/ICC functionality based on R-UDP/R-SEG may also be included for operation with a burst generator 1917 with respect to media repair/recovery and channel changing as described above.

Figure 20:
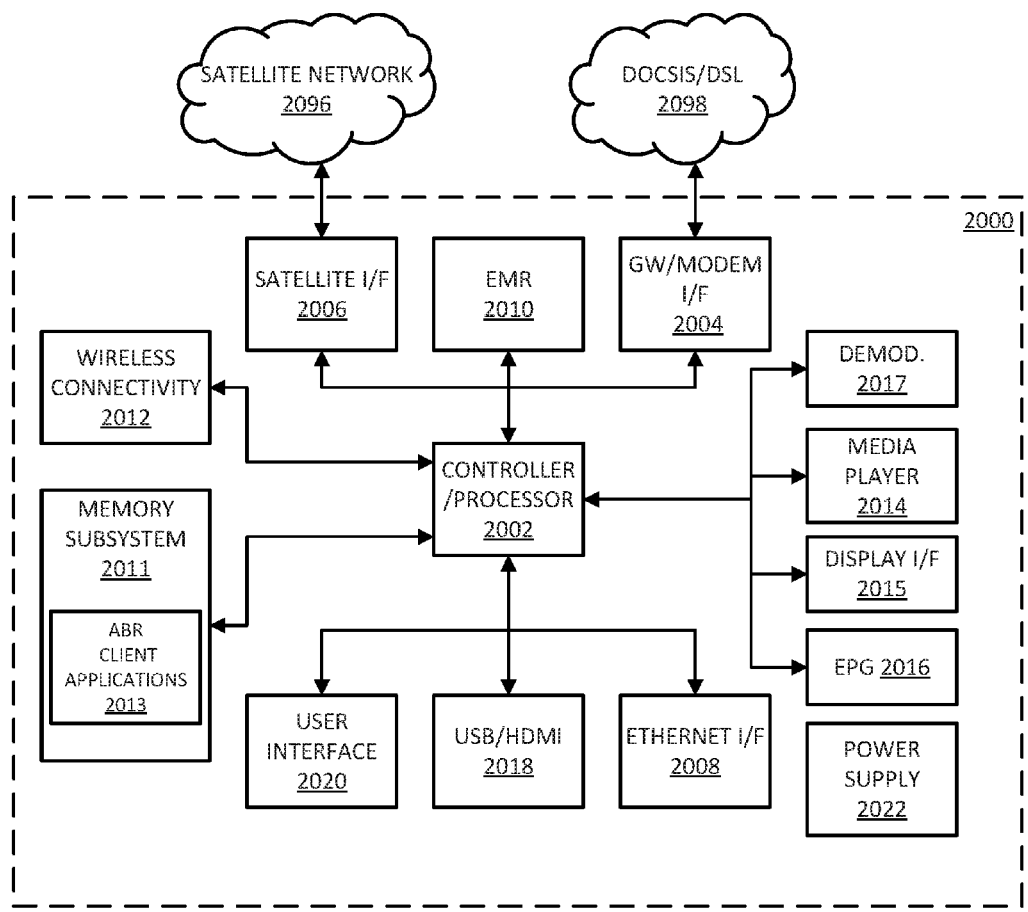
FIG. 20 depicts a block diagram of an apparatus that may be configured or arranged as a premises device or end user device for purposes of the present patent application.

FIG. 20 is a block diagram of an example client device or subscriber station 2000 configured for performing various client-side processes according to one or more embodiments of the present patent disclosure. Client device 2000 is generally representative of a plurality of UE devices, e.g., NXG STBs, legacy STBs, reach devices, etc., shown in one or more Figures described above, and may include appropriate hardware/software components and subsystems configured for performing any of the device-side processes (either individually or in any combination thereof) with respect to local cache access, content request generation, metadata parsing, HTTP proxy control, sample variant processing in conjunction with media segment/stream retrieval and rendering, for purposes of the present patent application, such as, e.g., facilitating MFX as well as media decrypt/decode and/or sample variants extractor functionality, among others, depending on implementation. One or more microcontrollers/processors 2002 are provided for the overall control of the client device 2000 and for the execution of various stored program instructions embodied in a persistent memory 2013, e.g., as a streaming client application having cache discovery capability and/or browser proxy agent, etc., that may be part of a memory subsystem 2011 of the subscriber station 2000. Controller/processor complex referred to by reference numeral 2002 may also be representative of other specialty processing modules such as graphic processors, video processors, digital signal processors (DSPs), and the like, operating in association with suitable video and audio interfaces (not specifically shown). Appropriate interfaces such as network I/F modules 2004 and 2006 involving or operating with tuners, demodulators, descramblers, MPEG/H.264/H.265 decoders/demuxes may be included for processing and interfacing with IPTV and other content signals received via a DSL/CMTS network 2098 or a satellite network 2096. Where an STB is configured as an example client device, suitable demodulators 2017 (e.g., may include NTSC demodulator and/or ATSC/PAL demodulator, and the like) as well as EMR 2010 (having sample extraction, media decode/decrypt, MFX functionality (e.g., in an STB embodiment), etc.) may also be included. One or more media players 2014 may be provided for operating in conjunction with the other subsystems of the client device 2000 for facilitating user control over media playback, including channel change requests. Example media players may be configured to operate with one or more A/V coder/decoder (codec) functionalities based on known or hereto unknown standards or specifications including but not limited to, e.g., Moving Pictures Expert Group (MPEG) codecs (MPEG, MPEG-2, MPEG-4, etc.), H.264 codec, High Efficiency Video Coding or HEVC (H.265) codec, and the like.

Other I/O or interfaces such as a display interface 2015, Electronic Program Guide (EPG) 2016 for identifying media service channels (e.g., in an STB implementation), touch screen or keypad interface 2020, USB/HDMI ports 2018, Ethernet I/F 2008, and short-range and wide area wireless connectivity interfaces 2012 may also be provided depending on device configuration. A hard disk drive (HDD) or DVR system (not specifically shown) may be included in an STB implementation for local storage of various program assets. A suitable power supply block 2022 may include AC/DC power conversion to provide power for the device 1300. It should be appreciated that the actual power architecture for the subscriber device 2000 may vary by the hardware platform used, e.g., depending upon the core SoC (System-on-Chip), memory, analog front-end, analog signal chain components and interfaces used in the specific platform, and the like.

One skilled in the art will recognize that various apparatuses, subsystems, functionalities/applications and/or one or more network elements as well as the underlying network infrastructures set forth above may be architected in a virtualized environment according to a network function virtualization (NFV) architecture in additional or alternative embodiments of the present patent disclosure. For instance, various physical resources, databases, services, applications and functions executing within an example network of the present application may be provided as virtual appliances, machines or functions, wherein the resources and applications are virtualized into suitable virtual network functions (VNFs) or virtual network elements (VNEs) via a suitable virtualization layer. Resources comprising compute resources, memory resources, and network infrastructure resources are virtualized into corresponding virtual resources wherein virtual compute resources, virtual memory resources and virtual network resources are collectively operative to support a VNF layer, whose overall management and orchestration functionality may be supported by a virtualized infrastructure manager (VIM) in conjunction with a VNF manager and an NFV orchestrator. An Operation Support System (OSS) and/or Business Support System (BSS) component may typically be provided for handling network-level functionalities such as network management, fault management, configuration management, service management, and subscriber management, etc., which may interface with VNF layer and NFV orchestration components via suitable interfaces.

Furthermore, at least a portion of an example network architecture disclosed herein may be virtualized as set forth above and architected in a cloud-computing environment comprising a shared pool of configurable virtual resources. Various pieces of hardware/software, e.g., ABR encoders, encryption systems and schemes, segmentation mechanisms, media asset packaging/containerization, CMZF segment/manifest databases, EMR/MFX functionality, etc., as well as platforms and infrastructure of NDCs, RDCs, origin servers, MABR network elements may be implemented in a service-oriented architecture, e.g., Software as a Service (SaaS), Platform as a Service (PaaS), infrastructure as a Service (IaaS) etc., with multiple entities providing different features of an example embodiment of the present invention, wherein one or more layers of virtualized environments may be instantiated on commercial off the shelf (COTS) hardware. Skilled artisans will also appreciate that such a cloud-computing environment may comprise one or more of private clouds, public clouds, hybrid clouds, community clouds, distributed clouds, multiclouds and interclouds (e.g., "cloud of clouds"), and the like.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As pointed out previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method for distributing content with end-to-end encryption, the method comprising:
   processing a media content asset for packaging in a common mezzanine distribution format (CMZF) container structure, thereby generating CMZF-formatted media content in a CMZF stream scheme, the CMZF container structure configured to carry each bitrate representation of the media content asset encrypted in one or more encryption schemes;
   providing the CMZF-formatted media content to an origin server for file-based distribution over a first network infrastructure; and
   providing the CMZF-formatted media content to a streaming network node for stream-based distribution over a second network infrastructure,
   wherein the CMZF container structure is based on an MPEG Transport Stream (MPEG-TS) container format extended to include a modified Program-Specific Information (PSI) metadata structure configured to add extra elementary stream (ES) definitions corresponding to carriage of one or more following stream types: one or more ISO Base Media File Format (ISOBMFF) track and track metadata data objects as Packetized Elementary Stream (PES) payload containing data specific to the CMZF-formatted media content in a valid CMZF stream scheme with one or more encryption schemes, and one or more sample variants track data and track metadata objects as PES payload containing data specific to the CMZF-formatted media content in a valid CMZF stream scheme with one or more encryption schemes.

2. The method as recited in claim 1, wherein the extra ES definitions are configured to define additional PES streams, each having a separate Packet Identifier (PID), for carriage of at least one of the ISOBMFF track and track metadata data objects in the PES payload and the sample variants track data and track metadata objects in the PES payload.

3. The method as recited in claim 1, wherein the media content asset comprises at least one of live TV content, IPTV content, time-shifted (TS) TV content, place-shifted (PS) TV content, gaming content, Video on Demand (VOD) content, ABR content, Virtual Reality (VR) content, and user equipment (UE) device metadata content.

4. The method as recited in claim 1, wherein the one or more encryption schemes comprise at least one of a Common Encryption (CENC and CENS-TS) protection scheme using Advanced Encryption Standard (AES) 128-bit keys in Counter mode (CTR), a CENC protection scheme using AES 128-bit keys in Cipher-block chaining mode (CBC), a CENC CTR mode using a sub-sample pattern of unencrypted bytes and encrypted bytes of the media content asset's audio/visual (NV) data ('cens' scheme), a CENC CBC mode using another sub-sample pattern of unencrypted bytes and encrypted bytes of the media content asset's AN data ('cbcs' scheme), a CENC CBC mode using another sub-sample pattern of unencrypted bytes and encrypted bytes of the media content asset's AN data ('cbcs' scheme), a CENC-TS mode "cf" using a sub-sample pattern encryption scheme with AES 128-bit keys in CBC mode, and a CENC-TS mode "cf" using a sub-sample pattern encryption scheme with AES-128 bit keys In CTR mode.

5. The method as recited in claim 1, further comprising:
providing one or more CMZF manifests configured for facilitating file-based distribution of the CMZF-formatted media content from the origin server to a first edge media router (EMR) device over the first network infrastructure; and
providing one or more CMZF manifests configured for facilitating stream-based distribution of the CMZF-formatted media content from the streaming network node to a second EMR device over the second network infrastructure,
wherein the first and second EMR devices each comprise a module for transformatting the CMZF-formatted media content into one or more outputs including: one or more delivery container formats compatible for consumption by a user equipment (UE) device, and a CMZF-formatted media content in a valid CMZF stream scheme delivered as one of the following types: CMZF segments and CMZF streams.

6. The method as recited in claim 1, wherein the first network infrastructure comprises at least one of an unmanaged network and a managed network.

7. The method as recited in claim 1, wherein the second network infrastructure comprises at least one of an unmanaged network and a managed network.

8. An apparatus, comprising:
one or more processors;
a plurality of network interfaces configured to receive media content assets from one or more content sources;
an encoder for generating a plurality of bitrate representations for each media content asset;
an encryptor configured to encrypt each segmented bitrate representation of a media content asset using one or more encryption schemes; and
one or more persistent memory modules having program instructions stored thereon which, when executed by the one or more processors, perform the following:
processing a media content asset for packaging in a common mezzanine distribution format (CMZF) container structure, thereby generating CMZF-formatted media content in a CMZF stream scheme, the CMZF container structure configured to carry each bitrate representation of the media content asset encrypted in one or more encryption schemes;
providing the CMZF-formatted media content asset to an origin server for file-based distribution over a first network infrastructure; and
providing the CMZF-formatted media content to a streaming network node for stream-based distribution over a second network infrastructure,
wherein the CMZF container structure is based on an MPEG Transport Stream (MPEG-TS) container format extended to include a modified Program-Specific Information (PSI) metadata structure configured to add extra elementary stream (ES) definitions corresponding to carriage of one or more following stream types: one or more ISO Base Media File Format (ISOBMFF) track and track metadata data objects as Packetized Elementary Stream (PES) payload containing data specific to the CMZF-formatted media content in a valid CMZF stream scheme with one or more encryption schemes, and one or more sample variants track data and track metadata objects as PES payload containing data specific to the CMZF-formatted media content in a valid CMZF stream scheme with one or more encryption schemes.

9. The apparatus as recited in claim 8, wherein the extra ES definitions are configured to define additional PES streams, each having a separate Packet Identifier (PID), for carriage of at least one of the ISOBMFF track and track metadata data objects in the PES payload and the sample variants track data and track metadata objects in the PES payload.

10. The apparatus as recited in claim 8, wherein the media content assets comprise at least one of live TV content, IPTV content, time-shifted (TS) TV content, place-shifted (PS) TV content, gaming content, and Video on Demand (VOD) content, ABR content, Virtual Reality (VR) content, and user equipment (UE) device metadata content.

11. The apparatus as recited in claim 8, wherein the one or more encryption schemes comprise at least one of a Common Encryption (CENC and CENS-TS) protection scheme using Advanced Encryption Standard (AES) 128-bit keys in Counter mode (CTR), a CENC protection scheme using AES 128-bit keys in Cipher-block chaining mode (CBC), a CENC CTR mode using a sub-sample pattern of unencrypted bytes and encrypted bytes of the media content asset's audio/visual (NV) data (tens' scheme), a CENC CBC mode using another sub-sample pattern of unencrypted bytes and encrypted bytes of the media content asset's AN data ('cbcs' scheme), a CENC CBC mode using another sub-sample pattern of unencrypted bytes and encrypted bytes of the media content asset's AN data ('cbcs' scheme), a CENC-TS mode "cf" using a sub-sample pattern encryption scheme with AES 128-bit keys in CBC mode, and a CENC-TS mode "cf" using a sub-sample pattern encryption scheme with AES-128 bit keys In CTR mode.

12. The apparatus as recited in claim 8, wherein the program instructions further comprise instructions configured to:
generate one or more CMZF manifests configured for facilitating file-based distribution of the CMZF-formatted media content from the origin server to a first edge media router (EMR) device over the first network infrastructure; and
generate one or more CMZF manifests configured for facilitating stream-based distribution of the CMZF-formatted media content from the streaming network node to a second EMR device over the second network infrastructure,
wherein the first and second EMR devices each comprise a module for transformatting the CMZF-formatted media content into a delivery container format compatible for consumption by a user equipment (UE) device.

13. The apparatus as recited in claim 8, wherein the first network infrastructure comprises at least one of an unmanaged network and a managed network.

14. The apparatus as recited in claim 8, wherein the second network infrastructure comprises at least one of an unmanaged network and a managed network.

15. A non-transitory machine-readable storage medium having program instructions thereon that are configured to perform following acts when executed by one or more processors of a media packaging system:

processing a media content asset for packaging in a common mezzanine distribution format (CMZF) container structure, thereby generating CMZF-formatted media content in a CMZF stream scheme, the CMZF container structure configured to carry each bitrate representation of the media content asset encrypted in one or more encryption schemes;

providing the CMZF-formatted media content to an origin server for file-based distribution over a first network infrastructure; and providing the CMZF-formatted media content to a streaming network node for stream-based distribution over a second network infrastructure, wherein the CMZF container structure is based on an MPEG Transport Stream (MPEG-TS) container format extended to include a modified Program-Specific Information (PSI) metadata structure configured to add extra elementary stream (ES) definitions corresponding to carriage of one or more following stream types: one or more ISO Base Media File Format (ISOBMFF) track and track metadata data objects as Packetized Elementary Stream (PES) payload containing data specific to the CMZF-formatted media content in a valid CMZF stream scheme with one or more encryption schemes, and one or more sample variants track data and track metadata objects as PES payload containing data specific to the CMZF-formatted media content in a valid CMZF stream scheme with one or more encryption schemes.

16. The non-transitory machine-readable storage medium as recited in claim 15, wherein the extra ES definitions are configured to define additional PES streams, each having a separate Packet Identifier (PID), for carriage of at least one of the ISOBMFF track and track metadata data objects in the PES payload and the sample variants track data and track metadata objects in the PES payload.

17. The non-transitory machine-readable storage medium as recited in claim 15, wherein the media content asset comprises at least one of live TV content, IPTV content, time-shifted (TS) TV content, place-shifted (PS) TV content, gaming content, Video on Demand (VOD) content, ABR content, Virtual Reality (VR) content, and user equipment (UE) device metadata content.

18. The non-transitory machine-readable storage medium as recited in claim 15, wherein the one or more encryption schemes comprise at least one of a Common Encryption (CENC and CENS-TS) protection scheme using Advanced Encryption Standard (AES) 128-bit keys in Counter mode (CTR), a CENC protection scheme using AES 128-bit keys in Cipher-block chaining mode (CBC), a CENC CTR mode using a sub-sample pattern of unencrypted bytes and encrypted bytes of the media content asset's audio/visual (NV) data ('cens' scheme), a CENC CBC mode using another sub-sample pattern of unencrypted bytes and encrypted bytes of the media content asset's A/V data ('cbcs' scheme), a CENC CBC mode using another sub-sample pattern of unencrypted bytes and encrypted bytes of the media content asset's A/V data ('cbcs' scheme), a CENC-TS mode "cf" using a sub-sample pattern encryption scheme with AES 128-bit keys in CBC mode, and a CENC-TS mode "cf" using a sub-sample pattern encryption scheme with AES-128 bit keys In CTR mode.

19. The non-transitory machine-readable storage medium as recited in claim 15, wherein the program instructions further comprise instructions configured to:

generate one or more CMZF manifests configured for facilitating file-based distribution of the CMZF-formatted media content from the origin server to a first edge media router (EMR) device over the first network infrastructure; and generate one or more CMZF manifests configured for facilitating stream-based distribution of the CMZF-formatted media content from the streaming network node to a second EMR device over the second network infrastructure, wherein the first and second EMR devices each comprise a module for transformatting the CMZF-formatted media content into a delivery container format compatible for consumption by a user equipment (UE) device.

* * * * *